United States Patent
Yano et al.

(10) Patent No.: US 11,468,603 B2
(45) Date of Patent: Oct. 11, 2022

(54) INFORMATION PROCESSING APPARATUS AND METHOD

(71) Applicant: SONY CORPORATION, Tokyo (JP)

(72) Inventors: Koji Yano, Tokyo (JP); Ohji Nakagami, Tokyo (JP); Satoru Kuma, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 16/649,166

(22) PCT Filed: Sep. 14, 2018

(86) PCT No.: PCT/JP2018/034130
§ 371 (c)(1),
(2) Date: Mar. 20, 2020

(87) PCT Pub. No.: WO2019/065298
PCT Pub. Date: Apr. 4, 2019

(65) Prior Publication Data
US 2020/0294273 A1    Sep. 17, 2020

(30) Foreign Application Priority Data
Sep. 29, 2017 (JP) .............................. JP2017-189781

(51) Int. Cl.
*G06V 10/00* (2022.01)
*G06T 9/40* (2006.01)
(Continued)

(52) U.S. Cl.
CPC .............. *G06T 9/40* (2013.01); *H04N 19/124* (2014.11); *H04N 19/176* (2014.11); *H04N 19/30* (2014.11); *H04N 19/96* (2014.11)

(58) Field of Classification Search
CPC ...... G06K 9/4609; G06K 9/48; G06K 9/6407; G06K 9/2009; G06K 9/6423;
(Continued)

(56) References Cited

U.S. PATENT DOCUMENTS 9,472,022 B2 * 10/2016 Neumann ............... G06T 17/10
9,659,405 B2 *  5/2017 Wahrenberg ........... A61B 6/466
(Continued)

FOREIGN PATENT DOCUMENTS

JP        2016-009484 A     1/2016

OTHER PUBLICATIONS

Nakagami et al., Point cloud compression technology proposal by Sony, International Organisation for Standardisation, ISO/IEC JTC1/SC29/WG11 Coding of Moving Pictures and Audio, Oct. 2017, pp. 1-43, Macau, CN.
(Continued)

*Primary Examiner* — Amir Alavi
(74) *Attorney, Agent, or Firm* — Paratus Law Group, PLLC

(57) ABSTRACT

The present disclosure relates to an information processing apparatus and a method that allows for suppression of a decrease in encoding efficiency. In comparison of voxel data resulting from quantization of point cloud data, a correlation degree of a distribution pattern between voxel data to be compared is calculated on the basis of a subjective feature of the distribution pattern of values of the voxel data. The present disclosure is applicable to an information processing apparatus, an image processing apparatus, an electronic device, an information processing method, a program, or the like, for example.

19 Claims, 43 Drawing Sheets

(51) Int. Cl.
*H04N 19/124* (2014.01)
*H04N 19/176* (2014.01)
*H04N 19/30* (2014.01)
*H04N 19/96* (2014.01)

(58) Field of Classification Search
CPC ... G06T 7/0075; G06T 7/0022; G06T 7/0081; G06T 7/0083; G06T 7/001; G06T 2207/10012; G06T 2207/10016; H04N 13/0239; H04N 13/0082; H04N 7/30; H04N 7/26244; H04N 7/2625; G06F 17/30249; G06F 17/146
See application file for complete search history.

(56) References Cited

U.S. PATENT DOCUMENTS

| | | | | |
|---|---|---|---|---|
| 9,818,195 | B2* | 11/2017 | Zach | G06V 20/64 |
| 11,087,501 | B2* | 8/2021 | Nakagami | H04N 19/96 |
| 11,106,936 | B2* | 8/2021 | Bergen | G06K 9/6215 |
| 11,282,239 | B2* | 3/2022 | Han | H04N 19/96 |
| 2014/0270476 | A1* | 9/2014 | Cameron | G06V 20/64 |
| | | | | 382/154 |
| 2016/0379475 | A1* | 12/2016 | Zack | G08B 21/043 |
| | | | | 342/21 |
| 2020/0327377 | A1* | 10/2020 | Jaganathan | G06N 3/084 |

OTHER PUBLICATIONS

Lee et al., Mesh Saliency, ACM transactions on graphics, Jul. 2005, pp. 659-666, vol. 24, No. 3.

Lavoué, Basic Background in 3D Object Processing, 3D Object Processing: Compression, Indexing and Watermarking, 2008, pp. 1 and 6-43.

Jaspe et al., Symmetry-aware Sparse Voxel DAGs (SSVDAGs) for compression-domain tracing of high-resolution geometric scenes, Journal of Computer Graphics Techniques, May 2017, pp. 1-30, vol. 6, No. 2.

Alexiou et al., On Subjective and Objective Quality Evaluation of Point Cloud Geometry, QoMEX 2017, May 31-Jun. 2, 2017, pp. 1-3, IEEE, Erfurt, Germany.

Kämpe et al., High Resolution Sparse Voxel DAGs, ACM Transactions on Graphics 34(4), Jul. 2013, pp. 1-8.

* cited by examiner

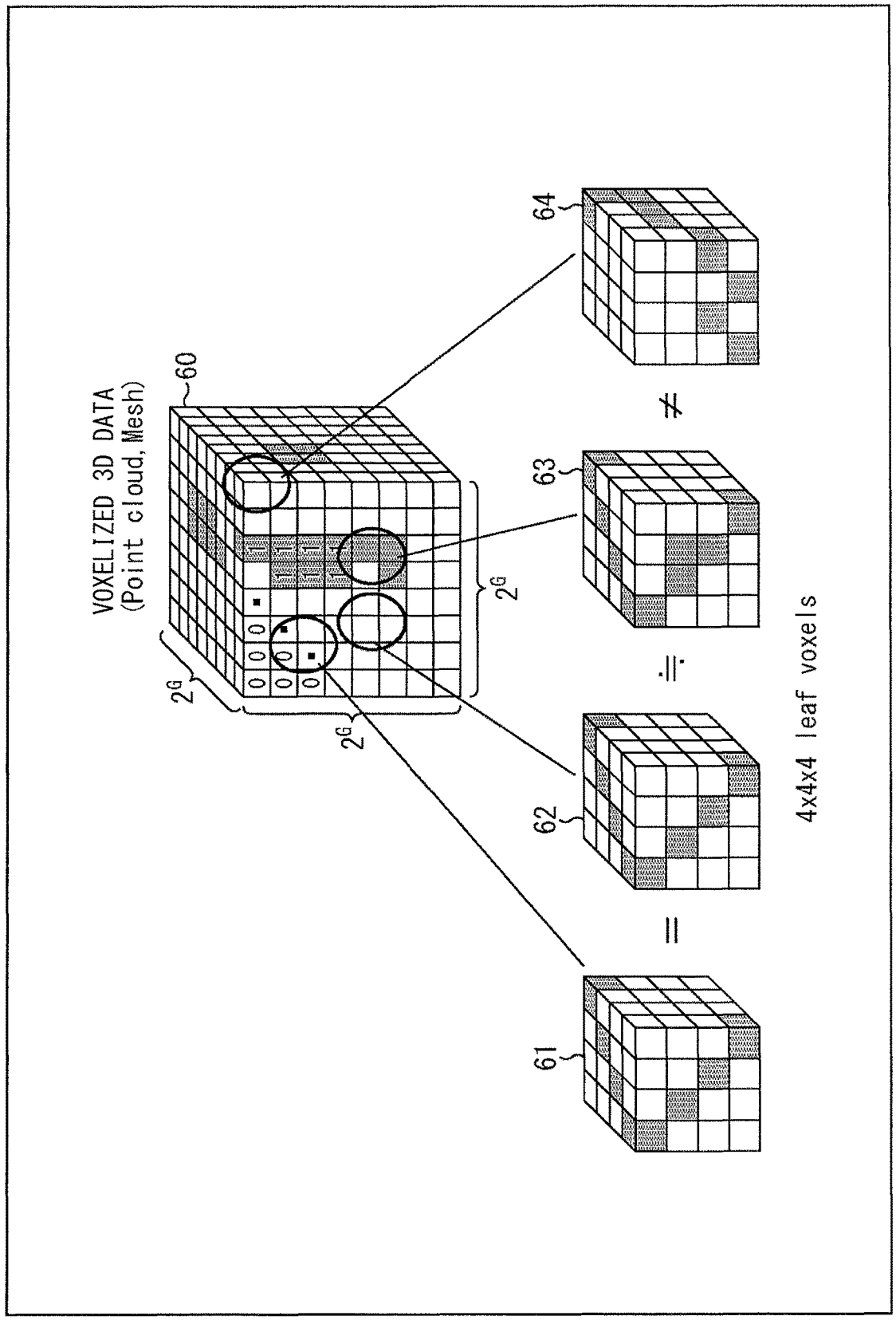

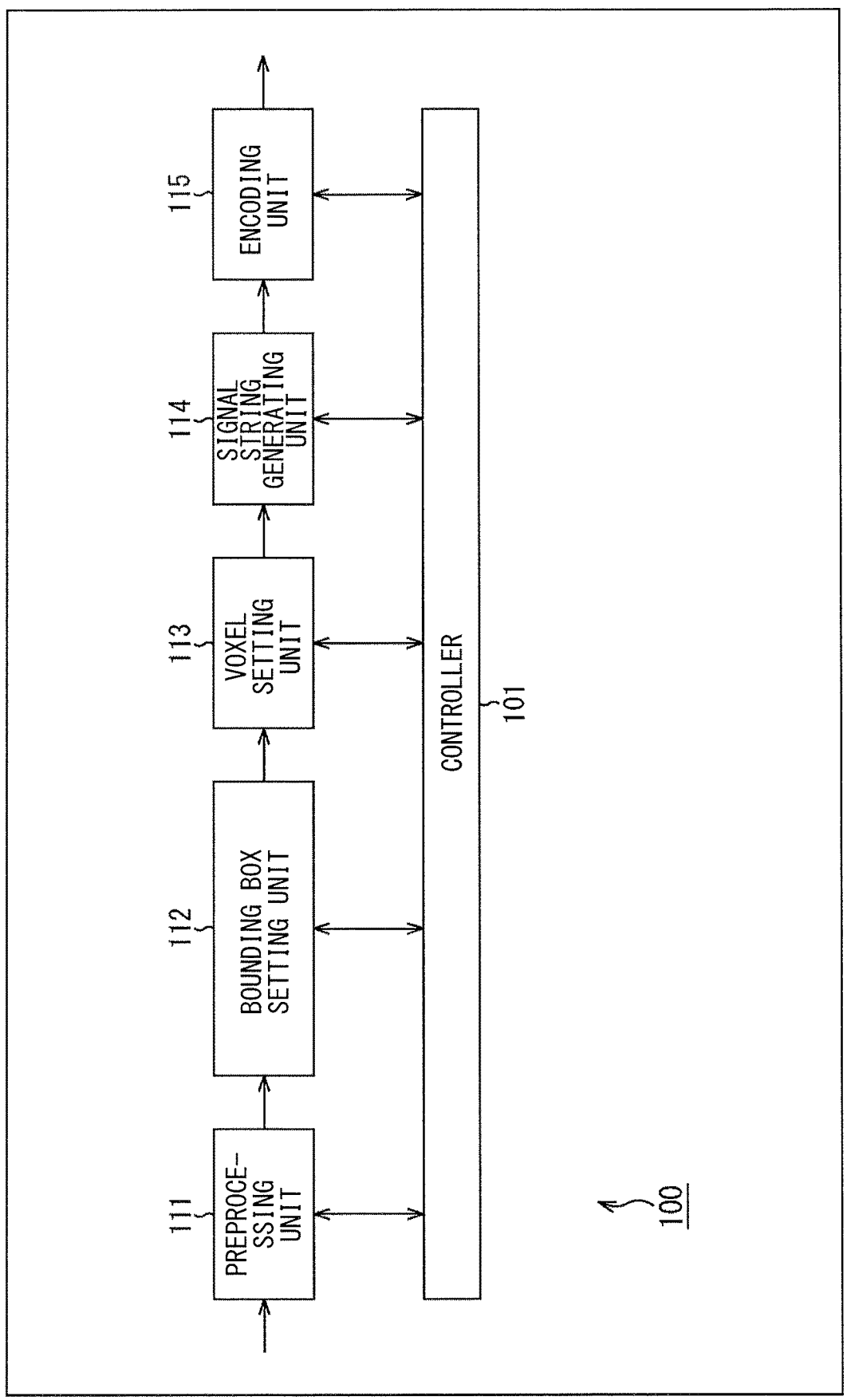

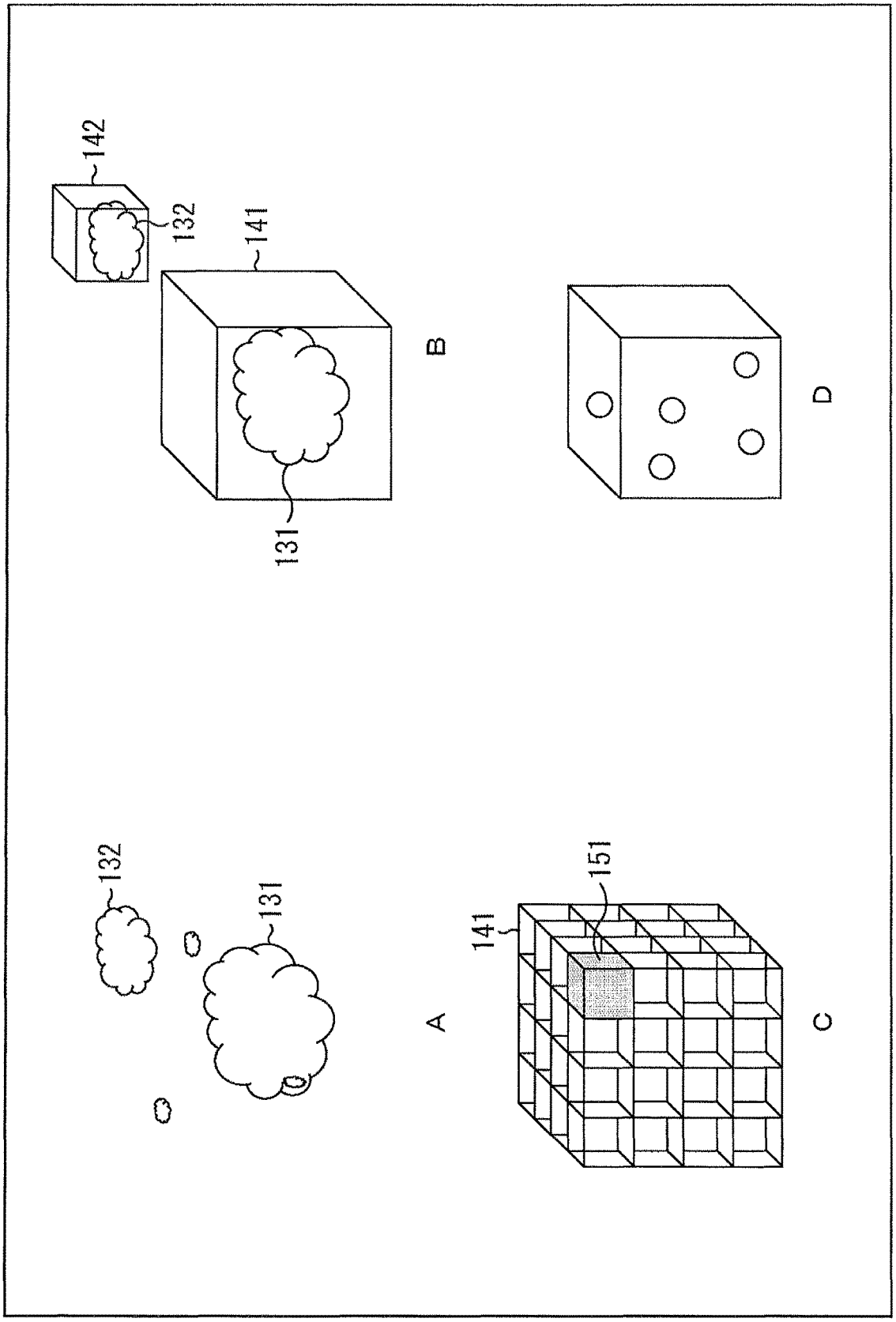

Fig. 9

| id | title | OUTLINE | Encode Process | Decode Process |
|---|---|---|---|---|
| 1 | USE OF Index | Give unique Index to Node in the screen and use it for an encoding block. | Reduce redundant Node from all Nodes in the screen, extract Node having the unique pattern, and assign Index thereto. Express all Nodes with the use of Index. | Decode a relationship between Index and a point distribution of unique Node, and thereafter, decode all of the point distributions from Index. |
| 2 | USE OF SPATIAL COORDINATE | Use spatial coordinate information (or a vector representing a relative distance) specifying Node to be referred to for an encoding block. | Search for Node having high correlation to the current block from encoded Node, and encode an absolute position, a relative distance (vector), or the like. | Decode information such as the absolute position or the relative distance (vector) and determine the point distribution of Node to be referred to. |
| 3 | USE OF FIXED PATTERN | Give Index to a node having a predefined point distribution and use it for an encoding block. | Search for Node having high correlation to the current block from the predefined Node, and encode its Index. | Decode all of the point distributions from Index. |
| 4 | USE OF TIME INFORMATION | Use time information specifying Node to be referred to for an encoding block in order to use correlation between different frames. (Can be combined with 1, 2, or 3) | Hold an encoded frame, and search for Node having high correlation in the frame. In a case where such Node is found, transmit information (time difference from the current frame or the like) specifying the frame. | Specify the decoded frame by decoding the information specifying the frame and decode the distribution pattern from Node in the frame on the basis of the additional information. |
| 5 | USE OF ROTATION INFORMATION OR INVERSION INFORMATION | In a case where the same distribution is obtained when Node is rotated or inverted, add rotation information or inversion information and transmit it. (Can be combined with 1, 2, 3, or 4) | Upon calculating correlation, perform matching with the current also for the point distribution that is symmetrical with respect to a point or a line for Node to be referred to. In a case where a pattern with high correlation is found, transmit rotation information or inversion information. | Decode the information such as rotation or inversion, perform operation corresponding to Node to be referred to, and determine the point distribution. |
| 6 | USE OF VICINITY BLOCK INFORMATION | Reduce a transmission amount by using correlation information used for a vicinity block for a current block. (Corresponding to MV prediction of moving image Codec) (Can be combined with 1 to 5) | Calculate correlation in a case where correlation information used for vicinity Node is reused for current Node. In a case of high correlation, transmit information (flag) indicating reuse. | In a case where the information indicating reuse of the vicinity, determine the point distribution of current Node by the corresponding operation. |

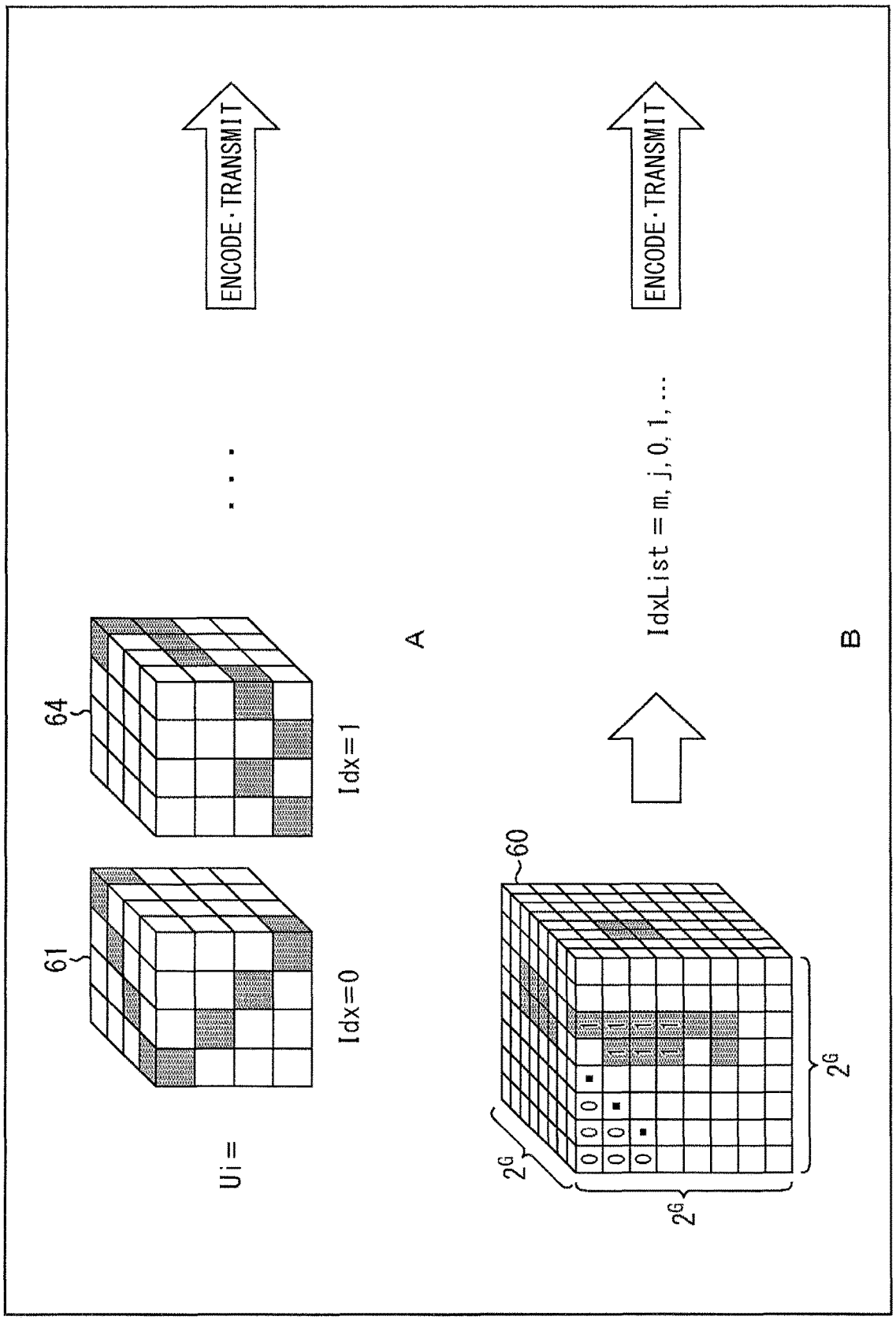
[Fig. 10]

| id | EVALUATION FUNCTION | OUTLINE |
|---|---|---|
| 1 | Hausdorff Distance | MAXIMUM VALUE OF SMALLEST DISTANCE BETWEEN POINT AND POINT |
| 2 | PSNR Point2Point | PSNR OF SMALLEST DISTANCE BETWEEN POINT AND POINT |
| 3 | PSNR Point2Surface | PSNR OF SMALLEST DISTANCE BETWEEN POINT AND SURFACE |
| 4 | Hamming Distance | NUMBER OF BITS HAVING DIFFERENT VALUES IN BIT STRING |

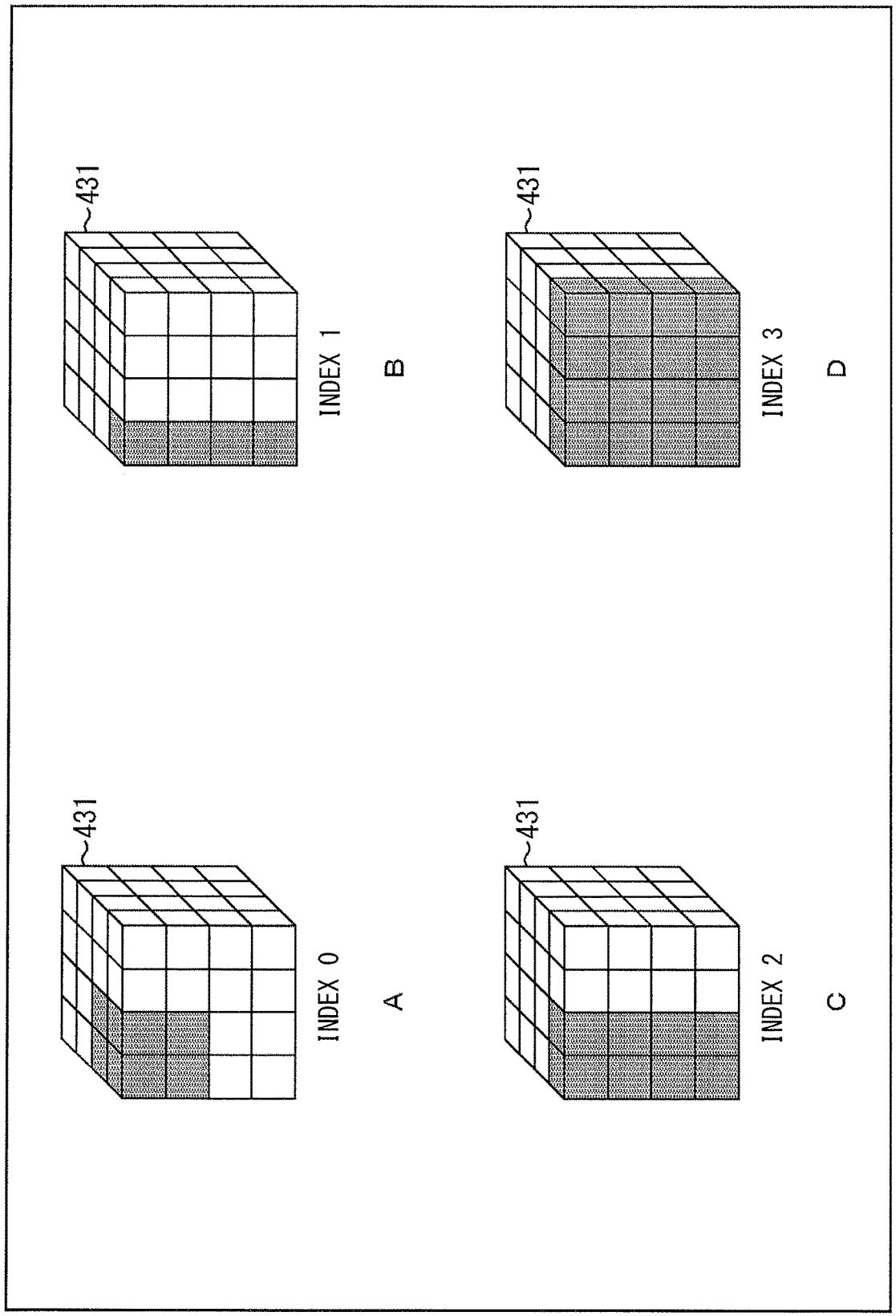

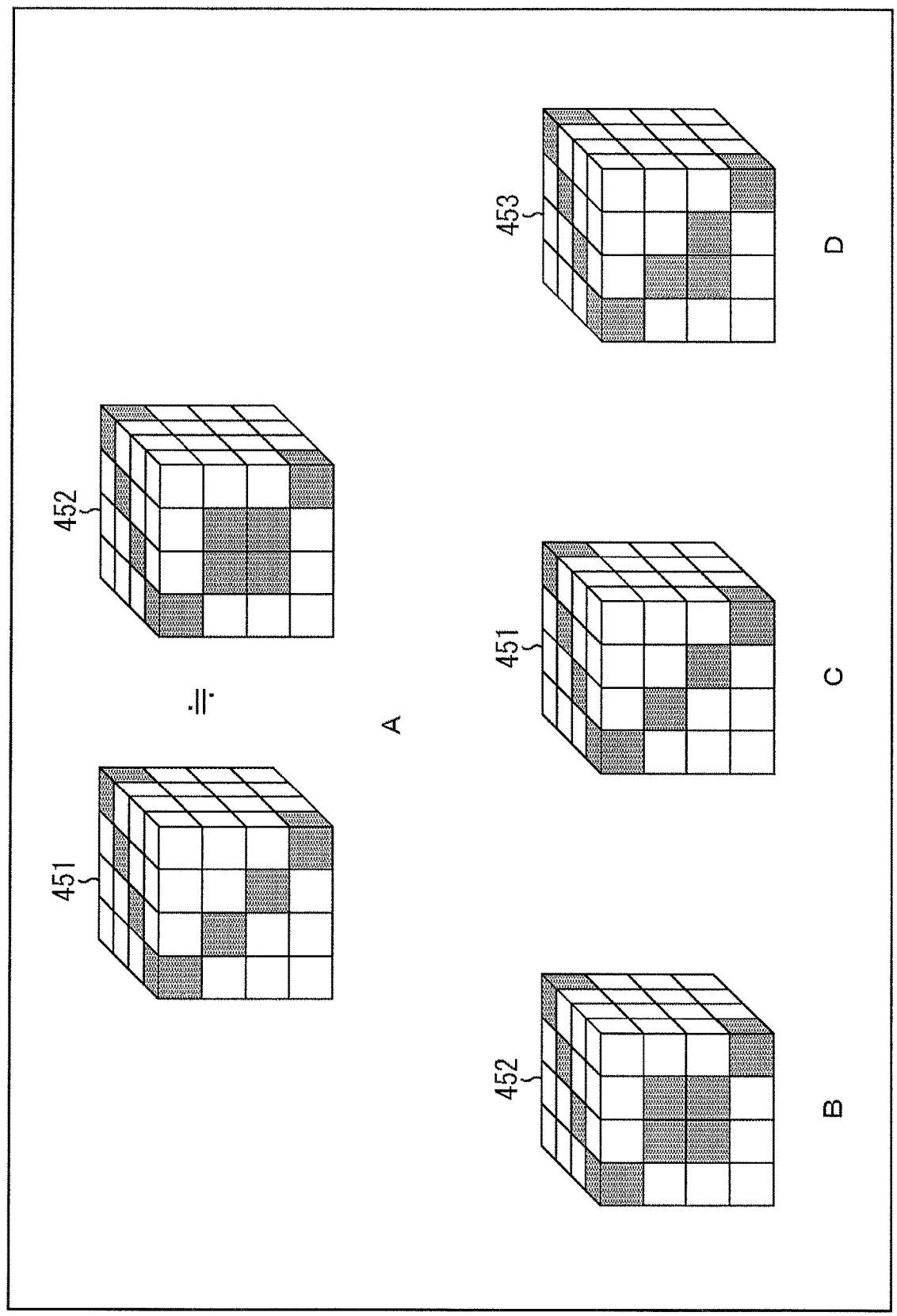

[Fig. 41]

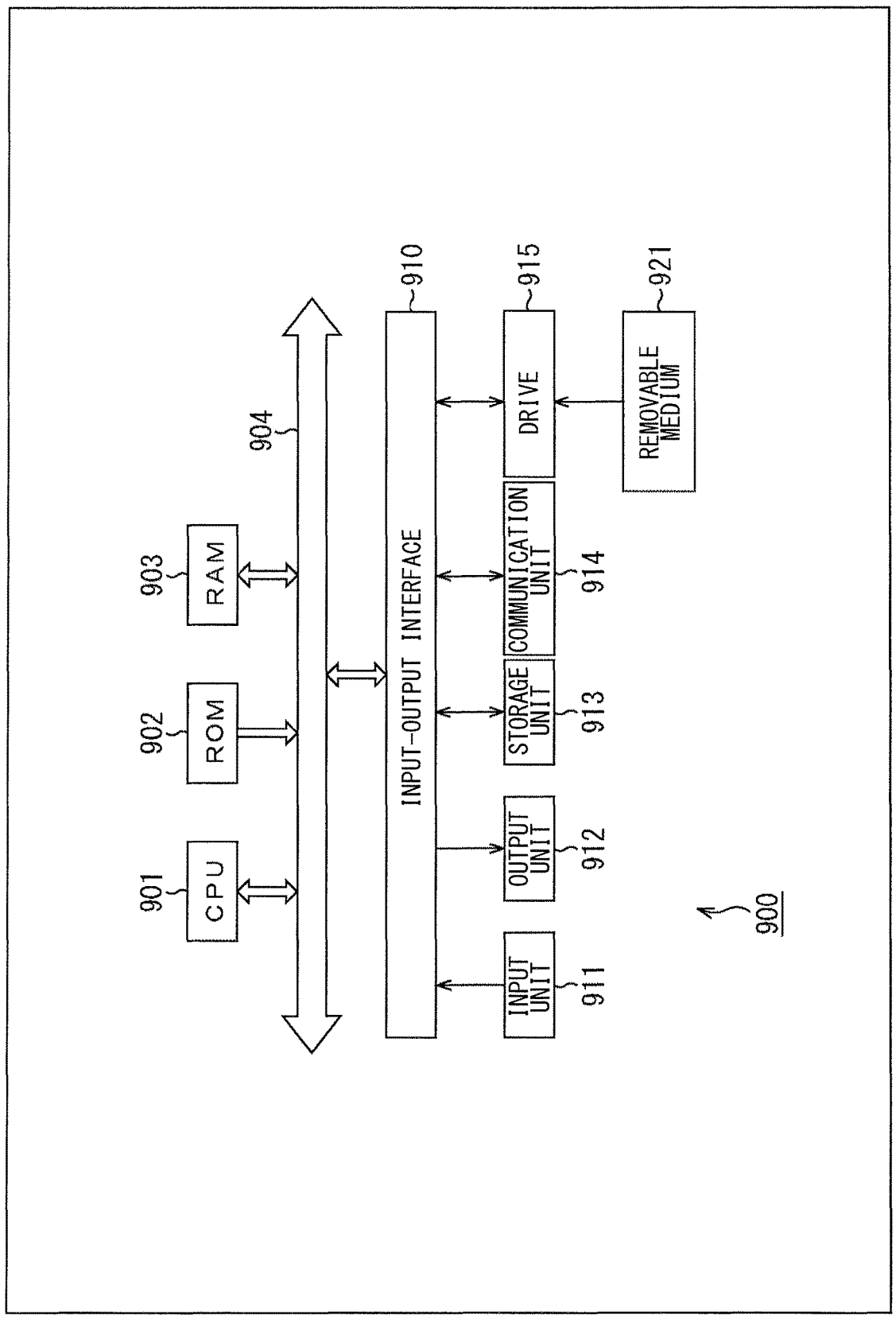
[Fig. 43]

INFORMATION PROCESSING APPARATUS AND METHOD

CROSS REFERENCE TO PRIOR APPLICATION

This application is a National Stage Patent Application of PCT International Patent Application No. PCT/JP2018/034130 (filed on Sep. 14, 2018) under 35 U.S.C. § 371, which claims priority to Japanese Patent Application No. 2017-189781 (filed on Sep. 29, 2017), which are all hereby incorporated by reference in their entirety.

TECHNICAL FIELD

The present disclosure relates to an information processing apparatus and a method, and in particular, to an information processing apparatus and a method that are capable of suppressing a decrease in subjective image quality.

BACKGROUND ART

As methods of compressing a point cloud representing a three-dimensional structure based on position information, attribute information, and the like of a point group, or vertex data of a mesh including vertices, edges, and surfaces and defining a three-dimensional shape using a polygon expression, there has been encoding using a voxel (Voxel), for example, such as Octree. In addition, a method of reversibly encoding the Octree encoded data by using autocorrelation has also been considered (see, for example, NPL 1).

DAG (Directed Acyclic Graph) (also referred to as an effective directional graph) described in NPL 1 can reduce an amount of information by reducing redundancy by combining nodes having the same tree structure (Octree pattern) of Octree encoded data.

In addition, as an index for evaluating a degree of similarity (correlation degree) between data, for example, PSNR (Peak signal-to-noise ratio) or the like has been proposed.

CITATION LIST

Non-Patent Literature

NPL 1: V. Kampe, "High Resolution Sparse Voxel DAGs," ACM 2013

SUMMARY OF THE INVENTION

Problem to be Solved by the Invention

However, since a general evaluation index such as PSNR performs evaluation as general data, it does not necessarily correspond to subjective image quality (good appearance). Therefore, in the evaluation of a correlation degree of point cloud data (voxel data), if only merging of nodes considering the RD-optimal is performed only with the use of such a general evaluation index, subjective deterioration may be noticeable in decoded point cloud data.

The present disclosure has been made in view of such a situation, and is to suppress a decrease in subjective image quality.

Means for Solving the Problem

An information processing apparatus of an aspect of the present technology is an information processing apparatus including a correlation degree calculating unit that calculates, in comparison of voxel data resulting from quantization of point cloud data, a correlation degree of a distribution pattern between voxel data to be compared on the basis of a subjective feature of the distribution pattern of values of the voxel data.

An information processing method of an aspect of the present technology is an information processing method including calculating, in comparison of voxel data resulting from quantization of point cloud data, a correlation degree of a distribution pattern between voxel data to be compared on the basis of a subjective feature of the distribution pattern of values of the voxel data.

In the information processing apparatus and the method of an aspect of the present technology, in comparison of voxel data resulting from quantization of point cloud data, a correlation degree of a distribution pattern between voxel data to be compared is calculated on the basis of a subjective feature of the distribution pattern of values of the voxel data.

Effects of the Invention

According to the present disclosure, it is possible to process information. In particular, it is possible to suppress a decrease in subjective image quality.

BRIEF DESCRIPTION OF DRAWINGS

FIG. 6 is a diagram describing an example of voxel data encoding.

FIG. 7 is a block diagram illustrating a main configuration example of an encoding apparatus.

FIG. 8 is a diagram describing an example of an outline of encoding.

FIG. 9 is a diagram describing an example of voxel data encoding.

FIG. 10 is a diagram describing an example of voxel data encoding using an index.

FIG. 30 is a block diagram illustrating a main configuration example of a decoding apparatus.

FIG. 36 is a diagram illustrating an example of a cost function.

FIG. 37 is a diagram illustrating an example of an index.

FIG. 38 is a diagram illustrating a setting example of a unique pattern.

FIG. 43 is a block diagram illustrating a main configuration example of a computer.

MODES FOR CARRYING OUT THE INVENTION

Hereinafter, modes for carrying out the present disclosure (hereinafter referred to as embodiments) will be described. It is to be noted that the description will be given in the following order.
1. Voxel Data Encoding
2. First Embodiment (Encoding Apparatus)
3. Second Embodiment (Decoding Apparatus)
4. Third Embodiment (Correlation Arithmetic Operation Process)
5. Others 1. Voxel Data Encoding <Point Cloud>

There have been data such as a point cloud representing a three-dimensional structure by position information, attribute information, and the like of a point group, or a mesh including vertices, edges, and planes and defining a three-dimensional shape using a polygon expression.

Figure 1:
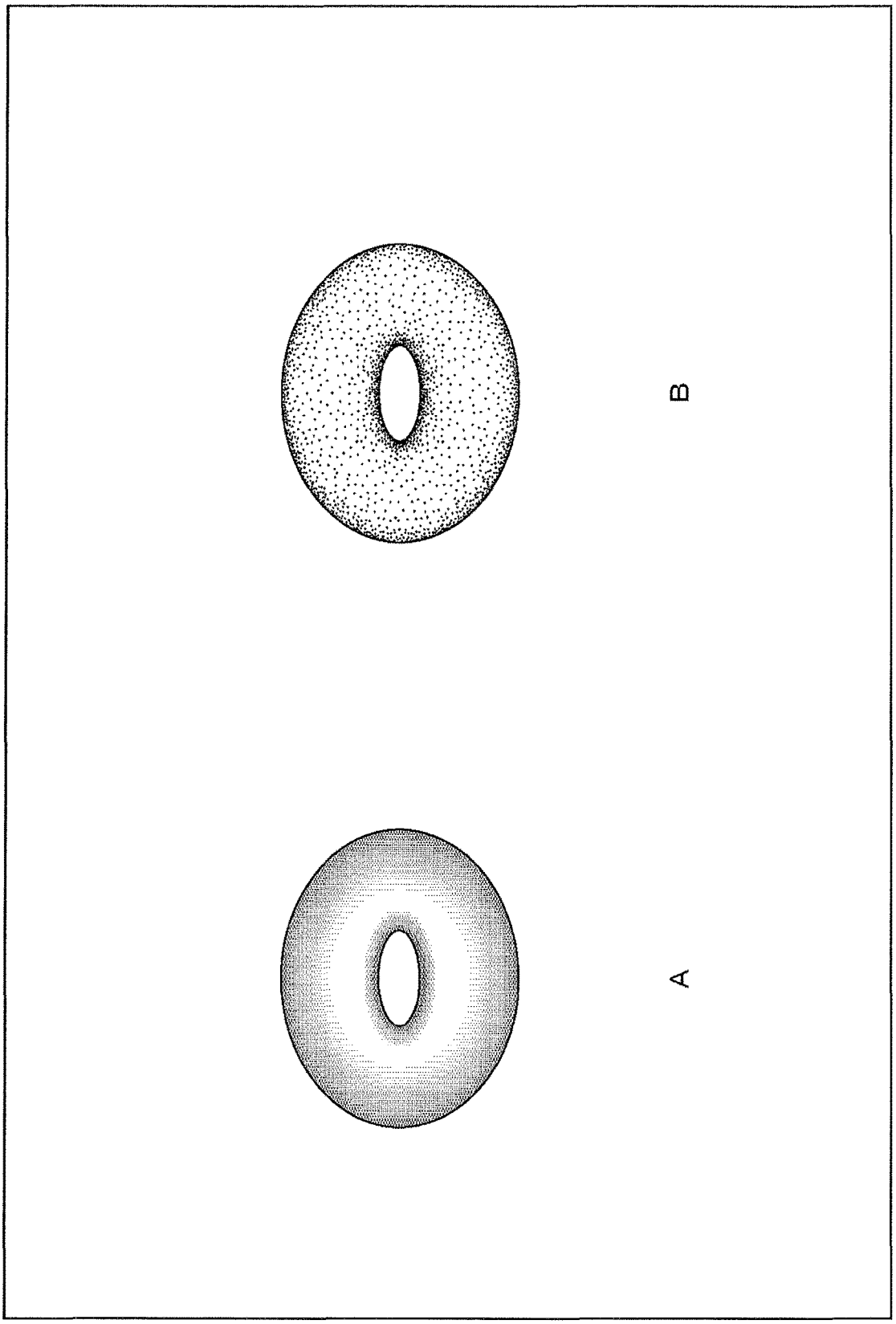
FIG. 1 is a diagram describing an example of a point cloud.

For example, in a case of the point cloud, a three-dimensional structure as illustrated in A of FIG. 1 is expressed as a set (point group) of a number of points (point data) as illustrated in B of FIG. 1. In other words, the data of the point cloud includes position information, attribute information (e.g., colors or the like) or the like of the respective points of the point group. Therefore, the data structure is relatively simple, and by using a sufficiently large number of points, any three-dimensional structure can be expressed with sufficient accuracy.

However, since the data amount of data such as a point cloud, or a mesh is relatively large, compression of the data amount by encoding or the like is required. For example, an encoding method using a voxel (Voxel) such as Octree or KDtree has been considered. A voxel is a data structure for quantizing the position information of an encoding target.

<Effective Directional Graph>

In addition, for example, a method of reversively encoding Octree encoded data using autocorrelation has also been considered, such as a DAG (Directed Acyclic Graph) (also referred to as an effective directional graph) described in NPL 1. The DAG (effective directional graph) can reduce the amount of information by reducing redundancy by combining nodes having the same tree structure (Octree pattern) of Octree encoded data.

An example of a state of reducing redundancy by the DAG will be described with reference to FIG. 2. For example, consider a binary tree structure as illustrated in A of FIG. 2. The squares of the binary tree structure each indicate a node. An arrow between nodes indicates a pointer connecting the nodes with each other. In the binary tree structure in A of FIG. 2, three types of nodes exist: white, black, and gray. Each color represents a value. That is, in the binary tree structure in A of FIG. 2, there are nodes of three types of values.

Focusing on the lowest node (lowest-level node) in the diagram of the binary tree structure, there are two types of nodes: white and black. That is, redundancy occurs between the black nodes and between the white nodes. Therefore, as illustrated in B of FIG. 2, one black node and one white node are left, and other overlapping nodes are deleted.

Further, nodes one level higher are associated with the remaining black node or white node. That is, a node that has been associated with the black node at the lowest level in the nodes at the second lowest level is reassociated with the remaining black node, and the node that has been associated with the white node at the lowest level is reassociated with the remaining white node. More specifically, a tip of a pointer (arrow) of each node at the second lowest level is so updated as to designate the remaining black or white node.

Figure 2:
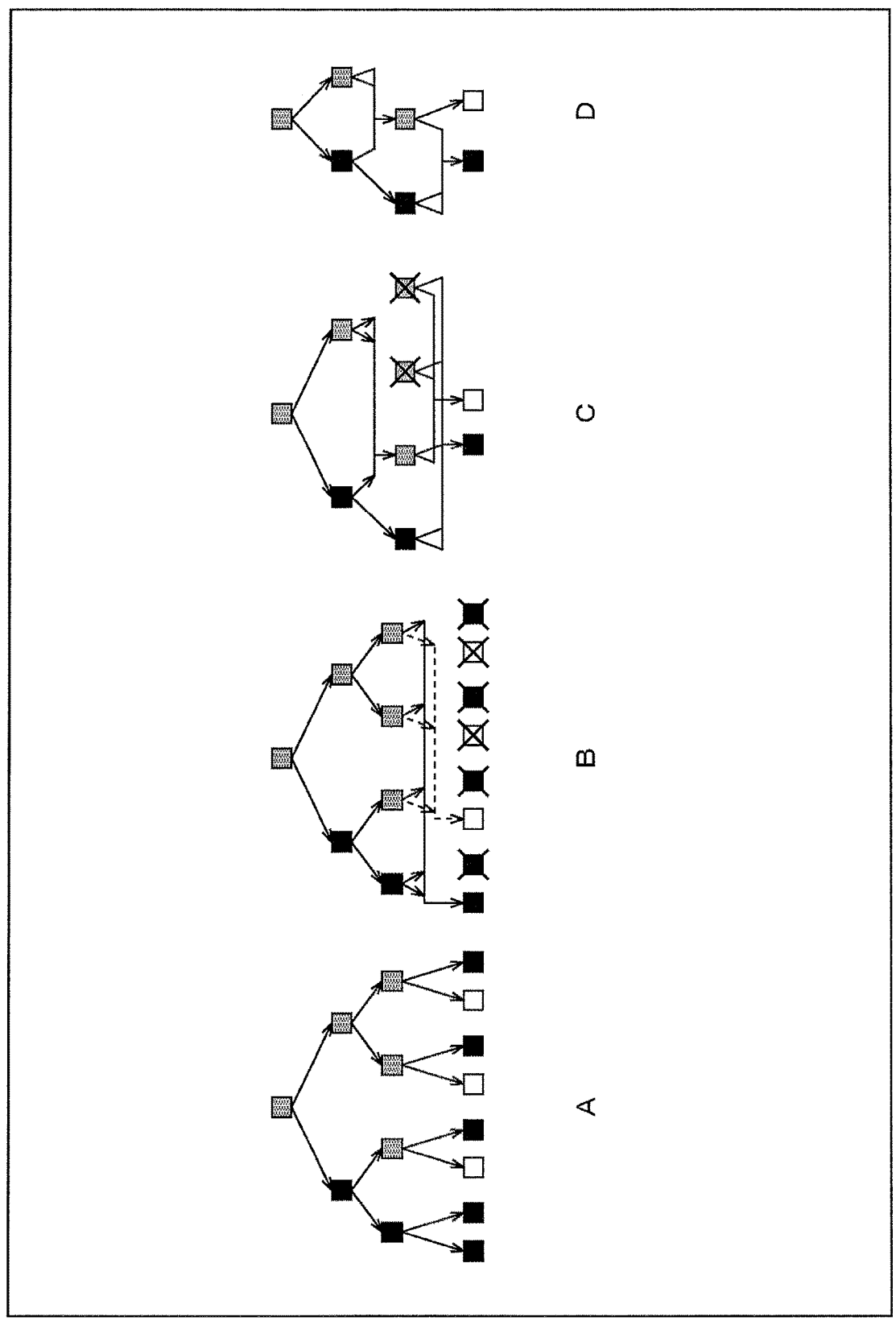
FIG. 2 is a diagram describing an example of a DAG.

Such manipulation reduces the lowest-level nodes to two, as illustrated in C of FIG. 2. Since the value of the node does not vary, the binary tree structure in C of FIG. 2 is substantially equivalent to the binary tree structure in A of FIG. 2. That is, it is reversibly compressed.

Next, as illustrated in C of FIG. 2, the nodes are concentrated in a similar manner for the second lowest level. By performing a similar process for each level of the binary tree structure, the binary tree structure can finally be as illustrated in D of FIG. 2. That is, the binary tree structure in D of FIG. 2 is equivalent to the binary tree structure in A of FIG. 2. As described above, the information of the binary tree structure can be reversibly compressed by the DAG.

<Octree and DAG>

The DAG (effective directional graph) can also be applied to an Octree pattern, which is a structure of Octree encoded voxel data. In the Octree pattern, as illustrated in A of FIG.

3, a voxel in which point data exists in 2×2×2 voxels at an upper level is further divided into 2×2×2 at a level lower by one level. In A of FIG. 3, a grayed voxel indicates the voxel in which the point data exists. Of the voxels of the node 10 at the upper level, two are gray voxels. Therefore, these two voxels are set as a node 11 and a node 12 at a level lower by one level, and further divided into 2×2×2 voxels.

Figure 3:
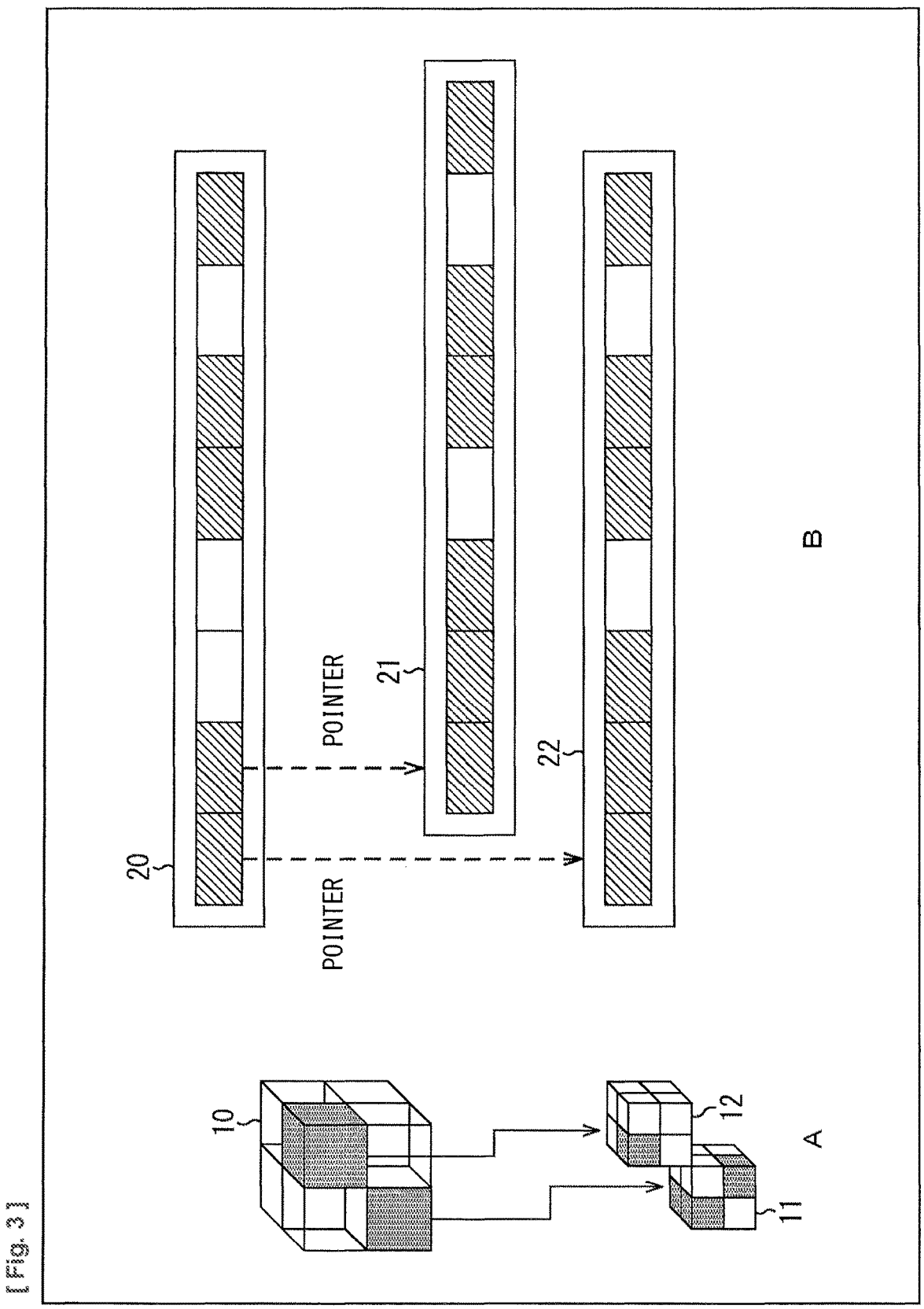
FIG. 3 is a diagram describing an example of Octree encoding.

B of FIG. 3 illustrates an outline of a data structure of such an Octree pattern. In B of FIG. 3, the node 20 indicates an upper-level node, and a node 21 and a node 22 indicate nodes at a level lower by one level belonging to the node 20.

Squares in each node indicate the data of each voxel. Data of one voxel has, for example, 1 byte (byte). That is, one node of data has 8 bytes. Here, for convenience of description, it is assumed that there are two types of data, white and hatched. White data indicates data of a voxel where point data does not exist, and hatched data indicates data where point data exists.

A pointer indicating an address at which data of a node at a level lower by one level exists is given to each hatched data. That is, only in the voxel where the point data exists, the node at the level lower by one level is formed. The data structure of the node is similar at each level. The lowest-level data is not provided with a pointer indicating an address at which lower-level data exists. It is to be noted that, in this description, only the position information is described, and the description of the attribute information is omitted.

Figure 4:
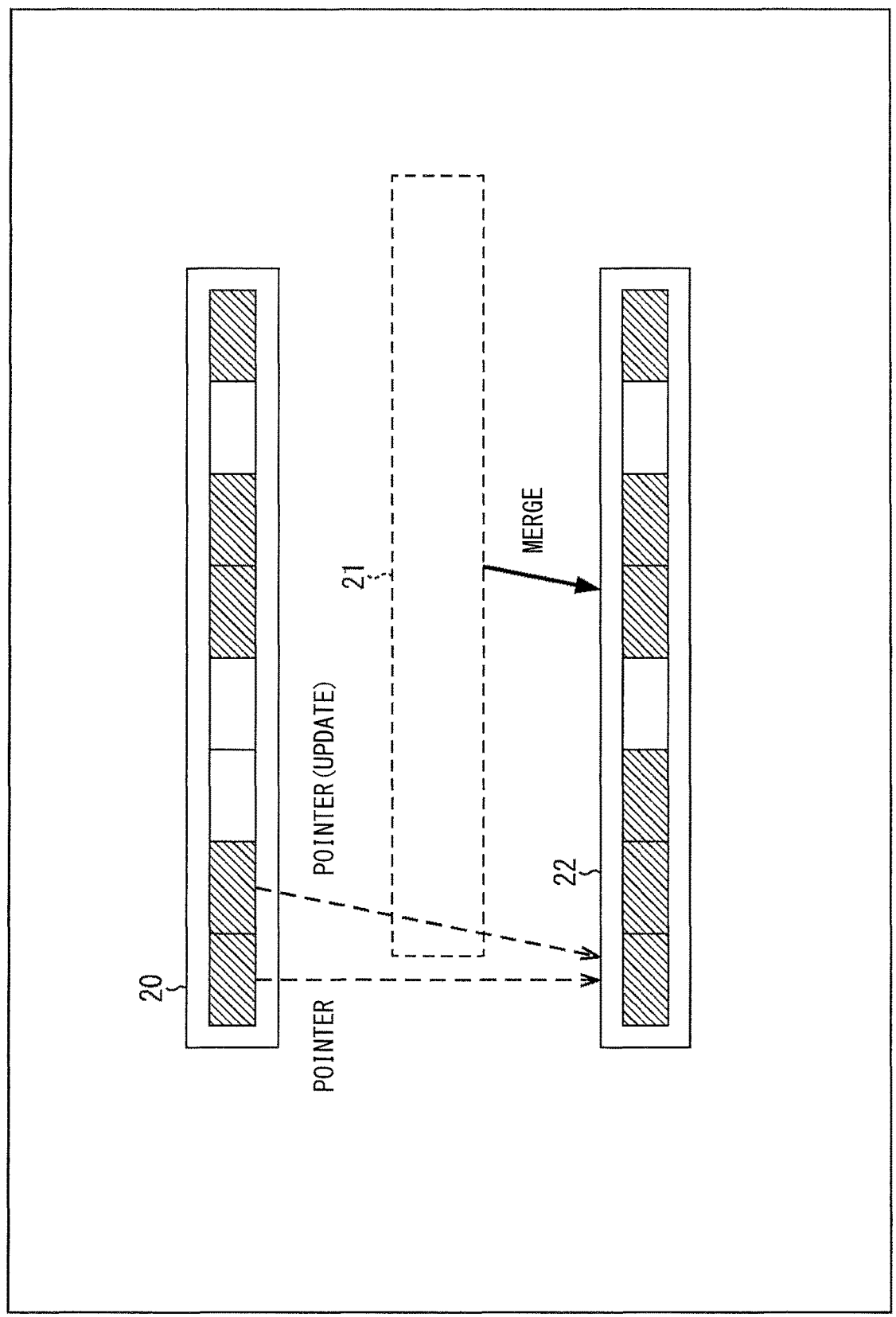
FIG. 4 is a diagram describing an example of a DAG.

In a case of B of FIG. 3, the node 21 and the node 22 coincide with each other in the data pattern of each voxel. That is, the distribution patterns of values of voxel data in both nodes are the same. That is, since the same data exists at a plurality of addresses, it is redundant. Therefore, by performing DAG, the two nodes are merged into one as illustrated in FIG. 4. For example, the node 21 is deleted, and the pointer of the data of the second voxel from the left of the node 20 is so updated as to indicate the address of the node 22. By doing so, it is possible to reduce the redundancy of data at this level.

Figure 5:
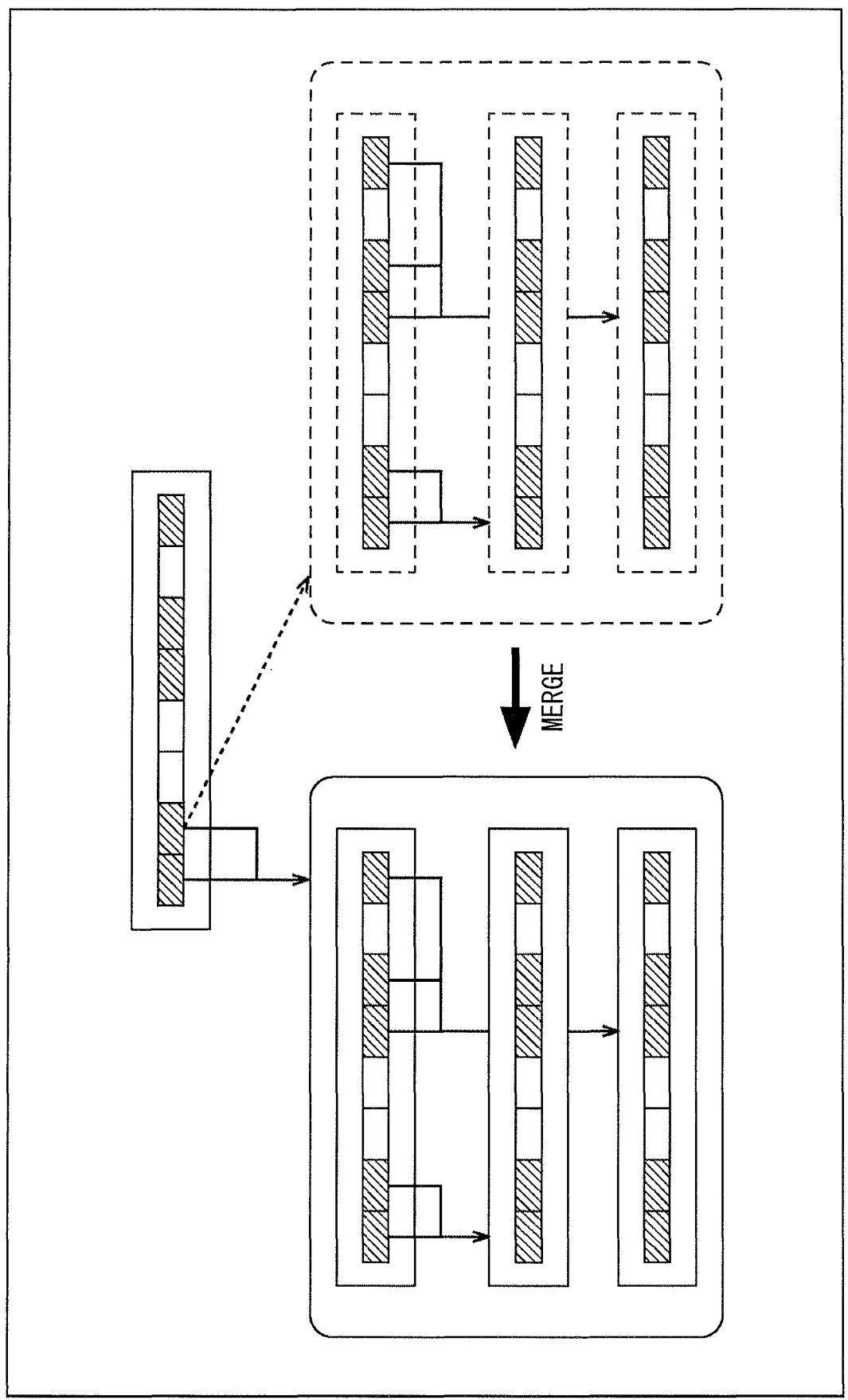
FIG. 5 is a diagram describing an example of a DAG.

Redundancy can be reduced in a similar manner at each level. That is, as illustrated in FIG. 5, portions having the same data structure can be merged for a plurality of levels in a similar manner.

<Characteristic of DAG>

The DAG is mainly aimed at reducing the amount of information in huge CG data (data with hundreds of millions of pieces of vertex information) generated from a computer model. That is, it is aimed to compress low-noise bulk data as a target at a high compression rate.

However, in the case of point cloud data such as a natural image, the probability of occurrence of the same Octree pattern is reduced due to noises, detail information included in the data, or the like. Therefore, there has been a possibility that sufficient compressing efficiency cannot be obtained. That is, there has been a possibility that encoding efficiency is decreased.

In addition, even in a case of a case where the resolution is relatively low (for example, when the vertex information is about one million points), the probability that the same Octree pattern occurs is decreased. Therefore, there has been a possibility that sufficient compressing efficiency cannot be obtained. That is, there has been a possibility that encoding efficiency is decreased.

It is to be noted that the DAG is a process aimed to reduce the capacity in a case where data is stored in a recording medium or stored in a memory when the data is processed in a GPU or the like, and data transmission is not considered. Therefore, the data structure at the time of transmission and the like are not defined.

<Voxel Data Encoding>

Therefore, for example, as illustrated in FIG. 6, in voxel data 60 (voxelized three-dimensional data), not only in a case where the distribution pattern of values of voxel data coincide with each other (as with DAG) as in the case of the block 61 and the block 62 including predetermined number of voxels, but also in a case where the distributions of values of voxel data approximate each other as in the case of the block 61 (block 62) and the block 63, (the distribution patterns of the two blocks are considered to be the same and) merging is performed.

In other words, only in a case where the distributions of values of voxel data do not coincide with or approximate each other, such as in the case of the block 61 to the block 63 and the block 64, (the distribution patterns of values of voxel data of the two blocks are considered to differ from each other, and) merging is not performed.

That is, strength of correlation of the distribution pattern of values of voxel data between the blocks is obtained for the voxel data 60, and each block is subjected to merging as described above on the basis of the strength of the correlation. By doing so, the amount of information can be reduced. Since merging can be performed also in the case where the distribution patterns approximate each other as described above, the amount of information can be reduced more as compared with the case of DAG. In other words, a decrease in encoding efficiency can be suppressed.

It is to be noted that, in FIG. 6, the distribution patterns of values of voxel data are compared for the block including 4×4×4 voxels, but the size (number of voxels) of the block to be compared may be any size and is not limited to 4×4×4.

It should be noted that, although the present technology will be described below by taking a point cloud as an example of encoding target data, the present technology is not limited to a point cloud, and can be applied to any encoding target as long as it is data that represents a three-dimensional structure and can be encoded using voxels, such as a mesh. Further, the encoding target may be a moving image or a still image.

2. First Embodiment

<Encoding Apparatus>

FIG. 7 is a block diagram illustrating a main configuration example of an encoding apparatus that is an embodiment of an information processing apparatus to which the present technology is applied. An encoding apparatus 100 illustrated in FIG. 7 encodes point cloud data inputted as an encoding target with the use of a voxel, and outputs the obtained encoded data or the like. On that occasion, the encoding apparatus 100 performs this encoding by a method to which the present technology is applied, as described below.

As illustrated in in FIG. 7, the encoding apparatus 100 includes a controller 101, a preprocessing unit 111, a bounding box setting unit 112, a voxel setting unit 113, a signal string generating unit 114, and an encoding unit 115.

The controller 101 performs a process related to control of each processing unit in the encoding apparatus 100. For example, the controller 101 controls executing or skipping of a process by each processing unit. For example, the controller 101 performs such control on the basis of predetermined control information. By doing so, the controller 101 can suppress unnecessary execution of a process, and can suppress an increase in a load.

The controller 101 may have any configuration. For example, the controller 101 may include a CPU (Central Processing Unit), a ROM (Read Only Memory), a RAM (Random Access Memory), and the like, and the CPU may load programs, data, and the like stored in the ROM and the like into the RAM and execute them, thereby performing the process.

The preprocessing unit 111 is controlled by the controller 101, performs a predetermined process as a preprocess on the encoding target (point cloud data) inputted to the encoding apparatus 100, and supplies the processed data to the bounding box setting unit 112.

For example, the controller 101 causes the preprocessing unit 111 to execute the preprocess in a case where the execution of the preproces is permitted (not prohibited) in accordance with the control information that permits or prohibits the execution of the preprocess. Further, for example, the controller 101 causes the preprocessing unit 111 to execute the preprocess on the encoding target for which the execution of the preprocess is permitted (not prohibited) in accordance with control information indicating a range of the encoding target for which the execution of the preprocess is permitted or prohibited. Further, for example, the controller 101 causes the preprocessing unit 111 to execute a process whose execution is permitted (not prohibited) in accordance with control information specifying a process content whose execution is to be permitted or prohibited. By doing so, it is possible to suppress unnecessary execution of a preprocess and to suppress an increase in a load.

It is to be noted that the content of the preprocess can be any content. For example, the preprocessing unit 111 may perform a process of reducing a noise as the preprocess, or may perform a process of varying a resolution (number of points) as the preprocess. Further, for example, the arrangement of each point may be so updated that the density of the point groups is uniform or a desired bias is provided. Further, for example, data that is not a point cloud, such as image information having depth information, may be inputted to the encoding apparatus 100, and the preprocessing unit 111 may convert the inputted data into point cloud data as the preprocess.

The preprocessing unit 111 may have any configuration. For example, the preprocessing unit 111 may include a CPU, a ROM, a RAM, and the like, and the CPU may load programs, data, and the like stored in the ROM and the like into the RAM and execute them, thereby performing the preprocess.

The bounding box setting unit 112 is controlled by the controller 101 and performs a process related to setting of a bounding box directed to normalizing of the position information of the encoding target.

For example, the controller 101 causes the bounding box setting unit 112 to set a bounding box in a case where the bounding box setting is permitted (not prohibited) in accordance with the control information that permits or prohibits the setting of the bounding box. Further, for example, the controller 101 causes the bounding box setting unit 112 to set the bounding box for an encoding target whose bounding box setting is permitted (not prohibited) in accordance with the control information indicating the range of the encoding target whose bounding box setting is to be permitted or prohibited. Further, for example, the controller 101 causes the bounding box setting unit 112 to set the bounding box with the use of a parameter that is permitted (not prohibited) to be used in accordance with the control information related to permission or prohibition of the parameter used for the setting of the bounding box. By doing so, it is possible to suppress unnecessary setting of the bounding box and unnecessary use of parameters, and it is possible to suppress an increase in a load.

For example, the bounding box setting unit 112 sets a bounding box for each object to be encoded. For example, as illustrated in A of FIG. 8, in a case where an object 131, an object 132, and the like are expressed by point cloud data, the bounding box setting unit 112 so sets a bounding box 141, a bounding box 142, and the like that they include the object 131, the object 132, and the like, respectively, as illustrated in B of FIG. 8. Returning to FIG. 7, when the bounding box is set, the bounding box setting unit 112 supplies information related to the bounding box to the voxel setting unit 113.

It is to be noted that the bounding box setting unit 112 may have any configuration. For example, the bounding box setting unit 112 may include a CPU, a ROM, a RAM, and the like, and the CPU may load programs, data, and the like stored in the ROM and the like into the RAM and execute them, thereby performing a process related to the setting of the bounding box.

The voxel setting unit 113 is controlled by the controller 101 and performs a process related to setting of a voxel directed to quantizing of the position information of the encoding target.

For example, the controller 101 causes the voxel setting unit 113 to set the voxel in a case where the setting of the voxel is permitted (not prohibited) in accordance with the control information that permits or prohibits the setting of the voxel. Further, for example, the controller 101 causes the voxel setting unit 113 to set the voxel for an encoding target whose setting of the voxel is permitted (not prohibited) in accordance with the control information indicating the range of the encoding target for which the setting of the voxel is permitted or prohibited. Further, for example, the controller 101 causes the voxel setting unit 113 to set the voxel with the use of a parameter that is permitted (not prohibited) to be used in accordance with control information related to permission or prohibition of a parameter used for setting a voxel. By doing so, it is possible to suppress unnecessary setting of voxels and unnecessary use of parameters, and it is possible to suppress an increase in a load.

For example, the voxel setting unit 113 sets a voxel in the bounding box set by the bounding box setting unit 112. For example, as illustrated in C of FIG. 8, the voxel setting unit 113 divides the bounding box 141 and sets a voxel 151. That is, the voxel setting unit 113 quantizes (i.e., voxelizes) the point cloud data in the bounding box by a voxel. It is to be noted that, in a case where there is a plurality of bounding boxes, the voxel setting unit 113 voxelizes the point cloud data for each bounding box. That is, in a case of the example in B of FIG. 8, the voxel setting unit 113 performs a similar process on the bounding box 142. When the voxel is set as described above, the voxel setting unit 113 supplies the voxelized point cloud data (also referred to as voxel data) (information related to a data structure directed to quantizing of position information), attribute information, and the like to the signal string generating unit 114.

It is to be noted that the voxel setting unit 113 may have any configuration. For example, the voxel setting unit 113 may include a CPU, a ROM, a RAM, and the like, and the CPU may load programs, data, and the like stored in the ROM and the like into the RAM and execute them, thereby performing a process related to setting of a voxel.

The signal string generating unit 114 is controlled by the controller 101 and performs a process related to generation of a signal string.

For example, the controller 101 causes the signal string generating unit 114 to generate a signal string in a case where the generation of the signal string is permitted (not prohibited) in accordance with control information that permits or prohibits the generation of the signal string. Further, for example, the controller 101 causes the signal string generating unit 114 to generate a signal string for an encoding target for which generation of a signal string is permitted (not prohibited) in accordance with control information indicating a range of an encoding target for which generation of a signal string is to be permitted or prohibited. By doing so, it is possible to suppress unnecessary generation of a signal string and to suppress an increase in a load.

For example, the signal string generating unit 114 encodes voxel data obtained by quantizing the point cloud data (for example, voxel data generated by the voxel setting unit 113 as illustrated in C of FIG. 8) with the use of the correlation of the value distribution pattern of values of voxel data (generates correlation information). For example, the signal string generating unit 114 encodes the voxel data of each block, which is a partial region of the space represented by the voxel data, to generate the correlation information. The signal string generating unit 114 converts the generated correlation information and other information into a signal string, and supplies the signal string to the encoding unit 115.

It is to be noted that the signal string generating unit 114 may have any configuration. For example, the signal string generating unit 114 may include a CPU, a ROM, a RAM, and the like, and the CPU may load programs, data, and the like stored in the ROM and the like into the RAM and execute them, thereby performing a process related to generation of a signal string.

The encoding unit 115 is controlled by the controller 101 and performs a process related to encoding of the supplied signal string.

For example, the controller 101 causes the encoding unit 115 to encode the signal string in a case where the encoding of the signal string is permitted (not prohibited) in accordance with the control information that permits or prohibits the encoding of the signal string. Further, for example, the controller 101 causes the encoding unit 115 to encode a signal string for an encoding target for which encoding of the signal string is permitted (not prohibited) in accordance with control information indicating a range of an encoding target for which the encoding of the signal string is to be permitted or prohibited. By doing so, it is possible to suppress unnecessary encoding of a signal string and to suppress an increase in a load.

The encoding unit 115 encodes the supplied signal string, and generates encoded data (bit stream), for example. That is, the encoding unit 115 encodes the correlation information generated by the signal string generating unit 114, and generates a bit stream including the correlation information.

This method of encoding the signal string may be any method. For example, the encoding unit 115 may encode a signal string by variable length encoding (VLC (Variable Length Code)). D of FIG. 8 illustrates an example of a state of an encoded signal string. It is to be noted that the encoding unit 115 encodes not only position information but also attribute information (for example, color information, an a channel, a normal vector, and the like).

Further, the encoding unit 115 also encodes related information other than the point cloud data, such as control information, as appropriate, and stores it in a header, a parameter set, or the like. For example, the encoding unit 115 may encode information indicating a correspondence relationship between a unique pattern and an index, and store it in a header, a parameter set, or the like. The unique pattern is a distribution pattern of values of voxel data set on the basis of the strength of correlation of a distribution pattern of values of voxel data between blocks which are partial regions of the space expressed by the voxel data. The index is directed to identifying of the unique pattern.

The encoding unit 115 associates the above-described bit streams of various types of information with each other. Here, the term "associate" means, for example, that one data can be used (linked) to process the other data. In other words, the data associated with each other may be grouped together as one piece of data, or may be different pieces of data. For example, control information associated with encoded data may be transmitted on a transmission path different from that of the encoded data. Further, for example, the control information associated with the encoded data may be recorded in a recording medium different from that for the encoded data (or in a different recording region of the same recording medium). It is to be noted that the "association" may be performed on a portion of data instead of the entire data. For example, association with each other may be performed in any unit such as a plurality of frames, one frame, or a portion within a frame.

The encoding unit 115 outputs the encoded data (bit stream) obtained by such encoding to outside of the encoding apparatus 100. The data (encoded data, control information, or the like) outputted from the encoding apparatus 100 may be decoded by an unillustrated subsequent-stage processor, for example, to restore the data of the point cloud, may be transmitted by an unillustrated communication unit to be transmitted to another apparatus such as a decoding apparatus via a predetermined transmission path, or may be recorded in an unillustrated recording medium.

It is to be noted that the encoding unit 115 may have any configuration. For example, the encoding unit 115 may include a CPU, a ROM, a RAM, and the like, and the CPU may load programs, data, and the like stored in the ROM and the like into the RAM and execute them, thereby performing a process related to encoding.

Example 1 of Voxel Data Encoding Method

The voxel data encoding method by the signal string generating unit 114 using the strength of the correlation described above may be any method. An example of the method is illustrated in a table in FIG. 9. For example, the signal string generating unit 114 may encode the voxel data by a method described in a row of id=1 in the table illustrated in FIG. 9. In this case, a unique index (Index) is assigned to a node (Node) in a screen and used for an encoding block. That is, the voxel data is encoded with the use of the unique pattern and the index (Index).

In this case, as illustrated in A of FIG. 10, the signal string generating unit 114 reduces redundant nodes from all the nodes (Node) in the screen, detects unique patterns Ui, and assigns different indices (Idx) to the respective detected unique patterns Ui. Then, as illustrated in B of FIG. 10, the signal string generating unit 114 replaces the voxel data of each block of the voxel data 60 with an index assigned to the unique pattern Ui whose distribution pattern of values of voxel data coincide with or approximate that of the block. In other words, all of the nodes are expressed with the use of indices.

Then, the encoding unit 115 encodes information indicating the correspondence relationship between the unique pattern and the index as illustrated in A of FIG. 10, a list (IdxLst) of indices replacing the voxel patterns of the respective blocks as illustrated in B of FIG. 10, and the like, and generates a bit stream.

<Signal String Generating Unit>

Figure 11:
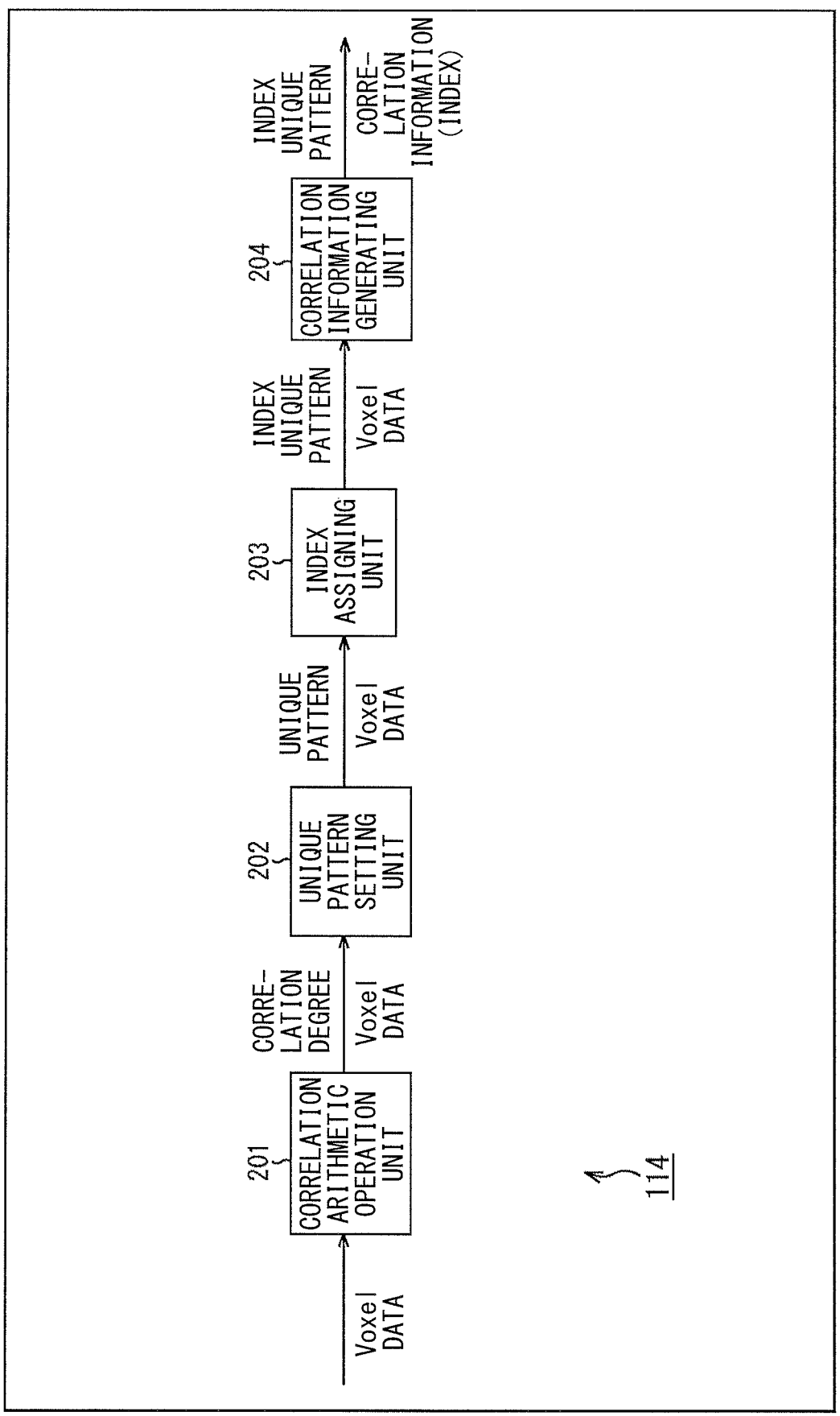
FIG. 11 is a block diagram illustrating a main configuration example of a signal string generating unit.

FIG. 11 is a block diagram illustrating a main configuration example of the signal string generating unit 114 (FIG. 7) in this case. As illustrated in FIG. 11, the signal string generating unit 114 in this case includes a correlation arithmetic operation unit 201, a unique pattern setting unit 202, an index assigning unit 203, and a correlation information generating unit 204.

The correlation arithmetic operation unit 201 performs a process related to calculation of the strength of correlation (also referred to as a correlation degree) of the distribution pattern of values of voxel data. For example, the correlation arithmetic operation unit 201 calculates the correlation degree of the distribution pattern of values of voxel data between the blocks, which are partial regions of the space represented by the voxel data, for the voxel data supplied from the voxel setting unit 113.

It is to be noted that the comparison can be made between any blocks (i.e., between any voxel groups). For example, the correlation arithmetic operation unit 201 may use the nodes of the Octree pattern as a block and calculate the correlation degree between the nodes, may calculate the correlation degree between the node and a block which is not a node, or may calculate the correlation degree between blocks that are not nodes. Further, this method of calculating the correlation degree may be any method.

The correlation arithmetic operation unit 201 supplies information indicating the calculated correlation degree to the unique pattern setting unit 202 together with the supplied voxel data.

It is to be noted that the correlation arithmetic operation unit 201 may have any configuration. For example, the correlation arithmetic operation unit 201 may include a CPU, a ROM, a RAM, and the like, and the CPU may load programs, data, and the like stored in the ROM and the like into the RAM and execute them, thereby performing a process related to calculation of the correlation degree.

The unique pattern setting unit 202 performs a process related to setting of a unique pattern. For example, the unique pattern setting unit 202 uses the correlation degree supplied from the correlation arithmetic operation unit 201 to classify (for example, perform merging) blocks in accordance with whether the distribution patterns coincide with or approximate each other.

Then, the unique pattern setting unit 202 sets the unique pattern Ui on the basis of a result of the classification. The unique patterns Ui are voxel data having distribution patterns different from each other among those selected as the unique patterns Ui, such as the block 61 and the block 64 in A of FIG. 10A, for example. That is, the distribution pattern of values of voxel data of one unique pattern Ui differs from the distribution pattern of values of voxel data of another unique pattern Ui.

When such unique patterns Ui are set, as described above, the unique pattern setting unit 202 considers that the distribution patterns of the both blocks are the same not only in a case where the distribution patterns of values of voxel data of the compared blocks coincide with each other, but also in a case where they approximate each other, and performs merging. In other words, the unique pattern setting unit 202 determines that the distribution patterns of both blocks differ from each other only in a case where the distribution patterns do not coincide with or approximate each other in the compared blocks. It is to be noted that a reference for judging that the distribution patterns approximate each other may be any reference.

By doing so, the unique pattern setting unit 202 can set the unique patterns Ui whose distribution patterns are different from each other (i.e., whose distribution patterns do not coincide with or approximate each other). The unique pattern setting unit 202 supplies the set unique pattern Ui to the index assigning unit 203 together with the supplied voxel data.

It is to be noted that the unique pattern setting unit 202 may have any configuration. For example, the unique pattern setting unit 202 may include a CPU, a ROM, a RAM, and the like, and the CPU may load programs, data, and the like stored in the ROM and the like into the RAM and execute them, thereby performing a process related to setting of the unique pattern.

The index assigning unit 203 performs a process related to assignment of an index. For example, the index assigning unit 203 assigns an index to the unique pattern supplied from the unique pattern setting unit 202.

At this time, the index assigning unit 203 assigns different indices to the respective unique patterns as illustrated in A of FIG. 10. It is to be noted that a way of assigning the index may be any way. That is, as long as different indices are assigned to the respective unique patterns, any value of index may be assigned to each unique pattern. For example, the index assigning unit 203 may assign an index of a smaller amount of information to a unique pattern having a higher frequency of occurrence in the voxel data to be encoded. By doing so, the information amount of the correlation information can be further reduced, and a decrease in encoding efficiency can be further suppressed.

When the indices are assigned to all of the unique patterns Ui as described above, the index assigning unit 203 supplies information indicating the correspondence relationship between the unique patterns and the indices, which is the result of the assignment, to the correlation information generating unit 204 together with the supplied voxel data. The information indicating the correspondence relationship between the unique patterns and the indices is information indicating each set unique pattern Ui and an index assigned to each unique pattern Ui. For example, the information includes a list of unique patterns and a list of indices configured to indicate the correspondence relationship between the unique patterns and the indices.

It is to be noted that the index assigning unit 203 may have any configuration. For example, the index assigning unit 203 may include a CPU, a ROM, a RAM, and the like, and the CPU may load programs, data, and the like stored in the ROM and the like into the RAM and execute them, thereby performing a process related to assignment of an index.

The correlation information generating unit 204 performs a process related to generation of correlation data. For example, the correlation information generating unit 204 converts the voxel data of a current block, which is the block to be processed, into an index assigned to a unique pattern that coincides with or approximates the distribution pattern of values of voxel data of the current block, and generates correlation information including the index.

The correlation information is information obtained by encoding voxel data with the use of the correlation of the distribution pattern of values of voxel data. The correlation information generating unit 204 encodes the voxel data to be encoded by replacing each block of the voxel data to be encoded with (the index of) the above-described unique pattern Ui. That is, in this case, the correlation information includes the index of the unique pattern Ui.

More specifically, the correlation information generating unit 204 holds information indicating the correspondence relationship between the unique patterns and indices supplied from the index assigning unit 203. The correlation information generating unit 204 specifies the unique pattern Ui corresponding to the distribution pattern of each block on the basis of the classification (merging) of the distribution pattern of values of voxel data of each block that has been performed when the unique pattern is set by the unique pattern setting unit 202. That is, a unique pattern Ui whose distribution pattern coincides with or approximates that of each block is specified. Then, the correlation information generating unit 204 specifies the index corresponding to the specified unique pattern Ui on the basis of the held information. Then, the correlation information generating unit 204 replaces the voxel data of each block with the specified index (performs conversion).

By doing so, as a result of the encoding, a list of indices (IdxLst) as illustrated in B of FIG. 10 is obtained. The correlation information generating unit 204 supplies the correlation information (index) as a signal string to the encoding unit 115 in place of the supplied voxel data of each block. Further, the correlation information generating unit 204 also supplies the held information indicating the correspondence relationship between the unique patterns and the indices to the encoding unit 115 as a signal string. That is, these pieces of information are encoded as described above by the encoding unit 115, included in a bit stream, and transmitted to the decoding side or recorded on a recording medium.

As described above, by converting the voxel data of each block into an index as illustrated in B of FIG. 10 with the use of the index assigned to the unique pattern Ui illustrated in A of FIG. 10, the voxel data having the same distribution pattern are merged. Therefore, the correlation information generating unit 204 can reduce redundancy of the bit stream. Further, as described above, the unique pattern Ui is set by merging not only the blocks having the distribution patterns of values of voxel data that coincide with each other but also the blocks having the distribution patterns approximate each other. Therefore, the correlation information generating unit 204 can further reduce the redundancy of the bit stream. Accordingly, the signal string generating unit 114 can suppress a decrease in encoding efficiency.

It is to be noted that the correlation information generating unit 204 may have any configuration. For example, the correlation information generating unit 204 may include a CPU, a ROM, a RAM, and the like, and the CPU may load programs, data, and the like stored in the ROM and the like into the RAM and execute them, thereby performing a process related to generation of the correlation information.

<Flow of Encoding Process>

An example of a flow of an encoding process executed by the encoding apparatus 100 having the above-described configuration is described with reference to a flowchart in FIG. 12.

When the encoding process is started, the preprocessing unit 111 performs a preprocess on the inputted data in step S101.

In step S102, the bounding box setting unit 112 sets a bounding box for the preprocessed data.

In step S103, the voxel setting unit 113 sets a voxel in the bounding box set in step S102.

In step S104, the signal string generating unit 114 generates a signal string on the basis of a data structure.

In step S105, the encoding unit 115 encodes the signal string generated by the process in step S104.

In step S106, the encoding unit 115 outputs a bit stream obtained by the encoding to the outside of the encoding apparatus 100. The bit stream is transmitted to, for example, decoding side (a decoding apparatus or the like), or recorded on a recording medium.

When the process in step S106 is completed, the encoding process is completed. For example, in a case where the encoding target is a moving image, this series of processes is performed for each frame.

<Flow of Signal String Generation Process>

Next, referring to a flowchart of FIG. 13, an example of a flow of the signal string generation process executed in step S104 of FIG. 12 will be described.

When the signal string generation process is started, the correlation arithmetic operation unit 201 obtains the strength of correlation (correlation degree) of the distribution pattern of values of voxel data between blocks in step S121.

In step S122, the unique pattern setting unit 202 sets the unique pattern Ui on the basis of the correlation degree obtained in step S121. At this time, as described above, the unique pattern setting unit 202 considers that the distribution patterns of both blocks are the same not only in a case where the distribution patterns of values of voxel data between the compared blocks coincide with each other, but also in a case where they approximate each other.

In step S123, the index assigning unit 203 assigns different indices to the respective unique patterns Ui set in step S122.

In step S124, the correlation information generating unit 204 replaces the voxel data of each block to be encoded with the index of the unique pattern Ui that coincides with or approximates the distribution pattern of values of voxel data of the block on the basis of the result of assigning the index to the unique pattern Ui in step S123, and generates a signal string of correlation information. Further, the correlation information generating unit 204 also generates a signal string of information indicating a correspondence relationship between the unique pattern and the index.

Figure 12:
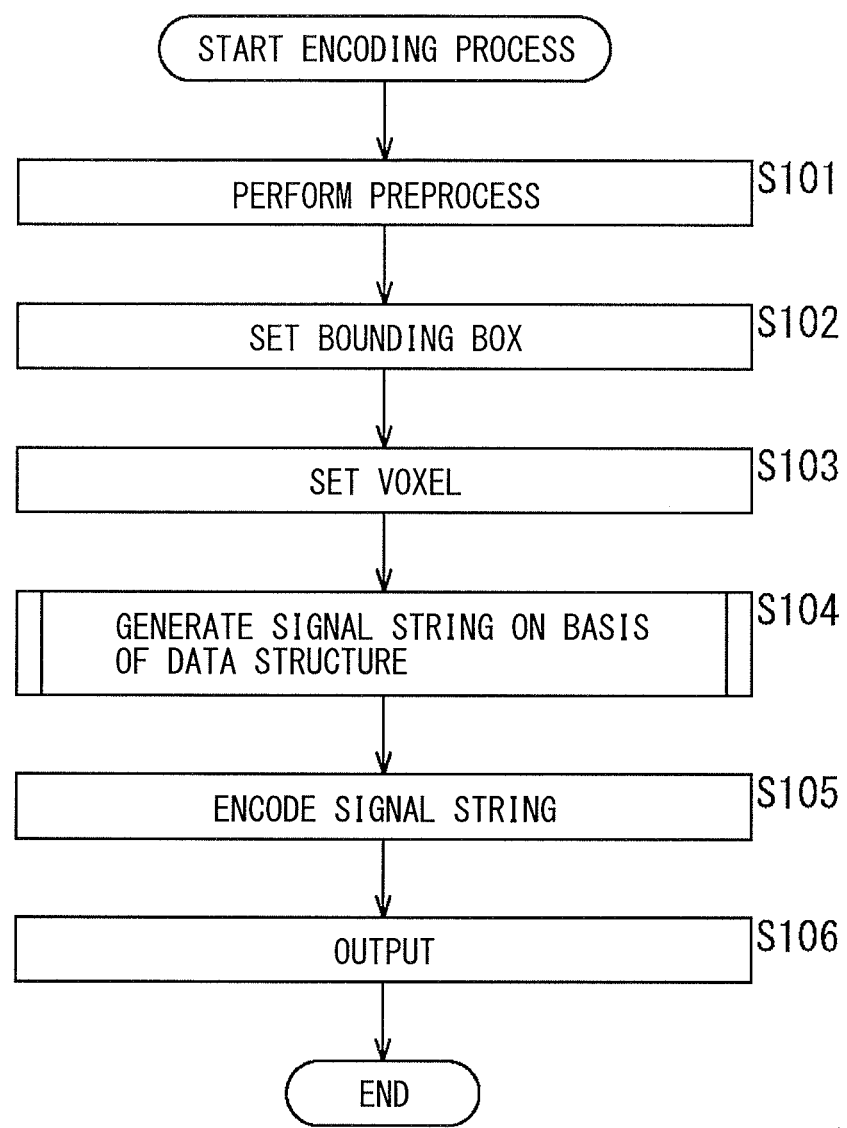
FIG. 12 is a flowchart describing an example of a flow of an encoding process.

When the process in step S124 is completed, the signal string generation process is completed, and the process returns to FIG. 12.

By executing each process as described above, the encoding apparatus 100 can suppress a decrease in encoding efficiency as described above.

Example 2 of Voxel Data Encoding Method

Further, for example, the signal string generating unit 114 may encode the voxel data by a method described in a row of id=2 in the table illustrated in FIG. 9. In this case, spatial coordinate information (also referred to as reference spatial coordinate information) specifying a block (node (Node)) to be referred to is used for the encoding block. That is, the signal string generating unit 114 searches for a block highly correlated to the current block, for example, from the encoded blocks (nodes), and the encoding unit 115 encodes a signal string such as an absolute position or a relative position (vector) of the block.

The reference spatial coordinate information is information indicating a position of a peripheral block (block to be referred to) whose distribution pattern of values of voxel data coincides with or approximates that of the current block in a peripheral block located in the periphery of the current block (target block of reference) which is the block to be processed. The signal string generating unit 114 encodes the voxel data of the current block by converting it into the reference spatial coordinate information. That is, the signal string generating unit 114 generates correlation information including the reference spatial coordinate information.

The reference spatial coordinate information may include information indicating the position of the block to be referred to by an absolute position (e.g., spatial coordinates of the block to be referred to (also referred to as to-be-referred spatial coordinate information)), or may include information indicating the position of the block to be referred to by a relative position to the reference target block (current block) (e.g., a vector from the reference target to the one to be referred to (also referred to as a reference vector)).

Then, the encoding unit 115 encodes such correlation information including the reference spatial coordinate information to generate a bit stream.

<Signal String Generating Unit>

Figure 14:
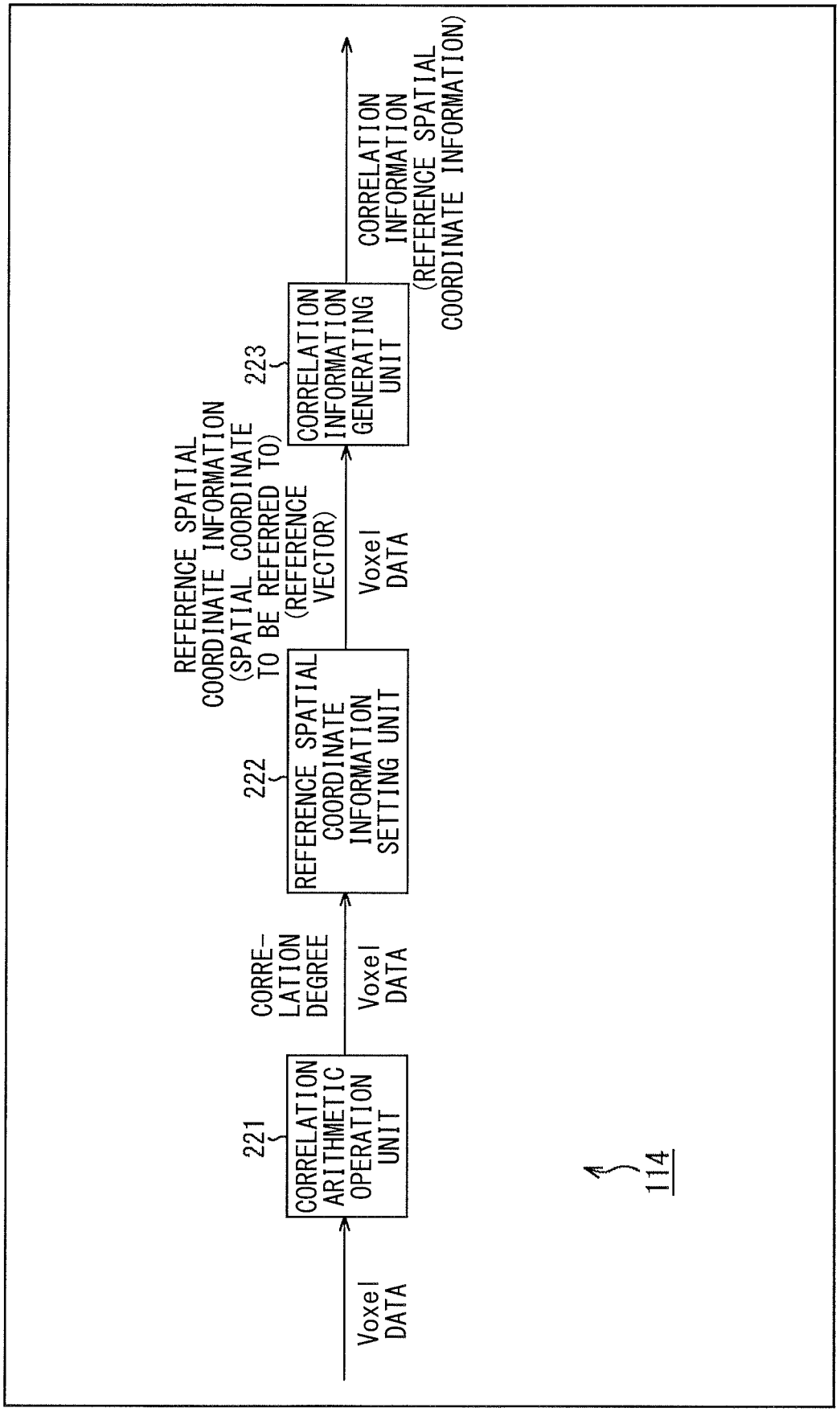
FIG. 14 is a block diagram illustrating a main configuration example of a signal string generating unit.

FIG. 14 is a block diagram illustrating a main configuration example of the signal string generating unit 114 (FIG. 7) in this case. As illustrated in FIG. 14, the signal string generating unit 114 in this case includes a correlation arithmetic operation unit 221, a reference spatial coordinate information setting unit 222, and a correlation information generating unit 223.

The correlation arithmetic operation unit 221 is a processing unit similar to the correlation arithmetic operation unit 201, and performs a process similar to that of the correlation arithmetic operation unit 201. That is, the correlation arithmetic operation unit 221 performs a process related to calculation of the strength of correlation (correlation degree) of the distribution pattern of values of voxel data. For example, the correlation arithmetic operation unit 221 calculates the correlation degree of the distribution pattern of values of voxel data between blocks, which are partial regions of the space represented by the voxel data, for the voxel data supplied from the voxel setting unit 113. It is to be noted that this comparison can be made between any blocks. Further, this method of calculating the correlation degree may be any method.

The correlation arithmetic operation unit 221 supplies the information indicating the calculated correlation degree to the reference spatial coordinate information setting unit 222 together with the supplied voxel data.

It is to be noted that the correlation arithmetic operation unit 221 may have any configuration. For example, the correlation arithmetic operation unit 221 may include a CPU, a ROM, a RAM, and the like, and the CPU may load programs, data, and the like stored in the ROM and the like into the RAM and execute them, thereby performing a process related to calculation of the correlation degree.

The reference spatial coordinate information setting unit 222 performs a process related to setting of the reference spatial coordinate information. For example, the reference spatial coordinate information setting unit 222 specifies a peripheral block highly correlated to the current block as a block to be referred on the basis of the correlation degree supplied from the correlation arithmetic operation unit 201, and sets reference spatial coordinate information indicating the position of the peripheral block. More specifically, on the basis of the correlation degree supplied from the correlation arithmetic operation unit 201, the reference spatial coordinate information setting unit 222 determines whether the distribution pattern of voxel data coincides with or approximates that of the current block for each candidate peripheral block. It is to be noted that a reference for judging that the distribution patterns approximate each other may be any reference. For example, the reference spatial coordinate information setting unit 222 determines that the peripheral block having the highest correlation degree to the current block is the peripheral block having the distribution pattern approximating that of the current block. Further, for example, the reference spatial coordinate information setting unit 222 determines that the peripheral block whose correlation degree to the current block is higher than a predetermined reference is the peripheral block whose distribution pattern approximates that of the current block.

It is to be noted that the peripheral block may be a block located at a spatial periphery of the current block. That is, the peripheral block may be a block in the same frame as that of the current block. Further, the peripheral block may be a block located at a temporal periphery of the current block. That is, the peripheral block may be a block in a frame that differs from that of the current block. For example, the peripheral block may be a block (collocated block) at the same position as that of the current block in a frame that differs from that of the current block, or a block located at the periphery of the collocated block. Further, the peripheral block may be a peripherally-located block between sequences (views, layers, components, etc.) That is, the peripheral block may be a block in a sequence differing from that of the current block. For example, the peripheral block may be a block (collocated block) at the same position in the same frame as that of the current block in a sequence different from that of the current block, or a block located at the periphery of the collocated block. Further, for example, the peripheral block may be a block in a frame different from that of the current block in a sequence different from that of the current block.

The reference spatial coordinate information setting unit 222 supplies the set reference spatial coordinate information to the correlation information generating unit 223 together with the supplied voxel data.

It is to be noted that, in a case where a peripheral block whose distribution pattern coincides with or approximates that of the current block cannot be detected (in a case where such a peripheral block does not exist), the reference spatial coordinate information setting unit 222 does not encode the voxel data of the current block (does not replace it with the correlation information). That is, in this case, the reference spatial coordinate information setting unit 222 omits the setting of the reference spatial coordinate corresponding to the block.

It is to be noted that the reference spatial coordinate information setting unit 222 may have any configuration. For example, the reference spatial coordinate information setting unit 222 may include a CPU, a ROM, a RAM, and the like, and the CPU may load programs, data, and the like stored in the ROM and the like into the RAM and execute them, thereby performing a process related to setting of the unique pattern.

The correlation information generating unit 223 performs a process related to generation of correlation information. For example, the correlation information generating unit 223 converts the voxel data in the current block, which is the block to be processed, into reference spatial coordinate information, which is information indicating the position of a peripheral block whose distribution pattern of values of voxel data coincides with or approximates that of the current block, in the peripheral block located at the periphery of the current block. The correlation information generating unit 223 generates correlation information including the reference spatial coordinate information.

That is, the correlation information generating unit 223 encodes the voxel data to be encoded by replacing each block of the voxel data to be encoded with the reference spatial coordinate information supplied from the reference spatial coordinate information setting unit 222. That is, in this case, the correlation information includes reference spatial coordinate information (to-be-referred spatial coordinate or reference vector).

However, for the block for which the reference spatial coordinate information has not been set by the reference spatial coordinate information setting unit 222 (that is, the block for which a block to be referred to has not be found), the generation of the correlation information is omitted.

The correlation information generating unit 223 supplies the correlation information (reference spatial coordinate information) as a signal string to the encoding unit 115 in place of the supplied voxel data of each block for the block for which the correlation information has been generated. In addition, the correlation information generating unit 223 supplies the signal string of the supplied voxel data to the encoding unit 115 for the block for which the correlation information is not generated.

These signal strings are encoded as described above by the encoding unit 115, included in a bit stream, and transmitted to the decoding side or recorded on a recording medium.

By converting the voxel data of each block into the reference spatial coordinate information in this manner, the amount of information can be reduced. Further, when setting a reference relationship between the blocks, for example, if only the peripheral block whose distribution pattern of values of voxel data coincides with that of the current block is used as a candidate to be referred to, there is a possibility of an increase in cases where the one to be referred does not exist, and there may be a possibility that the amount of information cannot be sufficiently reduced.

In contrast, as described above, the correlation information generating unit 223 sets not only the peripheral block whose distribution pattern of values of voxel data coincides with that of the current block, but also the peripheral block whose distribution pattern of values of voxel data approximates that of the current block as the candidate to be referred to. As a result, it is possible to increase the possibility that a peripheral block which can be the one to be referred to for the current block exists. Therefore, more blocks can be converted into the reference spatial coordinate information, and the amount of information can be further reduced. Therefore, the signal string generating unit 114 can suppress a decrease in encoding efficiency.

It is to be noted that the correlation information generating unit 223 may have any configuration. For example, the correlation information generating unit 223 may include a CPU, a ROM, a RAM, and the like, and the CPU may load programs, data, and the like stored in the ROM and the like into the RAM and execute them, thereby performing a process related to generation of the correlation information.

<Flow of Signal String Generation Process>

Figure 15:
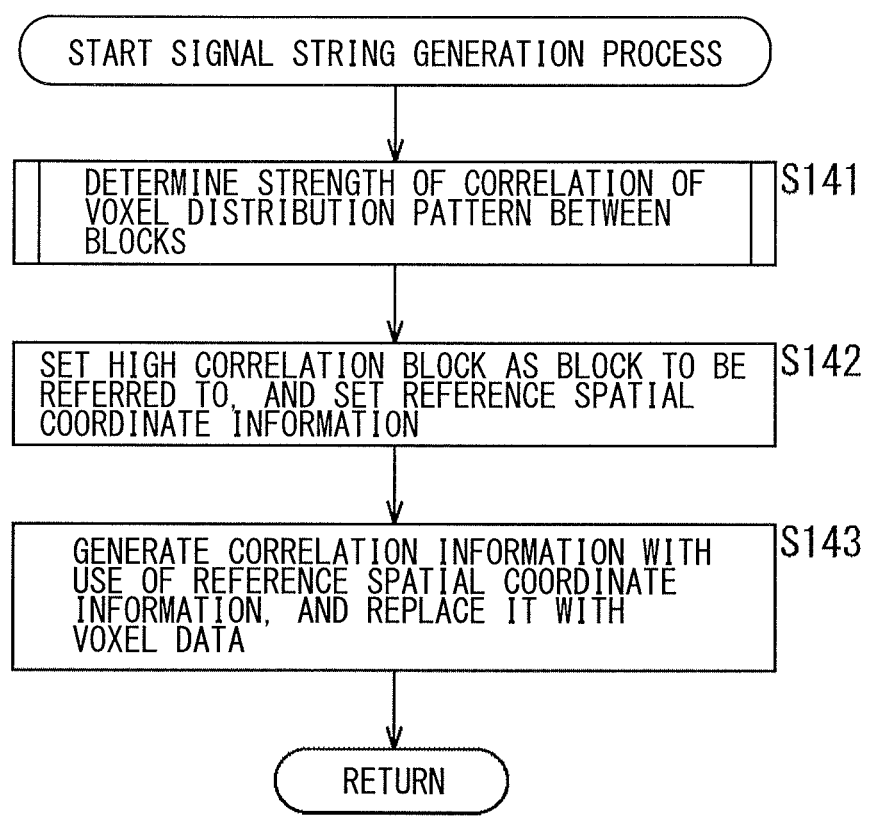
FIG. 15 is a flowchart illustrating an example of a flow of a signal string generation process.

Next, referring to a flowchart of FIG. 15, an example of a flow of the signal string generation process executed in step S104 of FIG. 12 in this case will be described.

When the signal string generation process is started, the correlation arithmetic operation unit 221 obtains the strength of correlation (correlation degree) of the distribution pattern of values of voxel data between blocks in step S141.

In step S142, the reference spatial coordinate information setting unit 222 sets the peripheral block highly correlated to the current block as a block to be referred to, and sets the reference spatial coordinate information.

In step S143, the correlation information generating unit 223 generates correlation information with the use of the reference spatial coordinate information set in step S142, and replaces it with voxel data. Then, the correlation information generating unit 223 generates a signal string including the correlation information. That is, the correlation information generating unit 223 generates the signal string of the correlation information for the block for which the one to be referred to exists, and generates the signal string of the voxel data for the block for which the one to be referred to does not exist.

When the process in step S143 is completed, the signal string generation process is completed, and the process returns to FIG. 12.

By executing each process as described above, the encoding apparatus 100 can suppress a decrease in encoding efficiency as described above.

It is to be noted that the method described in the row of id=2 in the table illustrated in FIG. 9 described above may be used in combination with the method described in the row of id=1 in the table illustrated in FIG. 9. That is, the correlation information including the index of the unique pattern and the correlation information including the reference spatial coordinate information may exist in a mixed manner.

Example 3 of Voxel Data Encoding Method

Further, for example, the signal string generating unit 114 may encode the voxel data by a method described in a row of id=3 in the table illustrated in FIG. 9. In this case, an index (Index) is assigned to a block (node (Node)) having a distribution pattern defined in advance, and it is used for an encoding block. That is, the signal string generating unit 114 searches for a block highly correlated to the current block, for example, from the predefined blocks, and the encoding unit 115 encodes the index thereof.

That is, in this case, a predetermined unique pattern (also referred to as a predefined unique pattern) is prepared in advance, and indices (also referred to as predefined indices) which differ from each other are assigned to the respective unique patterns. Instead of the unique pattern generated from the voxel data to be encoded as described above in <Example 1 of Voxel Data Encoding Method>, the signal string generating unit 114 converts each block into an index using the predefined unique pattern.

More specifically, the signal string generating unit 114 converts the voxel data of the current block into a predefined index assigned to the predefined unique pattern, of the predefined unique patterns, whose distribution pattern coincides with or approximates that of the current block, and generates correlation information including the predefined index.

It is to be noted that the predefined unique patterns differ from each other in the distribution pattern, similarly to the unique patterns described above in <Example 1 of Voxel Data Encoding Method>. That is, the distribution pattern of values of voxel data of one predefined unique pattern differs from the distribution pattern of values of voxel data of another predefined unique pattern.

<Signal String Generating Unit>

Figure 16:
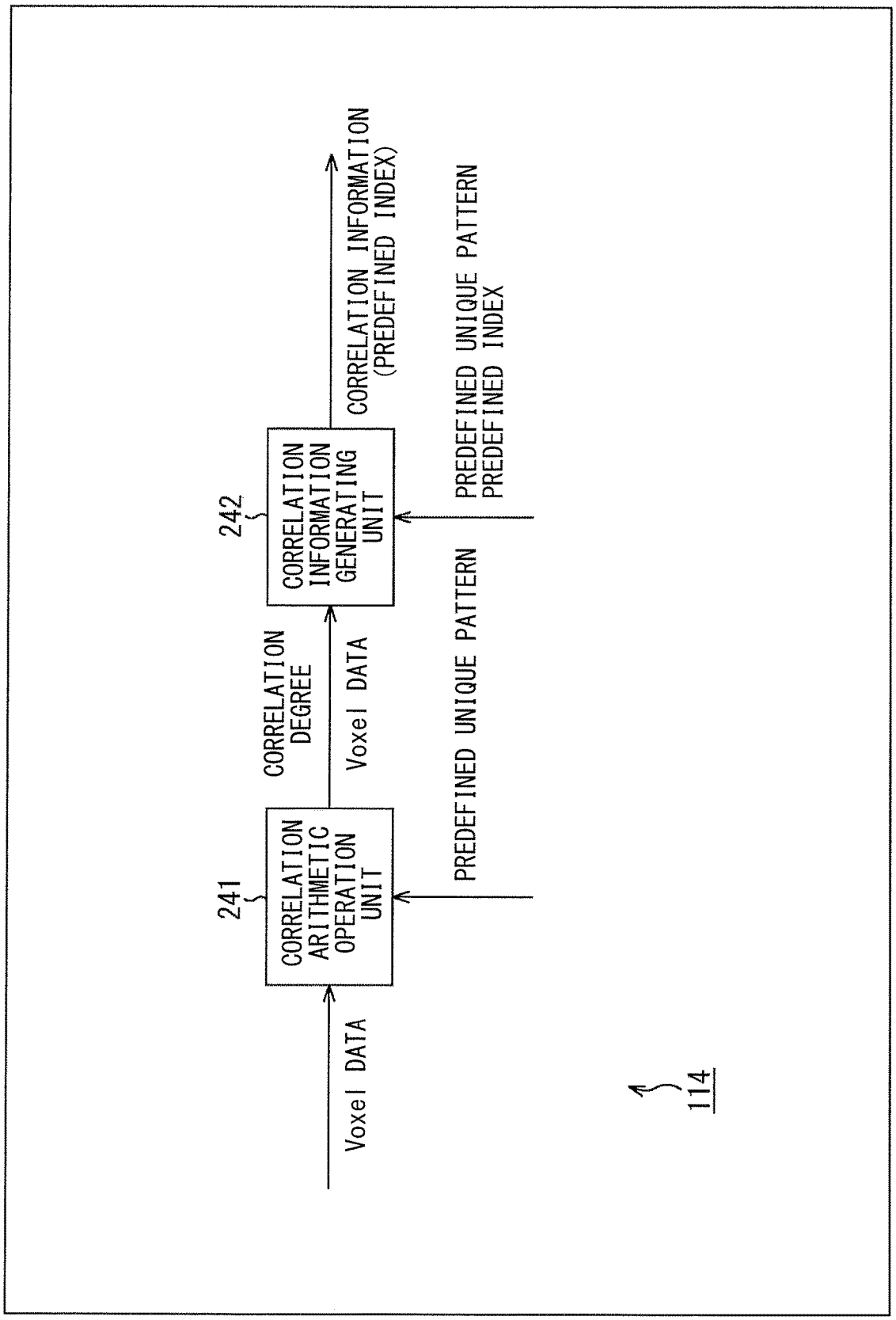
FIG. 16 is a block diagram illustrating a main configuration example of a signal string generating unit.

FIG. 16 is a block diagram illustrating a main configuration example of the signal string generating unit 114 (FIG. 7) in this case. As illustrated in FIG. 16, the signal string generating unit 114 in this case includes a correlation arithmetic operation unit 241 and a correlation information generating unit 242.

The correlation arithmetic operation unit 241 performs a process related to calculation of the strength of correlation (correlation degree) of the distribution pattern of values of voxel data. For example, the correlation arithmetic operation unit 241 acquires and holds (voxel data of) the predefined unique pattern. The correlation arithmetic operation unit 241 calculates, for each block of the voxel data supplied from the voxel setting unit 113, the correlation degree of the distribution pattern of values of voxel data with each of the predefined unique patterns. It is to be noted that this method of calculating the correlation degree may be any method. The correlation arithmetic operation unit 241 supplies the information indicating the calculated correlation degree to the correlation information generating unit 242 together with the supplied voxel data.

It is to be noted that the correlation arithmetic operation unit 241 may have any configuration. For example, the correlation arithmetic operation unit 241 may include a CPU, a ROM, a RAM, and the like, and the CPU may load programs, data, and the like stored in the ROM and the like into the RAM and execute them, thereby performing a process related to calculation of the correlation degree.

The correlation information generating unit 242 performs a process related to generation of correlation information. For example, the correlation information generating unit 242 converts the voxel data of the current block, which is the block to be processed, into a predefined index assigned to a predefined unique pattern that coincides with or approximates the distribution pattern of values of voxel data of the current block, and generates correlation information including the predefined index.

More specifically, the correlation information generating unit 242 acquires and holds information indicating the correspondence relationship between the predefined unique pattern and the predefined index. The information indicating the correspondence relationship between the predefined unique pattern and the predefined index is information indicating each predefined unique pattern and each predefined index. For example, the information includes a list of predefined unique patterns and a list of predefined indices configured to indicate the correspondence relationship between the predefined unique patterns and the predefined indices.

Then, the correlation information generating unit 242 specifies, for each block, a predefined unique pattern whose distribution pattern coincides with or approximates that of the block on the basis of the correlation degree supplied from the correlation arithmetic operation unit 241. In other words, the correlation information generating unit 242 determines that the distribution patterns differ and does not specify the predefined unique pattern only in a case where the distribution patterns do not coincide with or approximate each other. It is to be noted that a reference for judging that the distribution patterns approximate each other may be any reference.

Then, the correlation information generating unit 242 specifies a predefined index corresponding to the specified predefined unique pattern on the basis of the held information. Further, the correlation information generating unit 242 replaces the voxel data of each block with the specified predefined index (performs conversion).

By doing so, a list of predefined indices is obtained as a result of the encoding. The correlation information generating unit 242 supplies the correlation information (predefined index) to the encoding unit 115 as a signal string in place of the supplied voxel data of each block. This signal string is encoded as described above by the encoding unit 115, included in a bit stream, and transmitted to the decoding side or recorded on a recording medium.

It is to be noted that the correlation information generating unit 242 may have any configuration. For example, the correlation information generating unit 242 may include a CPU, a ROM, a RAM, and the like, and the CPU may load programs, data, and the like stored in the ROM and the like into the RAM and execute them, thereby performing a process related to generation of the correlation information.

As described above, by converting the voxel data of each block into an index with the use of the predefined index, voxel data having the same distribution pattern are merged. Therefore, the correlation information generating unit 242 can reduce the redundancy of the bit stream.

It is to be noted that, if the voxel data of the current block is replaced with the predefined index only in a case where the distribution pattern of values of voxel data of the current block coincides with the predefined unique pattern, the voxel data of a block whose distribution pattern does not coincide with the predefined unique pattern cannot be replaced with the predefined index.

In contrast, the correlation information generating unit 242 can replace, with the predefined index, also the voxel data in the block for which a predefined unique pattern whose distribution pattern approximates that of the block exists. Therefore, the amount of information can be further reduced. In other words, the signal string generating unit 114 can suppress a decrease in encoding efficiency.

<Flow of Signal String Generation Process>

Figure 17:
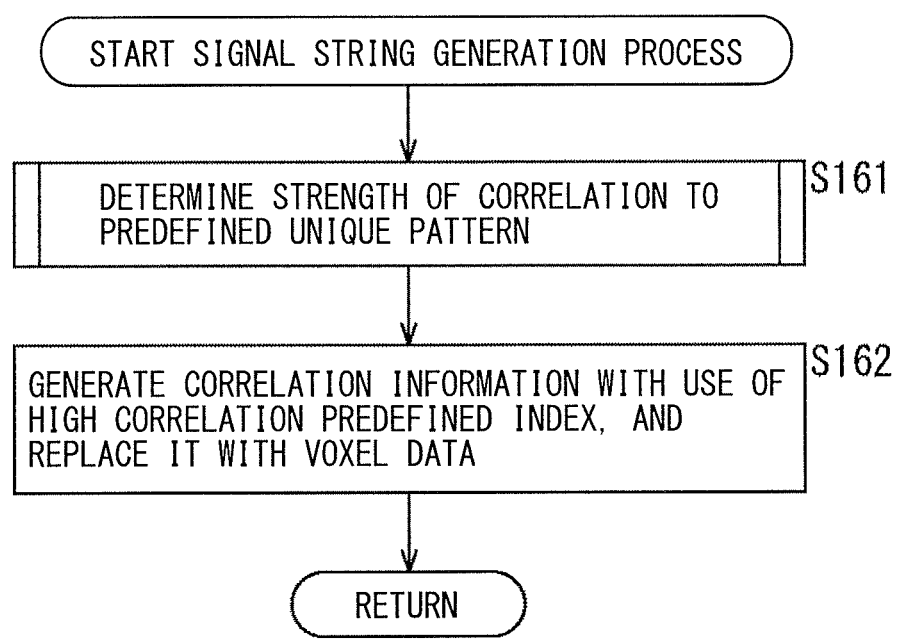
FIG. 17 is a flowchart illustrating an example of a flow of a signal string generation process.

Next, referring to a flowchart of FIG. 17, an example of a flow of the signal string generation process executed in step S104 of FIG. 12 in this case will be described.

When the signal string generation process is started, the correlation arithmetic operation unit 241 obtains the strength of correlation (correlation degree) between the distribution pattern of values of voxel data of each block and the predefined unique pattern in step S161.

In step S162, the correlation information generating unit 242 specifies a predefined index highly correlated to each block on the basis with the correlation degree, generates correlation information with the use of the specified predefined index, and replaces it with voxel data. Then, the correlation information generating unit 242 generates a signal string including the correlation information.

When the process in step S162 is completed, the signal string generation process is completed, and the process returns to FIG. 12.

By executing each process as described above, the encoding apparatus 100 can suppress a decrease in encoding efficiency as described above.

It is to be noted that the block whose distribution pattern does not coincide with or approximate the predefined unique pattern, the signal string of the voxel data may be supplied to the encoding unit 115. Further, the distribution pattern of such a block may be set as a unique pattern, or a peripheral block may be referred to. That is, the method described in the row of id=3 in the table illustrated in FIG. 9 described above may be used in combination with the method described in the row of id=1 or 2 in the table illustrated in FIG. 9. That is, the correlation information including the index of the unique pattern, the correlation information including the reference spatial coordinate information, and the correlation information including the predefined index may exist in a mixed manner.

Example 4 of Voxel Data Encoding Method

Further, for example, in a case where the voxel data to be encoded is a moving image (in a case where the voxel data to be encoded includes a plurality of frames), a method described in a row of id=4 in the table illustrated in FIG. 9 may be applied. That is, correlation between different frames may be used. In this case, time information that specifies the block (node (Node)) to be referred to is used for the encoding block. For example, the signal string generating unit 114 holds an encoded frame and searches for highly-correlated block from within the frame. If it is found, the encoding unit 115 encodes and transmits information (a time difference from the current frame or the like) specifying the frame.

That is, in this case, the signal string generating unit 114 generates correlation information including the time information indicating the frame corresponding to the one to be referred to when the strength of the correlation to the distribution pattern of values of voxel data of the current block, which is the block to be processed, is obtained.

This method can be used in combination with each of the methods described in rows of id=1 to 3 in the table illustrated in FIG. 9. For example, in a case of being combined with the method described in the row of id=1 in the table illustrated in FIG. 9, the voxel data of the current block may be converted into an index with the use of the index of the unique pattern set by the correlation information generating unit 204 in the already-processed frame. Further, for example, the correlation arithmetic operation unit 201 may calculate the correlation degree between the current block and the block of a frame other than the frame (current frame) of current block, and the unique pattern setting unit 202 may set the unique pattern on the basis of the correlation degree.

Further, for example, in a case where it is combined with the method described in the row of id=2 in the table illustrated in FIG. 9, the correlation arithmetic operation unit 221 may calculate the correlation degree between the current block and the block of a frame other than the current frame, and the reference spatial coordinate information setting unit 222 may set the block of the frame other than the current frame as the block to be referred to on the basis of the correlation degree.

Further, for example, in a case where it is combined with the method described in the row of id=3 in the table illustrated in FIG. 9, the predefined unique pattern (and the predefined index) may be set for each frame or the like (updated in a time direction), the correlation arithmetic operation unit 241 may calculate the correlation degree between the current block and the predefined unique pattern corresponding to the frame other than the current frame, and the correlation information generating unit 242 may replace the voxel data of the current block with the predefined index corresponding to the frame other than the current frame on the basis of the correlation degree.

By doing so, it is possible to enlarge the range of the index as the correlation information and the range of the one to be referred to. Therefore, the signal string generating unit 114 can further reduce the redundancy of the bit stream and suppress a decrease in encoding efficiency.

Example 5 of Voxel Data Encoding Method

Further, for example, a method described in a row of id=5 in the table illustrated in FIG. 9 may be applied. That is, when the correlation between the blocks is obtained, the distribution pattern of values of voxel data to be compared may be allowed to be rotated or inverted. In this case, information related to rotation (rotation information), information related to inversion (inversion information), or the like may be included in the correlation information. For example, when calculating correlation, the signal string generating unit 114 also performs matching with the current block for a distributed pattern that is point symmetric or line symmetric with respect to the reference block (node (Node)). In a case where a highly-correlated pattern is found, the encoding unit 115 encodes and transmits the rotation information, the inversion information, or the like.

In other words, in this case, the signal string generating unit 114 generates correlation information including the information related to the rotation of the distribution pattern of values of voxel data to be referred to, the information related to the inversion of the distribution pattern to be referred to, or both at a time when the strength of correlation to the distribution pattern of values of voxel data of the current block, which is the block to be processed, is obtained.

This method can be used in combination with each of the methods described in the rows of id=1 to 4 in the table illustrated in FIG. 9. For example, the correlation arithmetic operation unit 201, the correlation arithmetic operation unit 221, or the correlation arithmetic operation unit 241 may perform comparison also with the distribution pattern that is line symmetric or point symmetric with respect to the distribution pattern to be referred (distribution pattern of another block or a predefined unique pattern) in the calculation of the correlation degree to the current block. Further, the correlation information generating unit 204, the correlation information generating unit 223, or the correlation information generating unit 242 may generate correlation information including rotation information (information indicating presence or absence of rotation, how the rotation is performed, or the like) or inversion information (information indicating presence or absence of inversion, how the inversion is performed, or the like).

By doing so, the possibility that the distribution pattern to be referred to coincides with or approximates that of the current block can be increased. Further, it is also possible to increase the possibility that the correlation degree will be higher. Therefore, the signal string generating unit 114 can further reduce the redundancy of the bit stream and suppress a decrease in encoding efficiency.

Example 6 of Voxel Data Encoding Method

Further, for example, a method described in the row of id=6 in the table illustrated in FIG. 9 may be applied. That is, the correlation information used for the vicinity block may be reused for the current block. For example, the signal string generating unit 114 calculates a correlation degree in a case where the correlation information used for the vicinity block (node (Node)) is reused for the current block. In a case where the correlation is high, the encoding unit 115 encodes and transmits information (e.g., a flag or the like) indicating the reusing.

That is, in this case, the signal string generating unit 114 generates the correlation information of the current block with the use of the correlation information of the peripheral block located at the periphery of the current block which is the block to be processed.

This method can be used in combination with each of the methods described in the rows of id=1 to 5 in the table illustrated in FIG. 9. For example, the correlation arithmetic operation unit 201, the correlation arithmetic operation unit 221, or the correlation arithmetic operation unit 241 may calculate the correlation degree in a case where the correlation information of the peripheral block is applied to the current block in the calculation of the correlation degree to the current block. Further, in a case where the reused correlation degree is applied (in a case where the correlation degree is high), the correlation information generating unit 204, the correlation information generating unit 223, or the correlation information generating unit 242 may generate correlation information including information (a flag or the like) indicating reusing of the correlation degree. It is to be noted that, at this time, information designating a correlation degree to be reused, information designating a mode, or the like may be included in the correlation information. Further, flag information indicating whether or not to reuse the correlation degree may be constantly included in the correlation information.

In a case where the correlation information of the peripheral block is reused, since the correlation information of the peripheral block is reused also on the decoding side, the transmission of the correlation information of the current block can be omitted. Therefore, since the amount of information to be transmitted can be reduced, it is possible to suppress a decrease in encoding efficiency.

<Combination with Octree Encoding>

The voxel data encoding method with the use of the correlation information described above may be used in combination with Octree encoding. For example, in a case where voxel data is encoded by Octree of LoD=G, Childmask (8 bits) of node n(l,i) at Level=l (l=0, 1, . . . , G−1) is encoded. Here, in a case of k=4, it corresponds to Octree of three levels (4=1<<(3−1)). Therefore, nodes of n(G−1,i), n(G−2,i), and n(G−3,i) can be expressed collectively by the unique pattern Ui. That is, for example, as described below, the encoding method with the use of the correlation information can be combined with the Octree encoding.

Level=0, . . . , G−4: Using Octree Encoding
Level=G−((log 2k)+1), . . . , G−2: Using DAG
Level=G−1: Using Proposed Encoding This makes it possible to cope with scalability (Scalability) such as partial decoding, decoding from a low resolution, and the like, for example. In addition, since the redundancy of the bit stream can be reduced as compared with the case where only the Octree encoding is performed, the case where only the DAG process is applied, or the like a decrease in encoding efficiency can be suppressed.

It is to be noted that, although the encoding using the correlation information may be applied to a plurality of levels of the Octree pattern, the process may become complicated because the approximating node is also merged in the encoding using the correlation information. Therefore, as described above, encoding using the correlation information may be applied only to the lowest level, and DAG (effective directional graph) may be applied to a level above the lowest level. It is to be noted that the DAG may be applied to all levels higher than the lowest level of the Octree pattern, or as described above, the DAG may be applied only from a level higher than the lowest level by one level to an intermediate level, and only Octree encoding may be applied to a portion at the levels on the upper side.

<Signal String Generating Unit>

Figure 18:
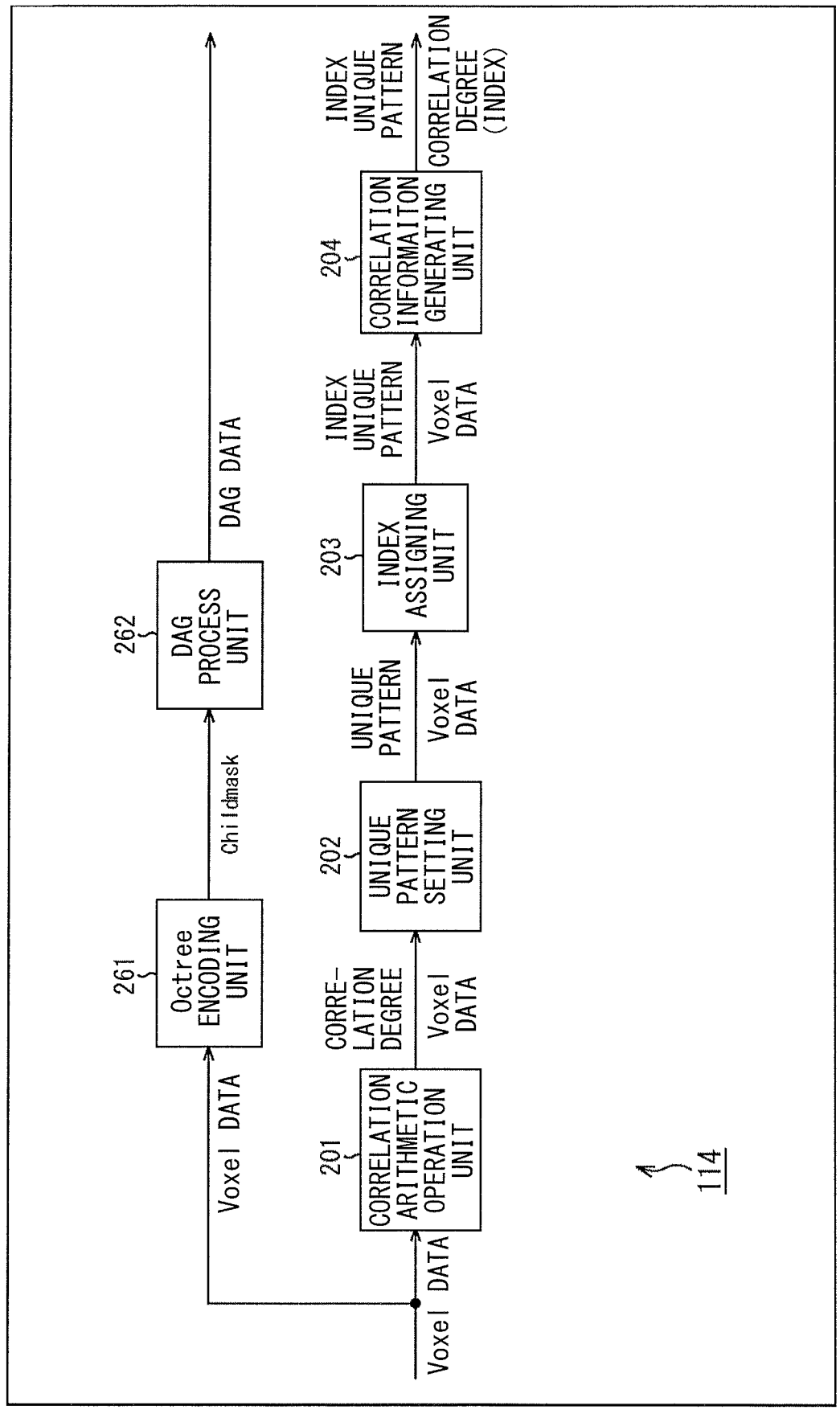
FIG. 18 is a block diagram illustrating a main configuration example of a signal string generating unit.

FIG. 18 is a block diagram illustrating a main configuration example of the signal string generating unit 114 (FIG. 7) in this case. As illustrated in FIG. 18, the signal string generating unit 114 in this case further includes an Octree encoding unit 261 and a DAG processing unit 262 in addition to units from the correlation arithmetic operation unit 201 to the correlation information generating unit 204.

The Octree encoding unit 261 performs a process related to Octree encoding. For example, the Octree encoding unit 261 performs Octree encoding on the voxel data supplied from the voxel setting unit 113, generates an Octree pattern as described with reference to FIG. 3, and generates Childmask (8 bits) of each node. The Octree encoding unit 261 supplies the generated Childmask data to the DAG processing unit 262.

It is to be noted that the Octree encoding unit 261 may have any configuration. For example, the Octree encoding unit 261 may include, for example, a CPU, a ROM, a RAM, and the like, and the CPU may load programs, data, and the like stored in the ROM and the like into the RAM and execute them, thereby performing a process related to Octree encoding.

The DAG processing unit 262 performs a process related to DAG. For example, the DAG processing unit 262 performs the DAG processing on a level higher than the lowest level of the Childmask data supplied from the Octree encoding unit 261, and merges the same nodes with the use of autocorrelation. The DAG processing unit 262 supplies the signal string of the DAG data thus generated to the encoding unit 115.

The units from the correlation arithmetic operation unit 201 to the correlation information generating unit 204 perform the process in a manner similar to that in the case in FIG. 11, and encode the voxel data with the use of the correlation data. That is, the lowest level of the Octree pattern is encoded. The correlation information generating unit 204 supplies the signal string to the encoding unit 115 as described with reference to FIG. 11.

It is to be noted that the DAG processing unit 262 may have any configuration. For example, the DAG processing unit 262 may include a CPU, a ROM, a RAM, and the like, and the CPU may load programs, data, and the like stored in the ROM and the like into the RAM and execute them, thereby performing a process related to the DAG.

The encoding unit 115 encodes those signal strings. That is, the encoding unit 115 generates a bit stream including the correlation data, the DAG data, and the like.

By applying the Octree encoding in this manner, the encoding using the correlation information can be made to cope with scalability. In other words, by applying the encoding using the correlation information to the Octree pattern, it is possible to suppress a decrease in encoding efficiency.

<Flow of Signal String Generation Process>

Figure 19:
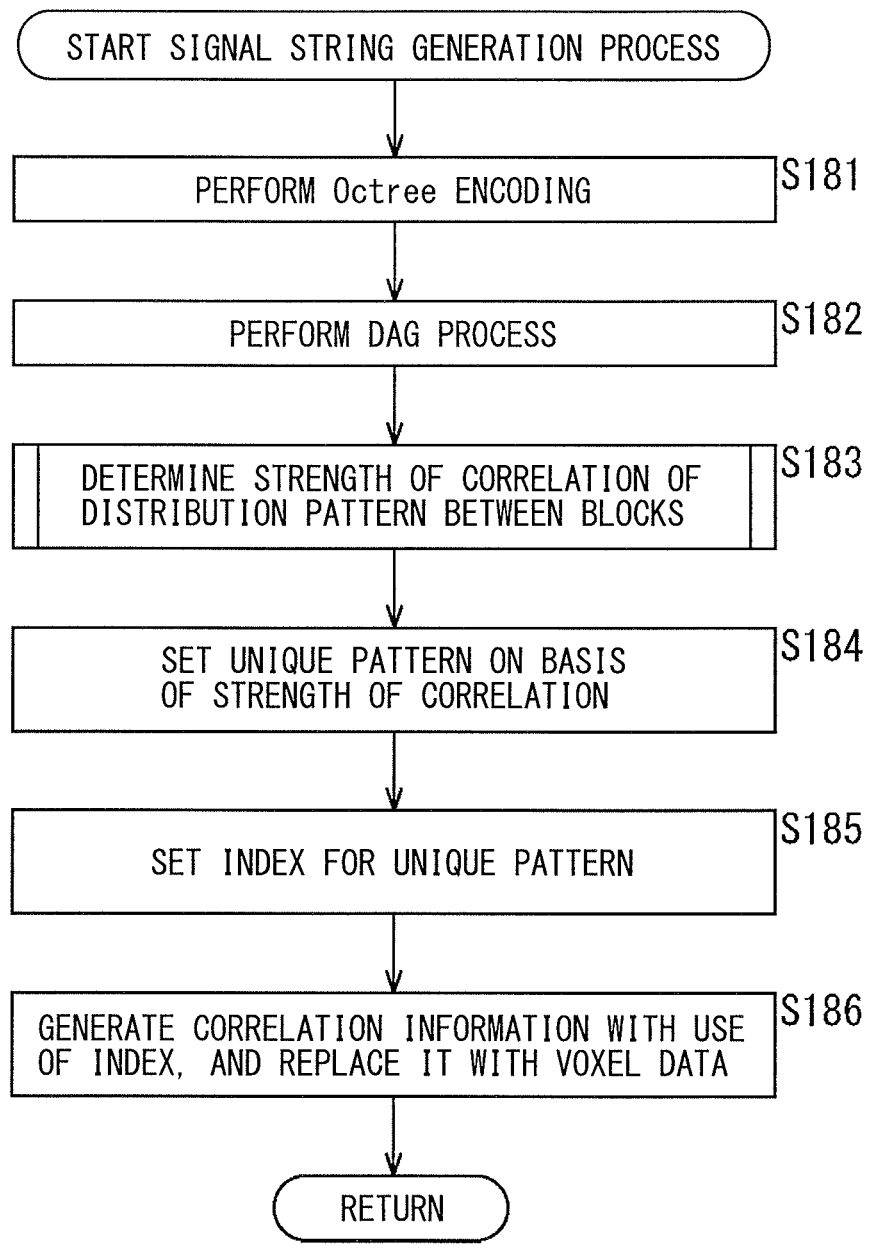
FIG. 19 is a flowchart illustrating an example of a flow of a signal string generation process.

Next, referring to a flowchart of FIG. 19, an example of a flow of the signal string generation process executed in step S104 of FIG. 12 in this case will be described.

When the signal string generation process is started, the Octree encoding unit 261 performs Octree encoding in step S181.

In step S182, the DAG processing unit 262 performs a DAG process on the node at a level higher than the lowest level of the Octree pattern.

Figure 13:
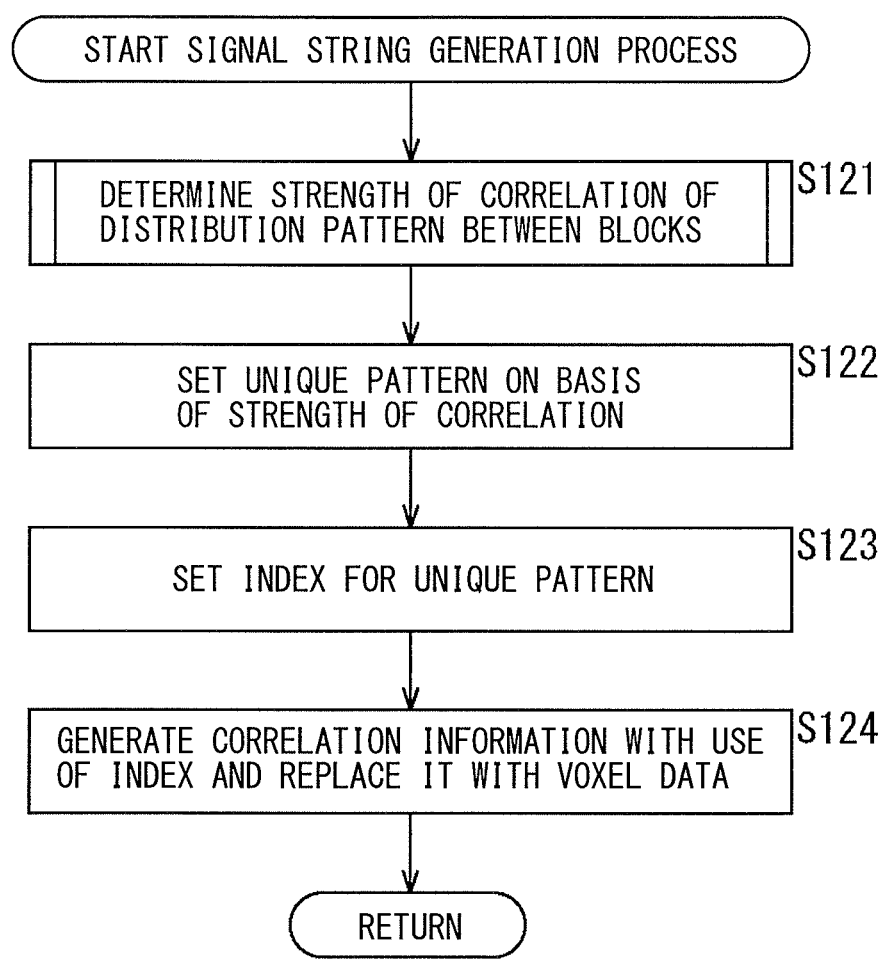
FIG. 13 is a flowchart illustrating an example of a flow of a signal string generation process.

The processes in step S183 to step S186 are performed in a similar manner to the processes in step S121 to step S124 in FIG. 13.

When the process in step S186 is completed, the signal string generation process is completed, and the process returns to FIG. 12.

By executing each process as described above, the encoding apparatus 100 can allow the encoding using the correlation information to cope with scalability or suppress a decrease in encoding efficiency, as described above.

It is to be noted that, in the above, a description is given of a case where the Octree encoding is applied to the method described in the row of id=1 in the table illustrated in FIG. 9, but it is similar also in a case where the Octree encoding is applied to the methods described in other rows in the table illustrated in FIG. 9. That is, the signal string generating unit 114 may be provided with the Octree encoding unit 261 and the DAG processing unit 262 as in the case of FIG. 18, and the similar processes to those in step S181 and step S182 of FIG. 19 may be performed in the signal string generation process.

<Transmission of Prediction Residual>

In the encoding of the voxel data using the correlation information described above, the correlation information can also be considered as a prediction value of voxel data. That is, in the encoding using the correlation information described above, only the prediction value is encoded and transmitted. Therefore, a prediction residual of the voxel data may also be transmitted. Furthermore, the prediction residual may be encoded (reduced in amount of information) and transmitted.

For example, the signal string generating unit 114 may obtain a difference (prediction residual) between the voxel data supplied from the voxel setting unit 113 and the prediction value of the voxel data corresponding to the correlation information, encode the prediction residual separately, and transmit it. This encoding method may be any method. For example, the prediction residual may be orthogonally transformed. Further, the prediction residual may be chain-encoded. Further, quantization may be performed.

By transmitting the prediction residual in this manner, a decoded image (decoded point cloud data) which is more accurate (closer to the state before encoding) can be obtained on the decoding side. That is, it is possible to improve subjective image quality of point cloud data that is decoded (also referred to as decoded point cloud data). Further, by encoding and transmitting the prediction residual as described above, it is possible to suppress a decrease in encoding efficiency.

<Signal String Generating Unit>

Figure 20:
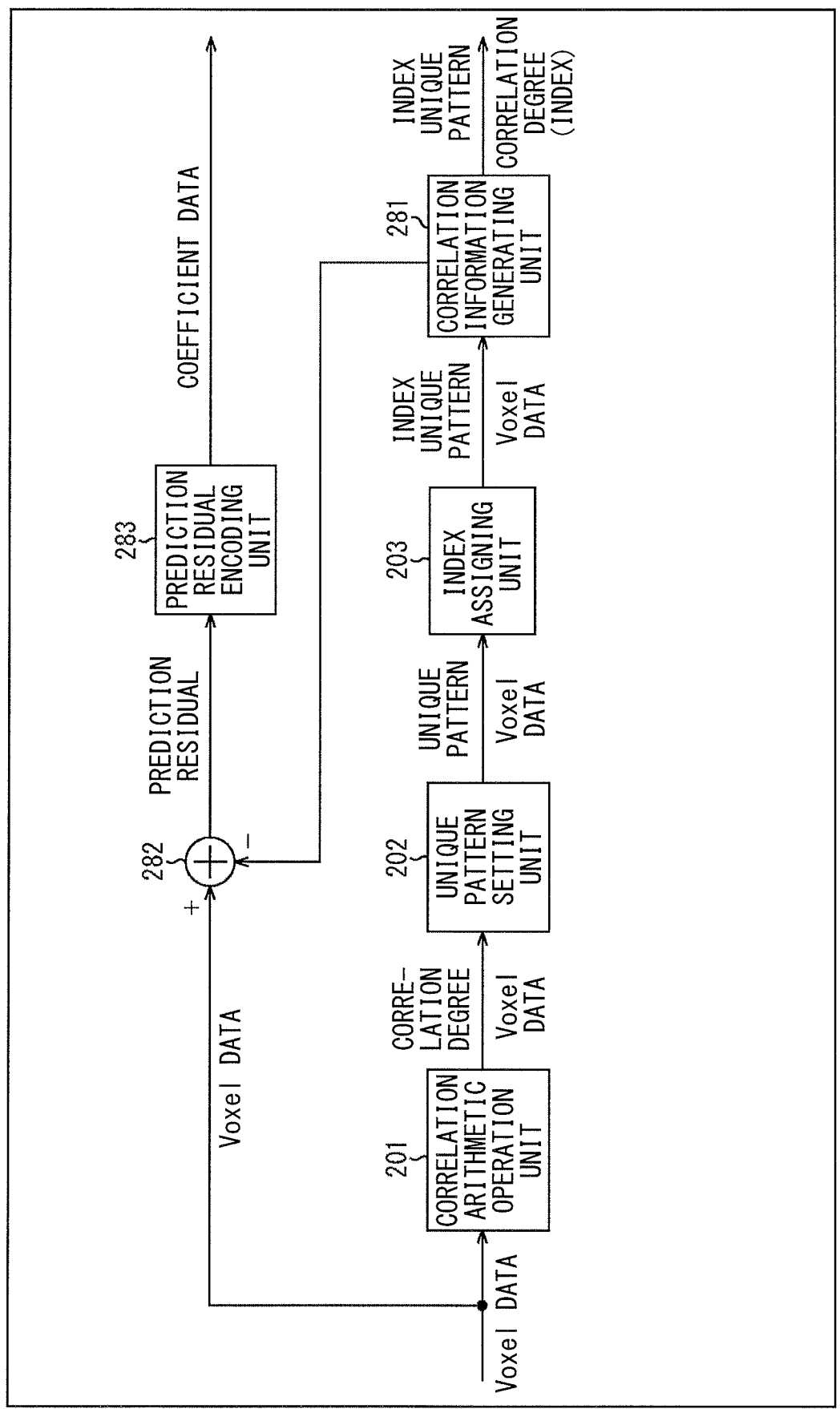
FIG. 20 is a block diagram illustrating a main configuration example of a signal string generating unit.

FIG. 20 is a block diagram illustrating a main configuration example of the signal string generating unit 114 (FIG. 7) in this case. As illustrated in FIG. 20, the signal string generating unit 114 in this case includes the units from the correlation arithmetic operation unit 201 to the index assigning unit 203 as in the case of FIG. 11. Further, the signal string generating unit 114 in this case includes a correlation information generating unit 281 instead of the correlation information generating unit 204. In addition, the signal string generating unit 114 in this case includes an arithmetic operation unit 282 and a prediction residual encoding unit 283.

The correlation information generating unit 281 basically performs a similar process to that of the correlation information generating unit 204, but furthermore, supplies a unique pattern corresponding to the index of each block included in the correlation information to the arithmetic operation unit 282.

It is to be noted that the correlation information generating unit 281 may have any configuration. For example, the correlation information generating unit 281 may include a CPU, a ROM, a RAM, and the like, and the CPU may load programs, data, and the like stored in the ROM and the like into the RAM and execute them, thereby performing a process related to generation of the correlation information.

The arithmetic operation unit 282 performs a process related to generation of a prediction residual. For example, the arithmetic operation unit 282 subtracts the unique pattern supplied from the correlation information generating unit 281 from the voxel data supplied from the voxel setting unit 113 for each block to generate a prediction residual. The arithmetic operation unit 282 supplies the generated prediction residual to the prediction residual encoding unit 283.

It is to be noted that the arithmetic operation unit 282 may have any configuration. For example, the arithmetic operation unit 282 may include a CPU, a ROM, a RAM, and the like, and the CPU may load programs, data, and the like stored in the ROM and the like into the RAM and execute them, thereby performing a process related to generation of a prediction residual.

The prediction residual encoding unit 283 performs a process related to encoding of a prediction residual. For example, the prediction residual encoding unit 283 encodes the prediction residual of the voxel data of each block supplied from the arithmetic operation unit 282 and converts it. This method of encoding the prediction residual may be any method. For example, orthogonal transformation, or chain encoding, or the like may be applied as described above. Further, quantization may be performed. The prediction residual encoding unit 283 supplies the signal string of the generated coefficient data to the encoding unit 115.

It is to be noted that the prediction residual encoding unit 283 may have any configuration. For example, the prediction residual encoding unit 283 may include a CPU, a ROM, a RAM, and the like, and the CPU may load programs, data, and the like stored in the ROM and the like into the RAM and execute them, thereby performing a process related to encoding of a prediction residual.

The encoding unit 115 encodes the signal string supplied from the correlation information generating unit 281, the prediction residual encoding unit 283, or the like. That is, the encoding unit 115 generates a bit stream including the correlation information, the prediction residual, and the like.

By doing so, it is possible to obtain more accurate decoded point cloud data on the decoding side. That is, it is possible to improve subjective image quality of the decoded point cloud data. Further, by encoding and transmitting the prediction residual as described above, it is possible to suppress a decrease in encoding efficiency.

<Flow of Signal String Generation Process>

Figure 21:
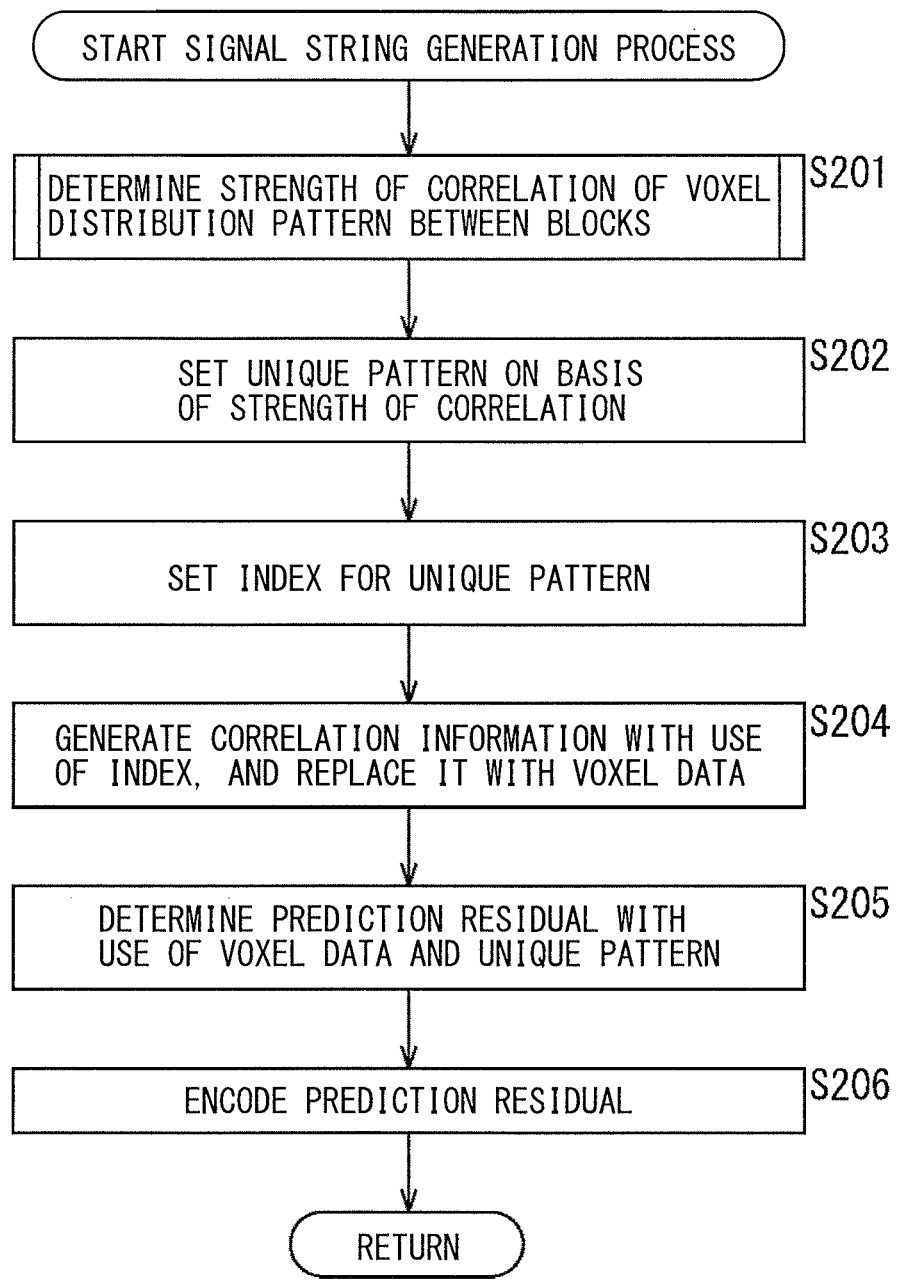
FIG. 21 is a flowchart illustrating an example of a flow of a signal string generation process.

Next, referring to a flowchart of FIG. 21, an example of a flow of the signal string generation process executed in step S104 of FIG. 12 in this case will be described.

Also in the signal string generation process in this case, processes in step S201 to step S204 are executed in a similar manner to that of processes in step S121 to step S124 in FIG. 13.

In step S205, the arithmetic operation unit 282 determines a prediction residual that is a difference between the voxel data and the unique pattern (prediction value of voxel data).

In step S206, the prediction residual encoding unit 283 encodes the prediction residual obtained by the process in step S205.

When the process in step S206 is completed, the signal string generation process is completed, and the process returns to FIG. 12.

By executing the respective processes as described above, the encoding apparatus 100 can improve the subjective image quality of the decoded point cloud data or suppress a decrease in encoding efficiency, as described above.

It is to be noted that, in the above, a case where the transmission of the prediction residual is applied to the method described in the row of id=1 in the table illustrated in FIG. 9 has been described, however, the transmission of the prediction residual as described above is also applicable to the methods described in other rows in the table illustrated in FIG. 9. In this case as well, it can be basically applied in a similar manner to that in the above-described example. That is, the signal string generating unit 114 may be provided with the units from the correlation information generating unit 281 to the prediction residual encoding unit 283 in a similar manner to that in the case of FIG. 20, and in the signal string generation process, similar processes to those in step S205 and step S206 in FIG. 20 may be performed.

<Attribute Information>

Each point of the point cloud has attribute information such as color information ((R, G, B), (Y, U, V)), an a channel, a normal vector, or the like in addition to the position information (x, y, z). Therefore, when encoding the position information described above, the attribute information may also be encoded using the correlation information in a similar manner. That is, the encoding unit 115 may omit encoding of the attribute information of the block for which the correlation information is generated.

A method of merging the attribute information in that time may be any method. For example, the attribute information (e.g., RGB/YUV pixel values after decoding the color information) of the one to be referred to and for which the position information (structural information) is subjected to merging with the current block may also be used for the current block.

In addition, for example, an encoding method (for example, a color-prediction mode or the like) of the attribute information of the one to be referred to and for which the position information (structural information) is subjected to merging with the current block may be used also for the current block. That is, the encoding unit 115 may encode the attribute information of the block for which the correlation information is generated by the signal string generating unit 114 by the same encoding method as that for the attribute information of the one to be referred corresponding to the correlation information.

Further, for example, a filtering method (such as color format conversion, a chroma sub-sampling method, a de-noise method such as de-blocking, or the like) of the attribute information of the one to be referred to and for which the position information (structural information) is subjected to merging with the current block may also be used for the current block. That is, the encoding unit 115 may filter the attribute information of the block for which the correlation information is generated by the signal string generating unit 114 by the same filtering method as that for the attribute information of the one to be referred to corresponding to the correlation information.

By doing so, it is possible to reduce the redundancy of the bit stream, and to suppress a decrease in encoding efficiency.

3. Second Embodiment

Example 1 of Decoding Method

Next, a decoding apparatus corresponding to the encoding apparatus 100 described above will be described. For example, a bit stream of voxel data encoded by the method described in the row of id=1 in the table illustrated in FIG. 9 can be decoded by a method described in the same row.

That is, in this case, the correlation information of each block can be decoded by decoding the information indicating the correspondence relationship between the unique pattern and the index, and converting the index of each block into the unique pattern on the basis of the information.

<Decoding Apparatus>

Figure 22:
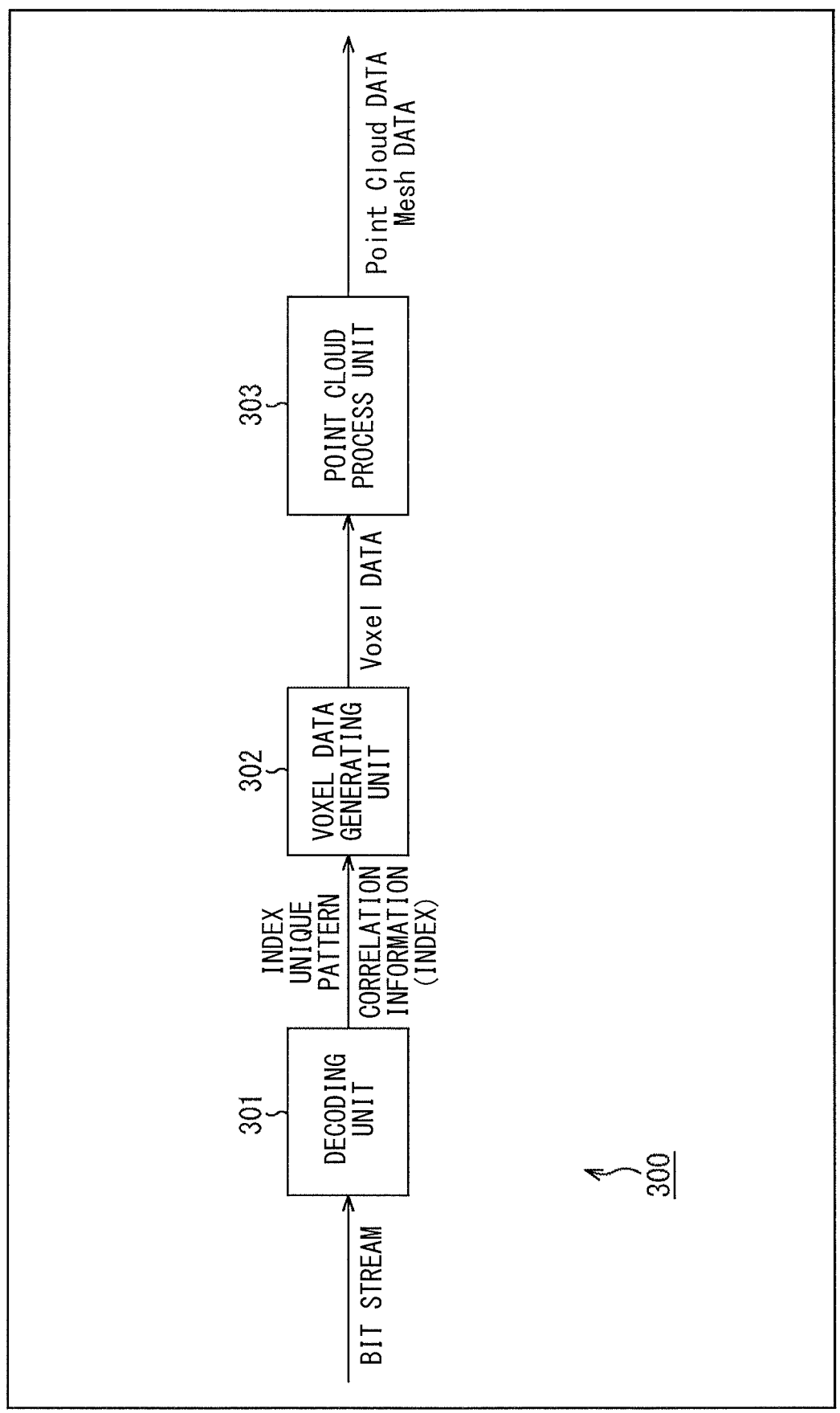
FIG. 22 is a block diagram illustrating a main configuration example of a decoding apparatus.

FIG. 22 is a block diagram illustrating a main configuration example of a decoding apparatus which is an embodiment of the information processing apparatus to which the present technology is applied. The decoding apparatus 300 illustrated in FIG. 22 is a decoding apparatus corresponding to the encoding apparatus 100 of FIG. 7. The decoding apparatus 300 decodes encoded data of the point cloud generated by the encoding apparatus 100, for example, to restore the data of the point cloud. The signal string generating unit 114 of the encoding apparatus 100 encodes the voxel data by the method described in the row of the id=1 in the table illustrated in FIG. 9 as described above. The decoding apparatus 300 of FIG. 22 decodes the bit stream obtained by the encoding apparatus 100 by a method described in the row of id=1 in the table illustrated in FIG. 9.

As illustrated in FIG. 22, the decoding apparatus 300 in this case includes a decoding unit 301, a voxel data generating unit 302, and a point cloud processing unit 303.

The decoding unit 301 performs a process related to decoding of a bit stream. For example, the decoding unit 301 decodes the bit stream by a decoding method corresponding to the encoding method of the encoding unit 115, and extracts correlation information from the bit stream. The correlation information is set for each block which is a partial region of the space represented by the voxel data, and the decoding unit 301 extracts the correlation information of each block.

The correlation information includes an index obtained by converting voxel data for each block. The index is assigned to a unique pattern that is determined as coinciding with or approximating the distribution pattern of the voxel data of the block. Further, the bit stream includes information indicating the correspondence relationship between the unique pattern and the index. The decoding unit 301 also extracts the information indicating the correspondence relationship between the unique pattern and the index from the bit stream.

The decoding unit 301 supplies the voxel data generating unit 302 with the information extracted from the bit stream (the correlation information, the information indicating the correspondence relationship between the unique pattern and the index, and the like).

It is to be noted that the decoding unit 301 may have any configuration. For example, the decoding unit 301 may include a CPU, a ROM, a RAM, and the like, and the CPU may load programs, data, and the like stored in the ROM and the like into the RAM and execute them, thereby performing a process related to decoding.

The voxel data generating unit 302 performs a process related to generation of voxel data. For example, the voxel data generating unit 302 generates voxel data corresponding to the correlation information supplied from the decoding unit 301. That is, in a case where the correlation information is set for each voxel, the voxel data generating unit 302 converts the correlation information of each block into voxel data.

For example, the voxel data generating unit 302 converts the correlation information of each block supplied from the decoding unit 301 into a unique pattern with the use of the information indicating the correspondence relationship between the unique pattern and the index supplied from the decoding unit 301, thereby generating the voxel data of each block.

The voxel data generating unit 302 supplies the generated voxel data to the point cloud processing unit 303.

It is to be noted that the voxel data generating unit 302 may have any configuration. For example, the voxel data generating unit 302 may include a CPU, a ROM, a RAM, and the like, and the CPU may load programs, data, and the like stored in the ROM and the like into the RAM and execute them, thereby performing a process related to generation of voxel data.

The point cloud processing unit 303 performs a process related to restoring of the point cloud data. For example, the point cloud processing unit 303 converts the supplied voxel data into point cloud data (generates decoded point cloud data). It is to be noted that the point cloud processing unit 303 may further convert the decoded point cloud data into Mesh data.

The point cloud processing unit 303 outputs the generated decoded point cloud data (or Mesh data) to outside of the decoding apparatus 300. The outputted decoded point cloud data (or Mesh data) may be subjected to image processing by, for example, an unillustrated subsequent-stage processing unit and displayed on a monitor or the like as image information. The outputted decoded point cloud data (or Mesh data) may be transmitted by an unillustrated communication unit and transmitted to another apparatus via a predetermined transmission path. The outputted decoded point cloud data (or Mesh data) may be recorded on an unillustrated recording medium.

It is to be noted that the point cloud processing unit 303 may have any configuration. For example, the point cloud processing unit 303 may include a CPU, a ROM, a RAM, and the like, and the CPU may load programs, data, and the like stored in the ROM and the like into the RAM and execute them, thereby performing a process related to restoring of the point cloud data.

As described above, the decoding apparatus 300 in this case performs decoding by the method described in the row of id=1 in the table illustrated in FIG. 9. Therefore, the decoding apparatus 300 in this case can achieve suppression of a decrease in encoding efficiency by the encoding method described in the row of id=1 in the table illustrated in FIG. 9.

<Flow of Decoding Process>

Referring to a flowchart of FIG. 23, an example of a flow of the decoding process executed by the decoding apparatus 300 in this case will be described.

When the decoding process is started, in step S301, the decoding unit 301 decodes a bit stream, and extracts information indicating the correspondence relationship between the unique pattern and the index and the correlation information of each block including the index.

In step S302, the voxel data generating unit 302 generates voxel data of each block by converting an index of the correlation information of each block into the unique pattern corresponding thereto, on the basis of the information indicating the correspondence relationship between the unique pattern and the index extracted in step S301.

In step S303, the point cloud processing unit 303 restores the point cloud data from the voxel data obtained by the process in step S302.

In step S304, the point cloud processing unit 303 outputs the restored point cloud data (decoded point cloud data) to outside of the decoding apparatus 300.

When the process in step S304 is completed, the decoding process is completed.

By performing the decoding process as described above, the decoding apparatus 300 in this case can achieve suppression of a decrease in encoding efficiency by the encoding method described in the row of id=1 in the table illustrated in FIG. 9.

Example 2 of Decoding Method

Further, for example, the bit stream of the voxel data encoded by the method described in the row of id=2 in the table illustrated in FIG. 9 can be decoded by a method described in the same row.

That is, in this case, by decoding information such as the absolute position (spatial coordinate) or the relative position (vector) of the block referred to by each block and generating voxel data of the current block with the use of the voxel data of the block to be referred to, the correlation information of each block can be decoded.

<Decoding Apparatus>

Figure 24:
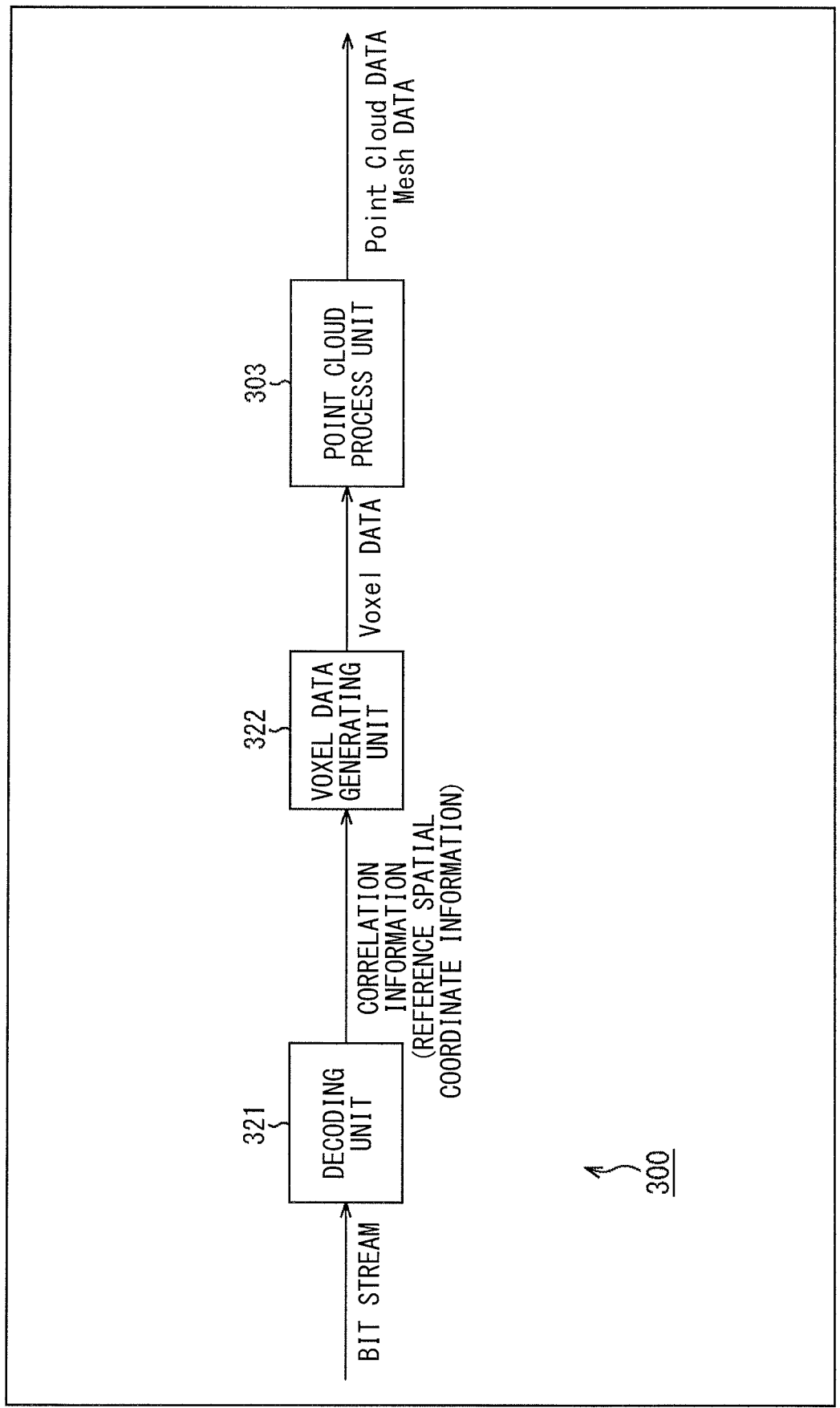
FIG. 24 is a block diagram illustrating a main configuration example of a decoding apparatus.

FIG. 24 is a block diagram illustrating a main configuration example of a decoding apparatus which is an embodiment of the information processing apparatus to which the present technology is applied. The decoding apparatus 300 illustrated in FIG. 24 is a decoding apparatus corresponding to the encoding apparatus 100 of FIG. 7. The decoding apparatus 300 decodes encoded data of the point cloud generated by the encoding apparatus 100, for example, to restore data of the point cloud. The signal string generating unit 114 of the encoding apparatus 100 encodes the voxel data by the method described in the row of id=2 in the table illustrated in FIG. 9 as described above. The decoding apparatus 300 of FIG. 24 decodes the bit stream obtained by the encoding apparatus 100 by a method described in the row of id=2 in the table illustrated in FIG. 9.

As illustrated in FIG. 24, the decoding apparatus 300 in this case includes a decoding unit 321, a voxel data generating unit 322, and the point cloud processing unit 303.

The decoding unit 321 performs a process related to decoding of a bit stream. For example, the decoding unit 321 decodes the bit stream by a decoding method corresponding to the encoding method of the encoding unit 115, and extracts correlation information from the bit stream. The correlation information is set for each block which is a partial region of the space represented by the voxel data, and the decoding unit 321 extracts the correlation information of each block.

The correlation information includes reference spatial coordinate information. The reference spatial coordinate information is information indicating a position of a peripheral block whose distribution pattern of values of voxel data coincides with or approximates that of the current block and which is designated as the block to be referred of the voxel data. The decoding unit 321 supplies information extracted from the bit stream (correlation information and the like) to the voxel data generating unit 322.

It is to be noted that the decoding unit 321 may have any configuration. For example, the decoding unit 321 may include a CPU, a ROM, a RAM, and the like, and the CPU may load programs, data, and the like stored in the ROM and the like into the RAM and execute them, thereby performing a process related to decoding.

The voxel data generating unit 322 performs a process related to generation of voxel data. For example, the voxel data generating unit 322 generates voxel data corresponding to the correlation information supplied from the decoding unit 321. That is, in a case where the correlation information is set for each voxel, the voxel data generating unit 322 converts the correlation information of each block into voxel data.

For example, the voxel data generating unit 322 specifies the block to be referred to on the basis of the reference spatial coordinate information included in the correlation information of the current block supplied from the decoding unit 321, and generates voxel data of the current block with the use of the voxel data of the block. The voxel data generating unit 322 performs such a process on the correlation information of each block, thereby generating voxel data of each block.

The voxel data generating unit 322 supplies the generated voxel data to the point cloud processing unit 303. Since the process performed by the point cloud processing unit 303 is similar to that in the case of FIG. 22, its explanation is omitted.

It is to be noted that the voxel data generating unit 322 may have any configuration. For example, the voxel data generating unit 322 may include a CPU, a ROM, a RAM, and the like, and the CPU may load programs, data, and the like stored in the ROM and the like into the RAM and execute them, thereby performing a process related to generation of voxel data.

As described above, the decoding apparatus 300 in this case performs decoding by the method described in the row of id=2 in the table illustrated in FIG. 9. Therefore, the decoding apparatus 300 in this case can achieve suppression of a decrease in encoding efficiency by the encoding method described in the row of id=2 in the table illustrated in FIG. 9.

<Flow of Decoding Process>

Figure 25:
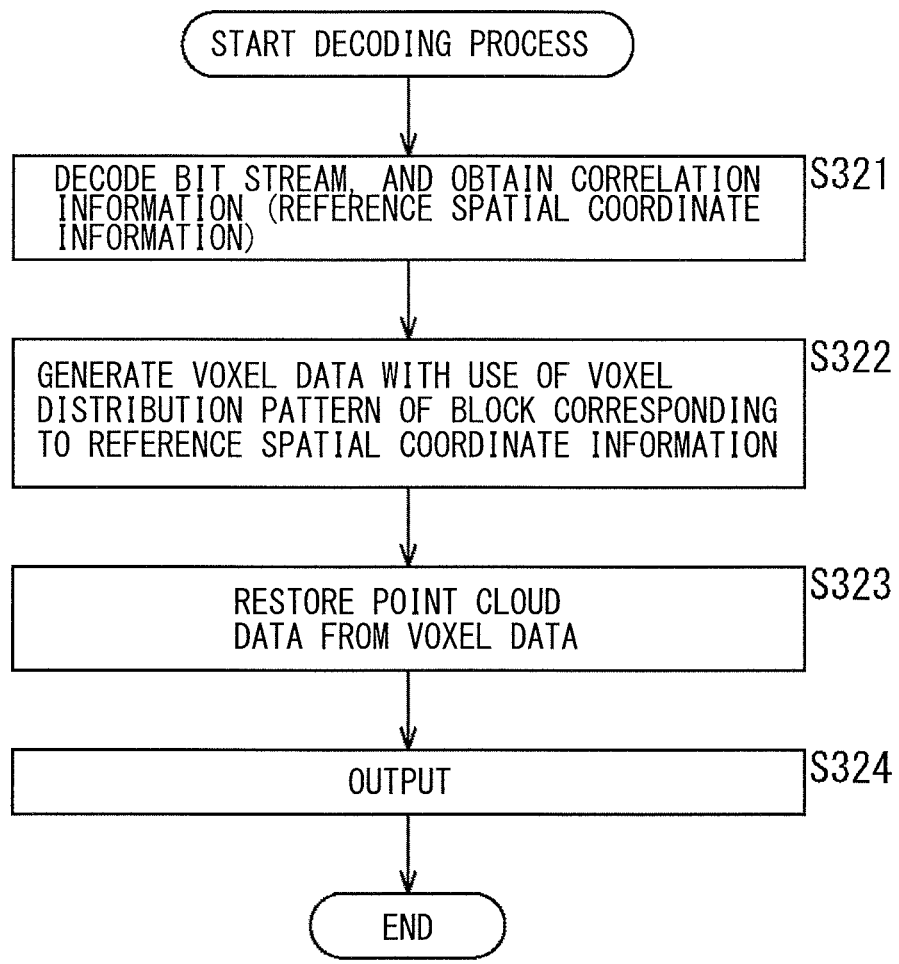
FIG. 25 is a flowchart describing an example of a flow of a decoding process.

Referring to a flowchart of FIG. 25, an example of a flow of a decoding process executed by the decoding apparatus 300 in this case will be described.

When the decoding process is started, in step S321, the decoding unit 321 decodes a bit stream and extracts correlation information of each block including reference spatial coordinate information.

In step S322, the voxel data generating unit 322 specifies the block to be referred to on the basis of the reference spatial coordinate information of the correlation information of each block extracted in step S321, and generates voxel data of each block with the use of the voxel data of each block to be referred to.

Figure 23:
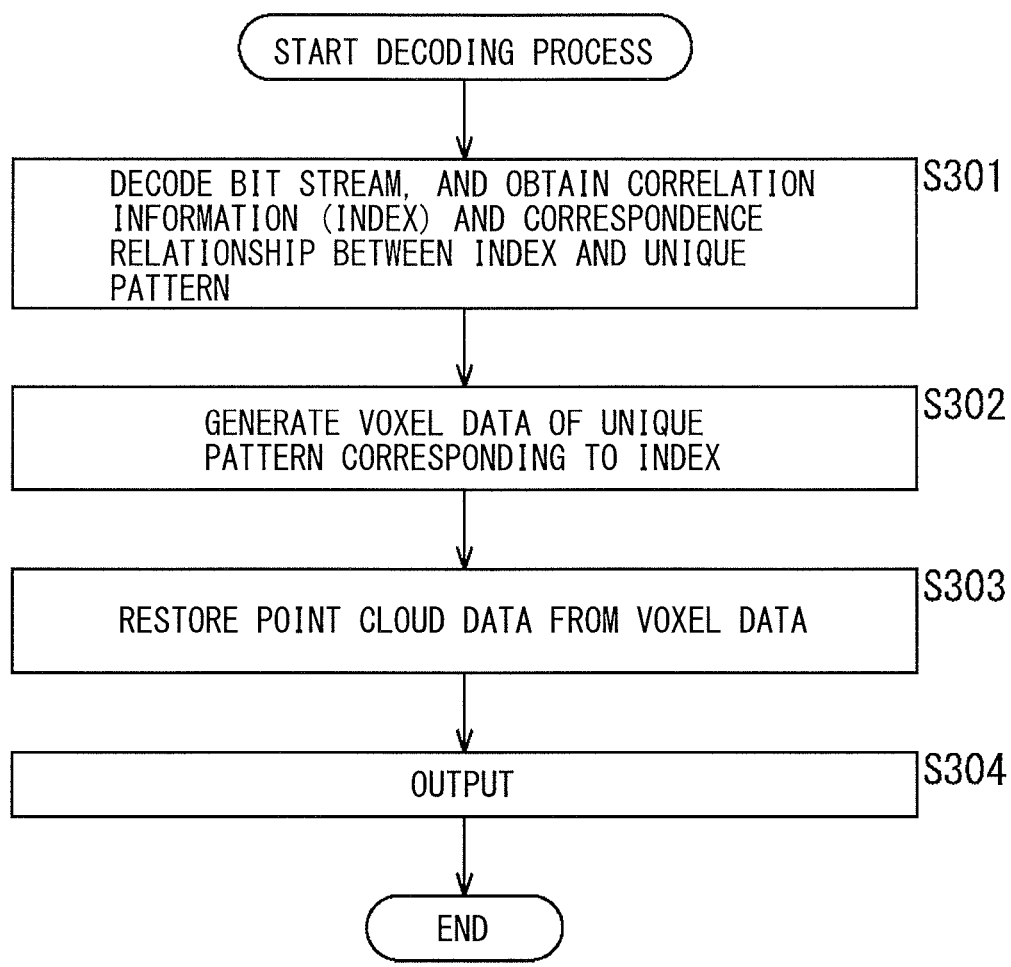
FIG. 23 is a flowchart describing an example of a flow of a decoding process.

The processes in step S323 and step S324 are executed in a similar manner to that in the processes in step S303 and step S304 in FIG. 23. When the process of step S324 is completed, the decoding process is completed.

By performing the decoding process as described above, the decoding apparatus 300 in this case can achieve suppression of a decrease in encoding efficiency by the encoding method described in the row of id=2 in the table illustrated in FIG. 9.

Example 3 of Decoding Method

Further, for example, the bit stream of the voxel data encoded by the method described in the row of id=3 in the table illustrated in FIG. 9 can be decoded by a method described in the same row.

That is, in this case, the correlation information of each block can be decoded by converting a predefined index of each block into a predefined unique pattern on the basis of information indicating a correspondence relationship between the predefined unique pattern and the predefined index.

<Decoding Apparatus>

Figure 26:
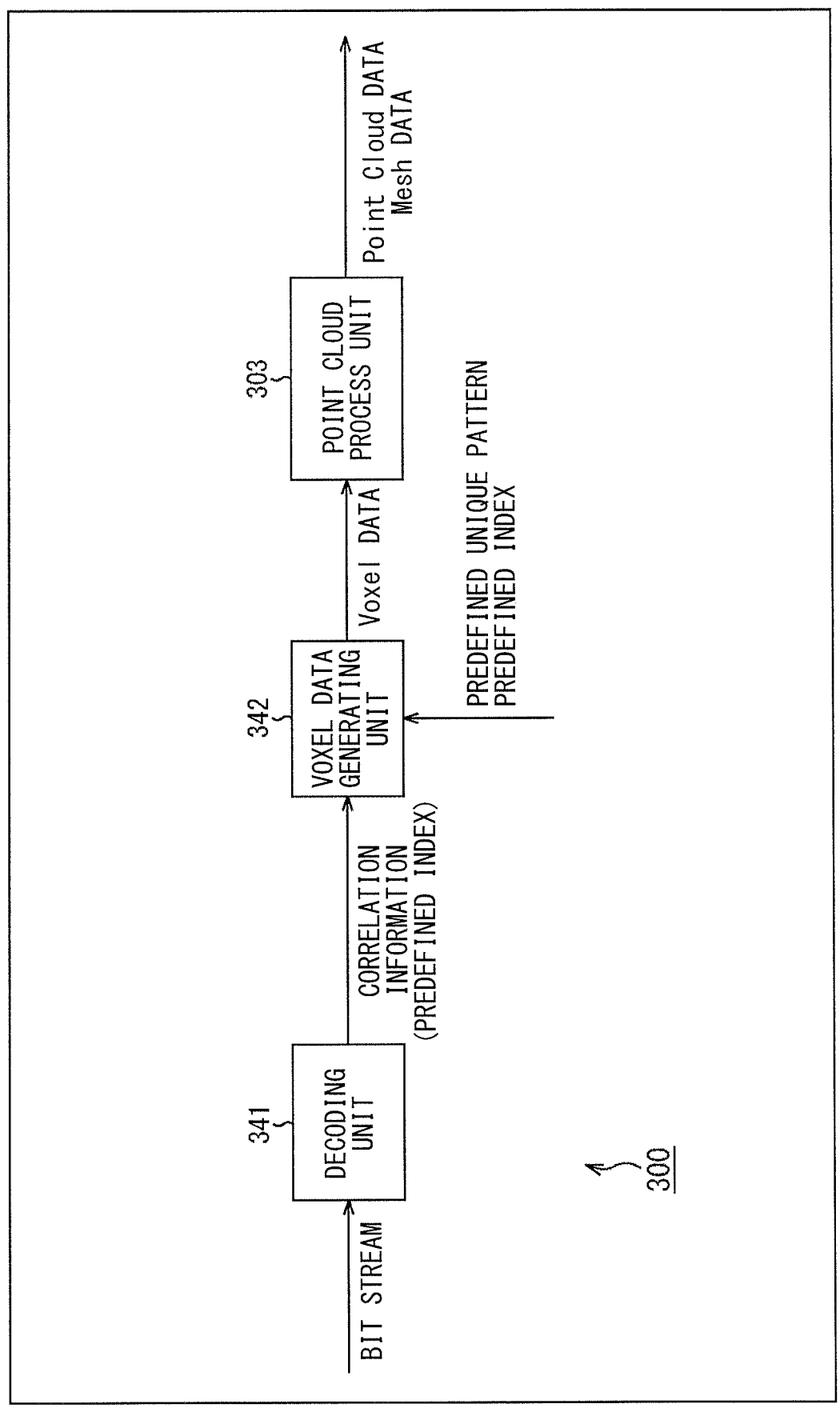
FIG. 26 is a block diagram illustrating a main configuration example of a decoding apparatus.

FIG. 26 is a block diagram illustrating a main configuration example of a decoding apparatus which is an embodiment of the information processing apparatus to which the present technology is applied. The decoding apparatus 300 illustrated in FIG. 26 is a decoding apparatus corresponding to the encoding apparatus 100 of FIG. 7. The decoding apparatus 300 decodes the encoded data of the point cloud generated by the encoding apparatus 100, for example, to restore data of the point cloud. The signal string generating unit 114 of the encoding apparatus 100 encodes the voxel data by the method described in the row of id=3 in the table illustrated in FIG. 9 as described above. The decoding apparatus 300 of FIG. 26 decodes the bit stream obtained by the encoding apparatus 100 by a method described in the row of id=3 in the table illustrated in FIG. 9.

As illustrated in FIG. 26, the decoding apparatus 300 in this case includes a decoding unit 341, a voxel data generating unit 342, and the point cloud processing unit 303.

The decoding unit 341 performs a process related to decoding of a bit stream. For example, the decoding unit 341 decodes the bit stream by a decoding method corresponding to the encoding method of the encoding unit 115, and extracts correlation information from the bit stream. The correlation information is set for each block which is a partial region of the space represented by the voxel data, and the decoding unit 321 extracts the correlation information of each block.

The correlation information includes a predefined index obtained by converting voxel data for each block. The predefined index is assigned to a predefined unique pattern. It is to be noted that the decoding apparatus 300 of FIG. 26 has in advance information indicating the correspondence relationship between the predefined unique pattern and the predefined index. The decoding unit 341 supplies information extracted from the bit stream (correlation information and the like) to the voxel data generating unit 342.

It is to be noted that the decoding unit 341 may have any configuration. For example, the decoding unit 341 may include a CPU, a ROM, a RAM, and the like, and the CPU may load programs, data, and the like stored in the ROM and the like into the RAM and execute them, thereby performing a process related to decoding.

The voxel data generating unit 342 performs a process related to generation of voxel data. For example, the voxel data generating unit 342 generates voxel data corresponding to the correlation information supplied from the decoding unit 341. That is, in a case where the correlation information is set for each voxel, the voxel data generating unit 342 converts the correlation information of each block into voxel data.

For example, the voxel data generating unit 342 converts the predefined index included in the correlation information of each block supplied from the decoding unit 341 into a predefined unique pattern on the basis of the information indicating the correspondence relationship between the predefined unique pattern and the predefined index, thereby generating voxel data of each block.

The voxel data generating unit 322 supplies the generated voxel data to the point cloud processing unit 303. Since the process performed by the point cloud processing unit 303 is similar to that in the case of FIG. 22, its explanation is omitted.

It is to be noted that the voxel data generating unit 342 may have any configuration. For example, the voxel data generating unit 342 may include a CPU, a ROM, a RAM, and the like, and the CPU may load programs, data, and the like stored in the ROM and the like into the RAM and execute them, thereby performing a process related to generation of voxel data.

As described above, the decoding apparatus 300 in this case performs decoding by the method described in the row of id=3 in the table illustrated in FIG. 9. Therefore, the decoding apparatus 300 in this case can achieve suppression of a decrease in encoding efficiency by the encoding method described in the row of id=3 in the table illustrated in FIG. 9.

<Flow of Decoding Process>

Figure 27:
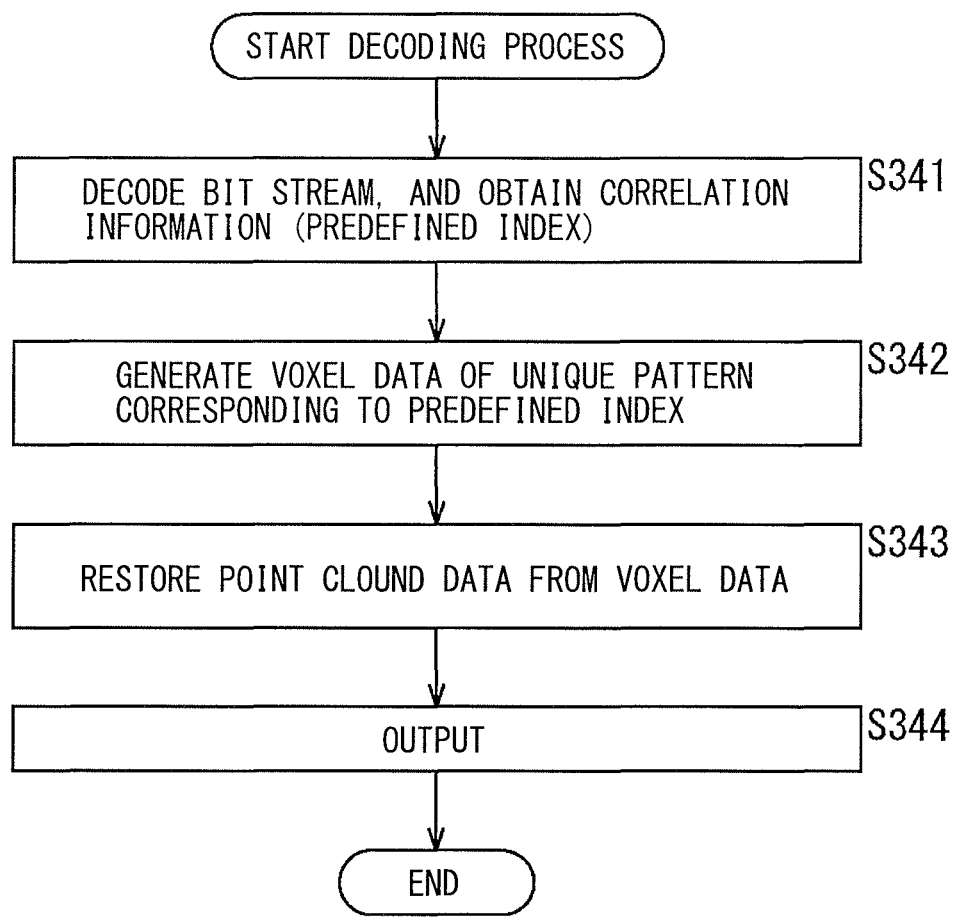
FIG. 27 is a flowchart describing an example of a flow of a decoding process.

Referring to a flowchart of FIG. 27, an example of a flow of the decoding process executed by the decoding apparatus 300 in this case will be described.

When the decoding process is started, the decoding unit 341 decodes the bit stream and extracts correlation information for each block including the predefined index in step S341.

In step S342, the voxel data generating unit 342 converts the predefined index of the correlation information of each block extracted in step S341 into a predefined unique pattern on the basis of the information indicating the correspondence relationship between the predefined unique pattern and the predefined index, thereby generating voxel data of each block.

The processes in step S343 and step S334 are executed in a similar manner to that of the processes in step S303 and step S304 in FIG. 23. When the process in step S344 is completed, the decoding process is completed.

By performing the decoding process as described above, the decoding apparatus 300 in this case can achieve suppression of a decrease in encoding efficiency by the encoding method described in the row of id=3 in the table illustrated in FIG. 9.

Example 4 of Decoding Method

Further, for example, the bit stream of the voxel data encoded by the method described in the row of id=4 in the table illustrated in FIG. 9 can be decoded by a method described in the same row. That is, in this case, a decoded frame can be specified by decoding information specifying the frame, and the distribution pattern can be decoded from the block in the frame by additional information.

For example, the correlation information may include time information indicating a frame corresponding to the one to be referred to at a time when the strength of the correlation with the distribution pattern of values of voxel data of the current block is obtained. Further, the frame corresponding to the one to be referred to may be specified on the basis of the time information included in the correlation information of the current block extracted from the bit stream.

By doing so, it is possible to enlarge the range of the index as the correlation information, the range to be referred to, or the like. Therefore, it is possible to further reduce the redundancy of the bit stream and suppress a decrease in encoding efficiency.

Example 5 of Decoding Method

Further, for example, the bit stream of the voxel data encoded by the method described in the row of id=5 in the table illustrated in FIG. 9 can be decoded by a method described in the same row. That is, in this case, it is possible to decode the distribution pattern of the current block by decoding information such as rotation or inversion, and performing operation corresponding to the block to be referred to.

For example, the correlation information may include information (rotation information) related to the rotation of the distribution pattern of values of voxel data to be referred to, information (inversion information) related to inversion of the distribution pattern of values of voxel data to be referred to, or both at a time when determining the strength of the correlation with the distribution pattern of values of voxel data of the current block. Further, when voxel data is generated from the correlation information of each block, rotation, inversion, or both may be performed on the distribution pattern of values of voxel data to be referred to, on the basis of the rotation information, the inversion information, or both included in the correlation information of the current block extracted from the bit stream.

By doing so, the possibility that the distribution pattern to be referred to coincides with or approximates that of the current block can be increased. Further, it is also possible to increase the possibility that the correlation degree will be higher. Therefore, it is possible to further reduce the redundancy of the bit stream, and to suppress a decrease in encoding efficiency.

Example 6 of Decoding Method

Further, for example, the bit stream of the voxel data encoded by the method described in the row of id=6 in the table illustrated in FIG. 9 can be decoded by a method described in the same row. That is, in this case, the correlation information of the peripheral block can be reused to generate voxel data of the current block.

In a case where the correlation information of the peripheral block is reused, the correlation information of the current block may not be included in the bit stream. Instead, for example, in the block, information (a flag or the like) indicating that the correlation information of the peripheral block is to be reused may be included in the bit stream. Further, in a case where such information is obtained for the current block, the correlation information of the current block may be generated with the use of the correlation information of the peripheral block, and the voxel data of the current block may be generated with the use of the generated correlation information.

By doing so, the transmission of the correlation information of the block reusing the correlation information of the peripheral block can be omitted. Therefore, since the amount of information to be transmitted can be reduced, it is possible to suppress a decrease in encoding efficiency.

It is to be noted that, as in the case of encoding, the decoding methods described in the rows of id=1 to 6 in the table illustrated in FIG. 9 described above can be appropriately combined.

<Combination of Octree Decoding>

It is to be noted that the bit stream to be decoded may be a bit stream generated by using the encoding with the use of the correlation information and the Octree encoding in combination, as described in <Combination of Octree Encoding>. For example, the bit stream may be one in which the voxel data is subjected to Octree encoding and the node at the lowest level of the Octree pattern is encoded with the use of the correlation information. Further, it may be one in which nodes at a plurality of levels including the lowest level of the Octree pattern are encoded with the use of the correlation information.

In addition, it may be one generated also using the DAG process in combination. For example, the bit stream may be one in which the voxel data is subjected to Octree encoding, the node at the lowest level of the Octree pattern is encoded with the use of the correlation information, and the node at the level higher than the lowest level is subjected to the DAG process. Further, it may be one in which the node at the lowest level of the Octree pattern is encoded with the use of the correlation information, the nodes from the level higher than the lowest level by one level to the intermediate level may be subjected to the DAG process, and the node at a level higher than that may be applied only with the Octree encoding.

<Decoding Apparatus>

Figure 28:
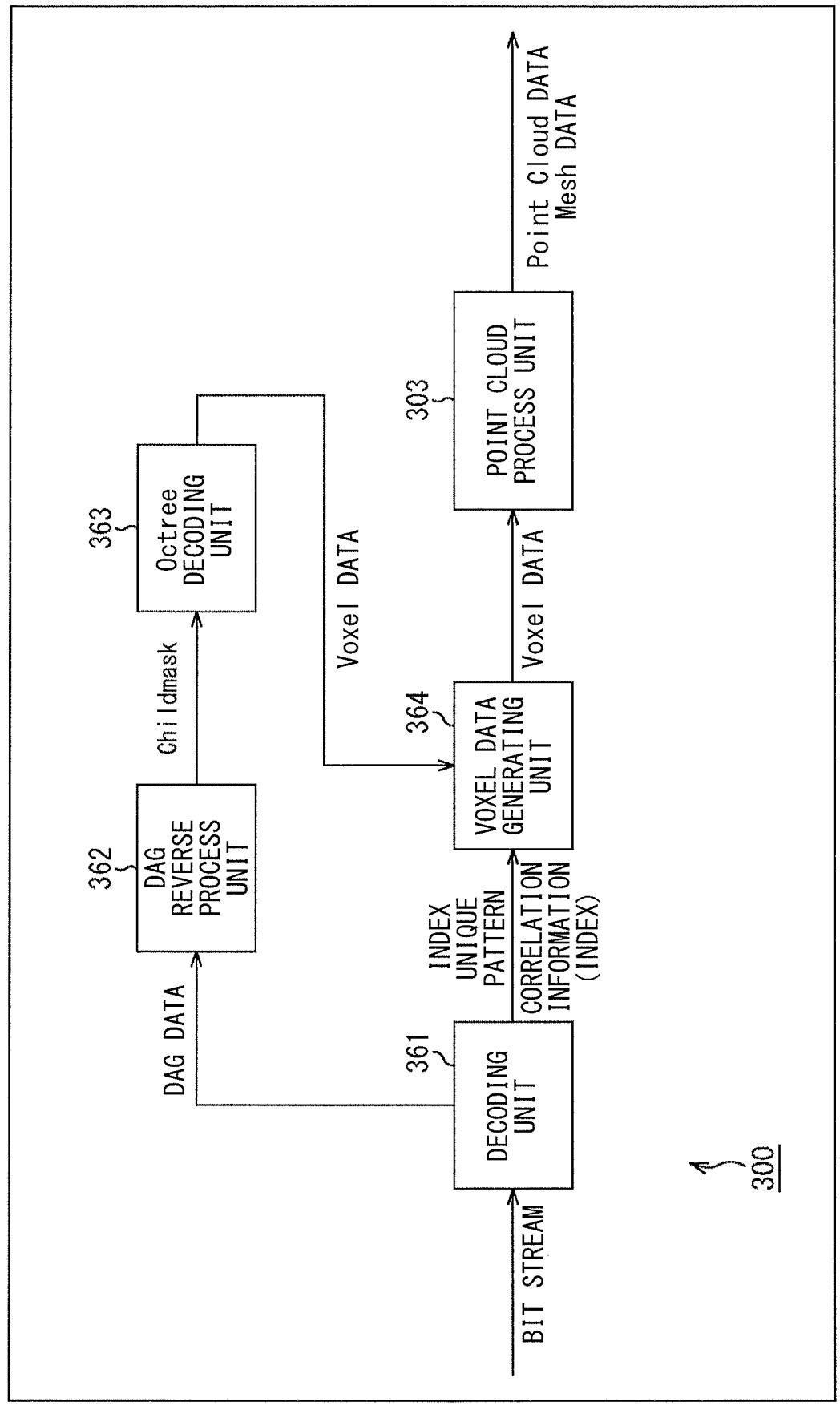
FIG. 28 is a block diagram illustrating a main configuration example of a decoding apparatus.

FIG. 28 is a block diagram illustrating a main configuration example of the decoding apparatus 300 in this case. As illustrated in FIG. 28, the decoding apparatus 300 in this case includes a decoding unit 361, a DAG reverse processing unit 362, an Octree decoding unit 363, a voxel data generating unit 364, and the point cloud processing unit 303.

The decoding unit 361 performs a process related to decoding of a bit stream. For example, the decoding unit 361 decodes the bit stream by a decoding method corresponding to the encoding method of the encoding unit 115, and extracts, from the bit stream, the correlation information of each block including an index, the information indicating the correspondence relationship between the unique pattern and the index, and DAG data which is the Octree pattern subjected to the DAG process. The decoding unit 361 supplies the extracted correlation information of each block and the information indicating the correspondence relationship between the unique pattern and the index to the voxel data generating unit 364, and supplies the DAG data to the DAG reverse processing unit 362.

It is to be noted that the decoding unit 361 may have any configuration. For example, the decoding unit 361 may include a CPU, a ROM, a RAM, and the like, and the CPU may load programs, data, and the like stored in the ROM and the like into the RAM and execute them, thereby performing a process related to decoding.

The DAG reverse processing unit 362 performs a process related to the DAG reverse process, which is a reverse process of the DAG process performed by the DAG processing unit 262. That is, the DAG reverse process is a process of generating Childmask of each node of the Octree pattern from the DAG data. The DAG reverse processing unit 362 performs this DAG reverse process on the DAG data supplied from the decoding unit 361 to generate Childmask of each node of the Octree pattern, and supplies it to the Octree decoding unit 363.

It is to be noted that the DAG reverse processing unit 362 may have any configuration. For example, the DAG reverse processing unit 362 may include a CPU, a ROM, a RAM, and the like, and the CPU may load programs, data, and the like stored in the ROM and the like into the RAM and execute them, thereby performing a process related to the DAG reverse process.

The Octree decoding unit 363 performs a process related to decoding of the Octree pattern. For example, the Octree decoding unit 363 decodes the Childmask of each node of the Octree pattern to generate voxel data. The Octree decoding unit 363 supplies the generated voxel data to the voxel data generating unit 364.

It is to be noted that the Octree decoding unit 363 may have any configuration. For example, the Octree decoding unit 363 may include a CPU, a ROM, a RAM, and the like, and the CPU may load programs, data, and the like stored in the ROM and the like into the RAM and execute them, thereby performing a process related to Octree decoding.

The voxel data generating unit 364 performs a process related to generation of voxel data. For example, the voxel data generating unit 364 converts the correlation information of each block supplied from the decoding unit 361 into a unique pattern with the use of the information indicating the correspondence relationship between the unique pattern and the index supplied from the decoding unit 361, thereby generating voxel data of each block.

The voxel data generating unit 364 supplies the generated voxel data and the voxel data supplied from the Octree decoding unit 363 to the point cloud processing unit 303. Since the process performed by the point cloud processing unit 303 is similar to that in the case of FIG. 22, its explanation is omitted.

It is to be noted that the voxel data generating unit 364 may have any configuration related to voxel data generation. For example, the voxel data generating unit 364 may include a CPU, a ROM, a RAM, and the like, and the CPU may load programs, data, and the like stored in the ROM and the like into the RAM and execute them, thereby performing a process related to generation of voxel data.

By applying the Octree encoding in this manner, the encoding using the correlation information can be made to cope with scalability. In other words, by applying the encoding using the correlation information to the Octree pattern, it is possible to suppress a decrease in encoding efficiency.

<Flow of Decoding Process>

Figure 29:
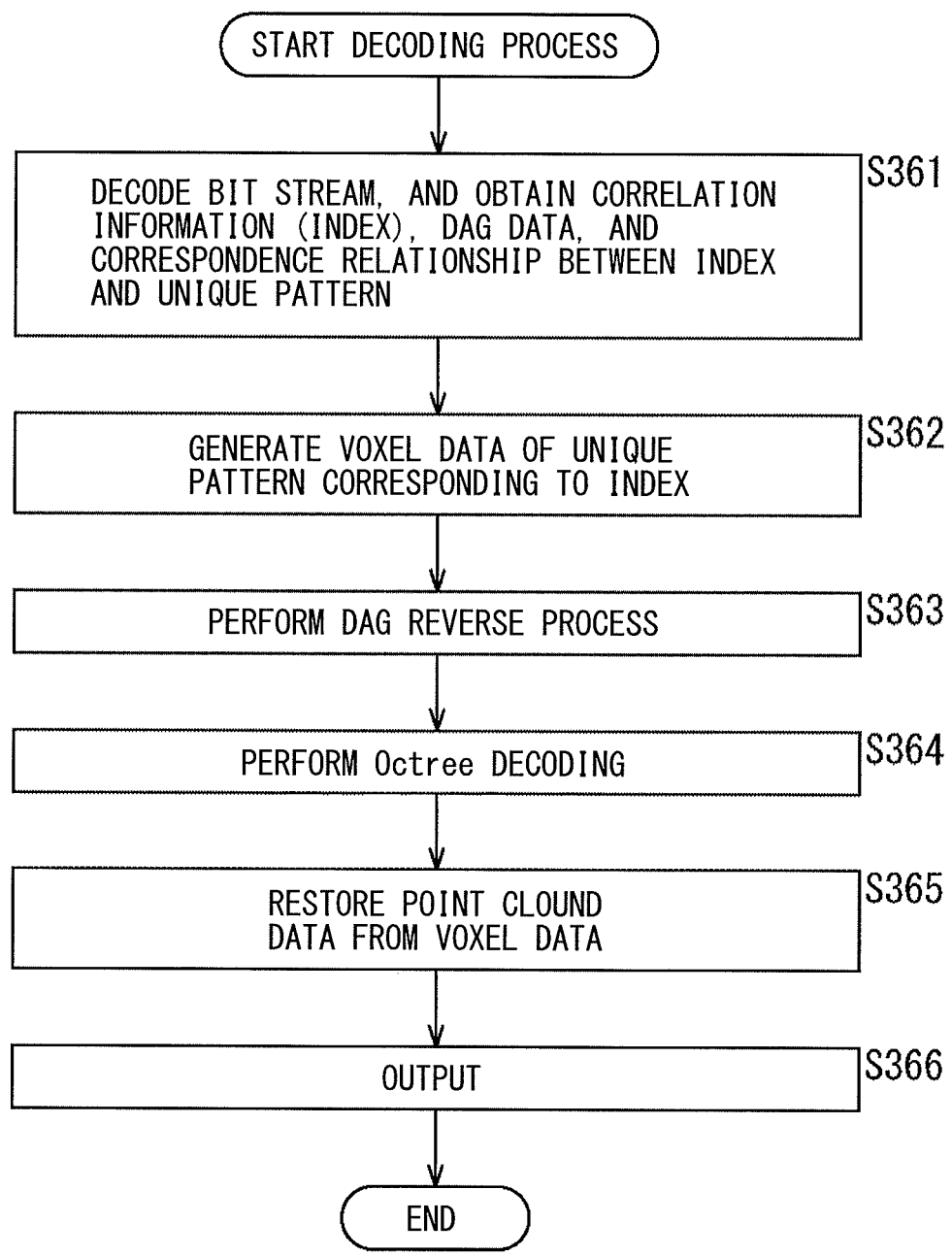
FIG. 29 is a flowchart describing an example of a flow of a decoding process.
Figure 301:
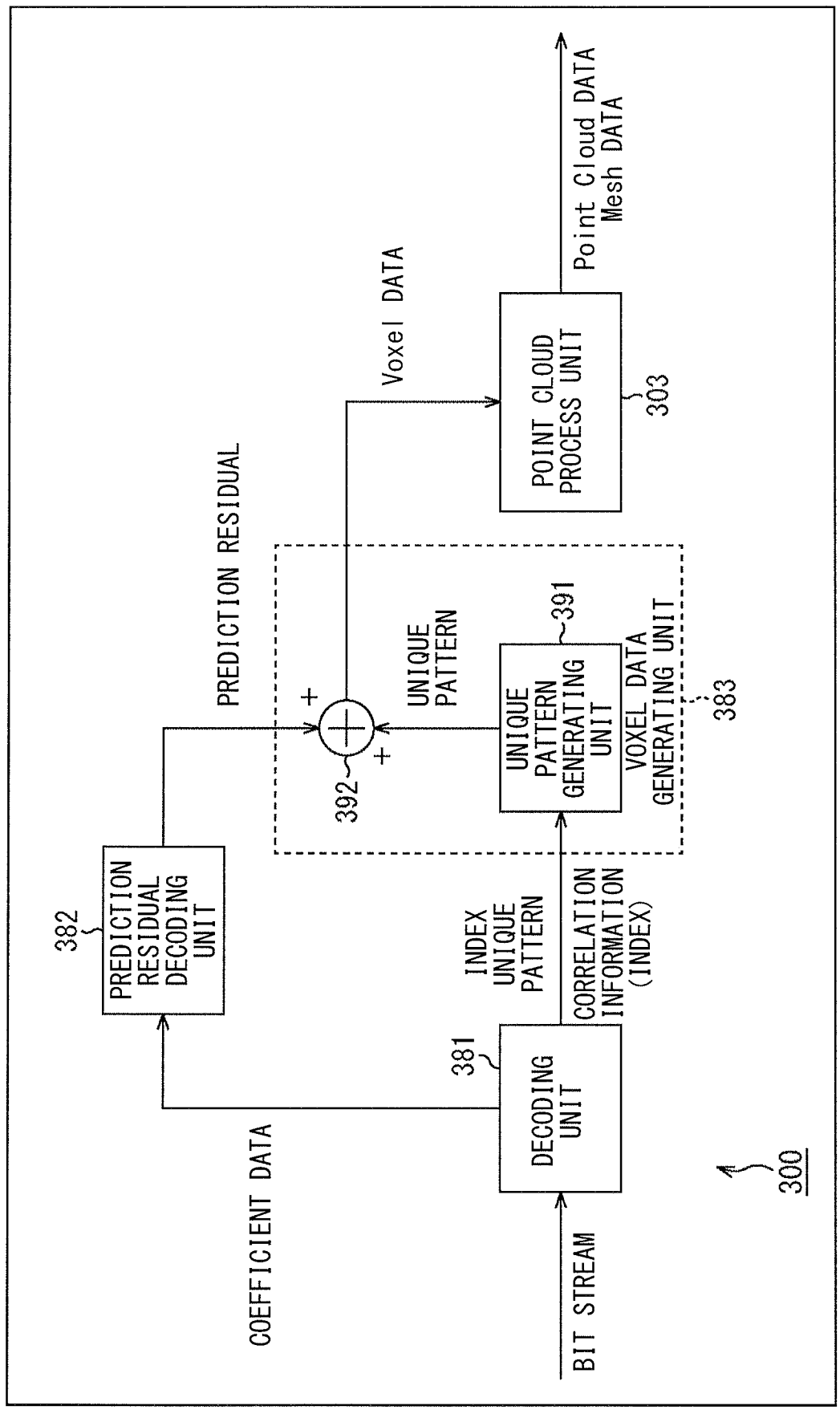

Referring to a flowchart of FIG. 29, an example of a flow of a decoding process executed by the decoding apparatus 300 in this case will be described.

When the decoding process is started, in step S361, the decoding unit 361 decodes the bit stream, and extracts the information indicating the correspondence relationship between the unique pattern and the index, the correlation information of each block including the index, and the DAG data.

In step S362, the voxel data generating unit 364 generates voxel data of each block by converting the index of the correlation information of each block into the unique pattern corresponding thereto, on the basis of the information indicating the correspondence relationship between the unique pattern and the index extracted in step S361.

In step S363, the DAG reverse processing unit 362 performs a DAG reverse process on the DAG data extracted in step S361 to generate Childmask of each node of the Octree pattern.

In step S364, the Octree decoding unit 363 performs Octree decoding on the Childmask of each node of the Octree pattern obtained by the process in step S363 to generate voxel data.

In step S365, the point cloud processing unit 303 restores the point cloud data from the voxel data obtained by the process in step S362 and the voxel data obtained by the process in step S364.

In step S366, the point cloud processing unit 303 outputs the restored point cloud data (decoded point cloud data) to outside of the decoding apparatus 300.

When the process in step S366 is completed, the decoding process is completed.

By performing the decoding process as described above, the decoding apparatus 300 in this case can make the encoding using the correlation information cope with scalability and suppress a decrease in encoding efficiency.

It is to be noted that, in the above, a case where the Octree decoding is applied to the decoding method described in the row of id=1 in the table illustrated in FIG. 9 has been described, but it is similarly applicable in a case where the Octree decoding is applied to the decoding method described in other rows in the table illustrated in FIG. 9.

<Decoding of Prediction Residual>

It is to be noted that, as described in <Transmission of Prediction Residual>, the prediction residual of the voxel data may be included in the bit stream to be decoded. Further, the prediction residual may be the one encoded (with a reduced amount of information). That is, the bit stream may include coefficient data in which the prediction residual is encoded. This method of encoding the prediction residual may be any method. For example, the prediction residual may be orthogonally transformed. Alternatively, the prediction residual may be chain-encoded. Further, quantization may be performed.

By transmitting the prediction residual in this manner, the decoding apparatus 300 can obtain a decoded image (decoded point cloud data) that is more accurate (closer to the state before encoding). That is, it is possible to improve subjective image quality of the decoded point cloud data. Further, by transmitting the prediction residual encoded as described above, it is possible to suppress a decrease in encoding efficiency.

<Decoding Apparatus>

FIG. 30 is a block diagram illustrating a main configuration example of the decoding apparatus 300 in this case. As illustrated in FIG. 30, the decoding apparatus 300 in this case includes a decoding unit 381, a prediction residual decoding unit 382, a voxel data generating unit 383, and the point cloud processing unit 303. The voxel data generating unit 383 includes a unique pattern generating unit 391 and an arithmetic operation unit 392.

The decoding unit 381 performs a process related to decoding of a bit stream. For example, the decoding unit 381 decodes the bit stream by a decoding method corresponding to the encoding method of the encoding unit 115, and extracts, from the bit stream, correlation information of each block including an index, information indicating the correspondence relationship between the unique pattern and the index, and coefficient data in which prediction residual is encoded. The decoding unit 381 supplies the extracted correlation information of each block and the extracted information indicating the correspondence relationship between the unique pattern and the index to the voxel data generating unit 383 (unique pattern generating unit 391), and supplies the coefficient data to the prediction residual decoding unit 382.

It is to be noted that the decoding unit 381 may have any configuration. For example, the decoding unit 381 may include a CPU, a ROM, a RAM, and the like, and the CPU may load programs, data, and the like stored in the ROM and the like into the RAM and execute them, thereby performing a process related to decoding.

The prediction residual decoding unit 382 performs a process related to decoding of the coefficient data. For example, the prediction residual decoding unit 382 decodes the coefficient data supplied from the decoding unit 381 by a decoding method corresponding to the encoding method performed by the prediction residual encoding unit 283 (FIG. 20) to restore the prediction residual. The prediction residual decoding unit 382 supplies the restored prediction residual to the voxel data generating unit 383 (arithmetic operation unit 392).

It is to be noted that the prediction residual decoding unit 382 may have any configuration. For example, the prediction residual decoding unit 382 may include a CPU, a ROM, a RAM, and the like, and the CPU may load programs, data, and the like stored in the ROM and the like into the RAM and execute them, thereby performing a process related to decoding of the prediction residual.

The voxel data generating unit 383 performs a process related to generation of voxel data. For example, the unique pattern generating unit 391 of the voxel data generating unit 383 performs a process related to generation of the unique pattern. For example, the unique pattern generating unit 391 converts the correlation information of each block supplied from the decoding unit 381 into a unique pattern (voxel data) with the use of the information indicating the correspondence relationship between the unique pattern and the index supplied from the decoding unit 381. The unique pattern generating unit 391 supplies the generated unique pattern of each block to the arithmetic operation unit 392.

It is to be noted that the unique pattern generating unit 391 may have any configuration. For example, the unique pattern generating unit 391 may include a CPU, a ROM, a RAM, and the like, and the CPU may load programs, data, and the like stored in the ROM and the like into the RAM and execute them, thereby performing a process related to generation of the unique pattern.

The arithmetic operation unit 392 performs a process related to generation of the voxel data. For example, the arithmetic operation unit 392 adds the prediction residual supplied from the prediction residual decoding unit 382 and the unique pattern (voxel data) of each block supplied from the unique pattern generating unit 391 to generate voxel data of each block. The arithmetic operation unit 392 supplies the generated voxel data to the point cloud processing unit 303. Since the process performed by the point cloud processing unit 303 is similar to that in the case of FIG. 22, its explanation is omitted.

It is to be noted that the arithmetic operation unit 392 may have any configuration. For example, the arithmetic operation unit 392 may include a CPU, a ROM, a RAM, and the like, and the CPU may load programs, data, and the like stored in the ROM and the like into the RAM and execute them, thereby performing a process related to generation of voxel data.

By doing so, the decoding apparatus 300 can obtain a decoded image (decoded point cloud data) that is more accurate (closer to the state before encoding). That is, it is possible to improve subjective image quality of the decoded point cloud data. Further, by transmitting the prediction residual encoded as described above, it is possible to suppress a decrease in encoding efficiency.

<Flow of Decoding Process>

Figure 31:
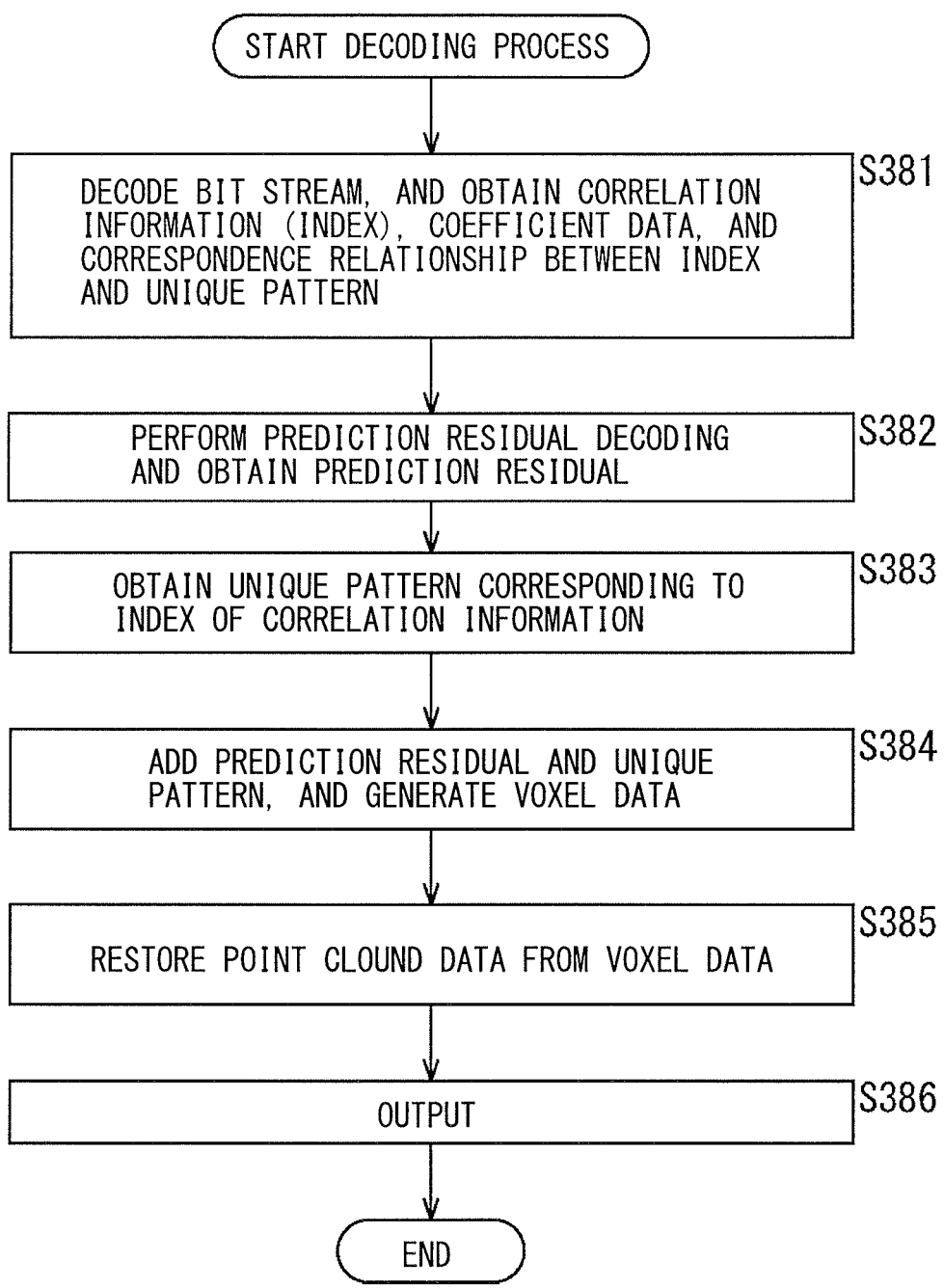
FIG. 31 is a flowchart describing an example of a flow of a decoding process.

Referring to a flowchart of FIG. 31, an example of a flow of a decoding process executed by the decoding apparatus 300 in this case will be described.

When the decoding process is started, in step S381, the decoding unit 381 decodes the bit stream, and extracts the information indicating the correspondence relationship between the unique pattern and the index, the correlation information of each block including the index, and the coefficient data of each block.

In step S382, the prediction residual decoding unit 382 performs prediction residual decoding on the coefficient data extracted in step S381 for each block to obtain a prediction residual.

In step S383, the unique pattern generating unit 391 converts the index of the correlation information of each block into a unique pattern corresponding thereto on the basis of the information indicating the correspondence relationship between the unique pattern and the index extracted in step S381.

In step S384, the arithmetic operation unit 392 adds, for each block, the prediction residual obtained in step S382 and the unique pattern obtained in step S383 to generate voxel data.

In step S385, the point cloud processing unit 303 restores the point cloud data from the voxel data obtained by the process in step S384.

In step S386, the point cloud processing unit 303 outputs the decoded point cloud data to the outside of the decoding apparatus 300.

When the process in step S386 is completed, the decoding process is completed.

By performing the decoding process as described above, the decoding apparatus 300 can obtain a more accurate decoded image (decoded point cloud data). That is, it is possible to improve subjective image quality of the decoded point cloud data. Further, by transmitting the prediction residual encoded as described above, it is possible to suppress a decrease in encoding efficiency.

It is to be noted that, in the above, a case where the transmission of the prediction residual is applied to the decoding method described in the row of id=1 in the table illustrated in FIG. 9, but it is similarly applicable also in a case where the transmission of the prediction residual is applied to the decoding method described in other rows in the table illustrated in FIG. 9.

<Reference to Attribute Information>

Further, when encoding the position information described above, the attribute information may also be encoded with the use of the correlation information in a similar manner. For example, the attribute information (for example, the RGB/YUV pixel values after decoding the color information) of the block to be referred to for the positional information (structural information), the unique pattern, or the predefined unique pattern may be used also for the current block. In this case, the bit stream does not include the attribute information of the block for which the attribute information of the block to be referred to is reused. Therefore, the decoding apparatus 300 restores the attribute information of the current block with the use of the attribute information of the one to be referred to corresponding to the correlation information extracted from the bit stream.

In addition, for example, the encoding method (for example, a color prediction mode or the like) of the attribute information of the block to be referred to for the positional information (structural information), the unique pattern, or the predefined unique pattern may be used also for the current block. In this case, the decoding apparatus 300 decodes the attribute information of the current block by using a decoding method corresponding to the encoding method of the attribute information of the one to be referred to corresponding to the correlation information extracted from the bit stream.

Further, for example, a filtering method (color format conversion, a chroma sub-sampling method, a de-noise method such as de-blocking, or the like) of the attribute information of the block to be referred to for the positional information (structural information), the unique pattern, or the predefined unique pattern may also be used for the current block. In this case, the decoding apparatus 300 filters the attribute information of the current block by using the filtering method of the attribute information of the one to be referred to corresponding to the correlation information extracted from the bit stream.

By doing so, it is possible to reduce the redundancy of the attribute information of the bit stream, and to suppress a decrease in encoding efficiency.

4. Third Embodiment

<Calculation of Correlation Degree in Consideration of Subjective Image Quality>

As an index for evaluating the degree of similarity (correlation degree) between data, for example, PSNR (Peak signal-to-noise ratio) or the like has been proposed. However, since a general evaluation index such as PSNR performs evaluation as general data, it does not necessarily correspond to subjective image quality (good appearance). Therefore, in the evaluation of the correlation degree of the point cloud data (voxel data), if only merging of the node considering the RD-optimal is performed by using only such a general evaluation index, subjective deterioration may be noticeable in the decoded point cloud data.

Further, in such a general evaluating index, a processing cost of calculation is extremely large, and there has been a possibility that the processing time increases as it becomes difficult to achieve a real-time process.

Therefore, in the comparison in voxel data where the point cloud data is quantized, the correlation degree of the distribution pattern between the voxel data to be compared is calculated on the basis of a subjective feature of the distribution pattern of values of voxel data.

For example, in the information processing apparatus, in the comparison of the voxel data resulting from quantization of point cloud data, a correlation degree calculating unit is provided that calculates the correlation degree of the distribution pattern between the voxel data to be compared on the basis of the subjective feature of the distribution pattern of values of voxel data.

By doing so, it is possible to suppress a decrease in subjective image quality of the decoded point cloud data.

<Correlation Arithmetic Operation Unit>

Figure 32:
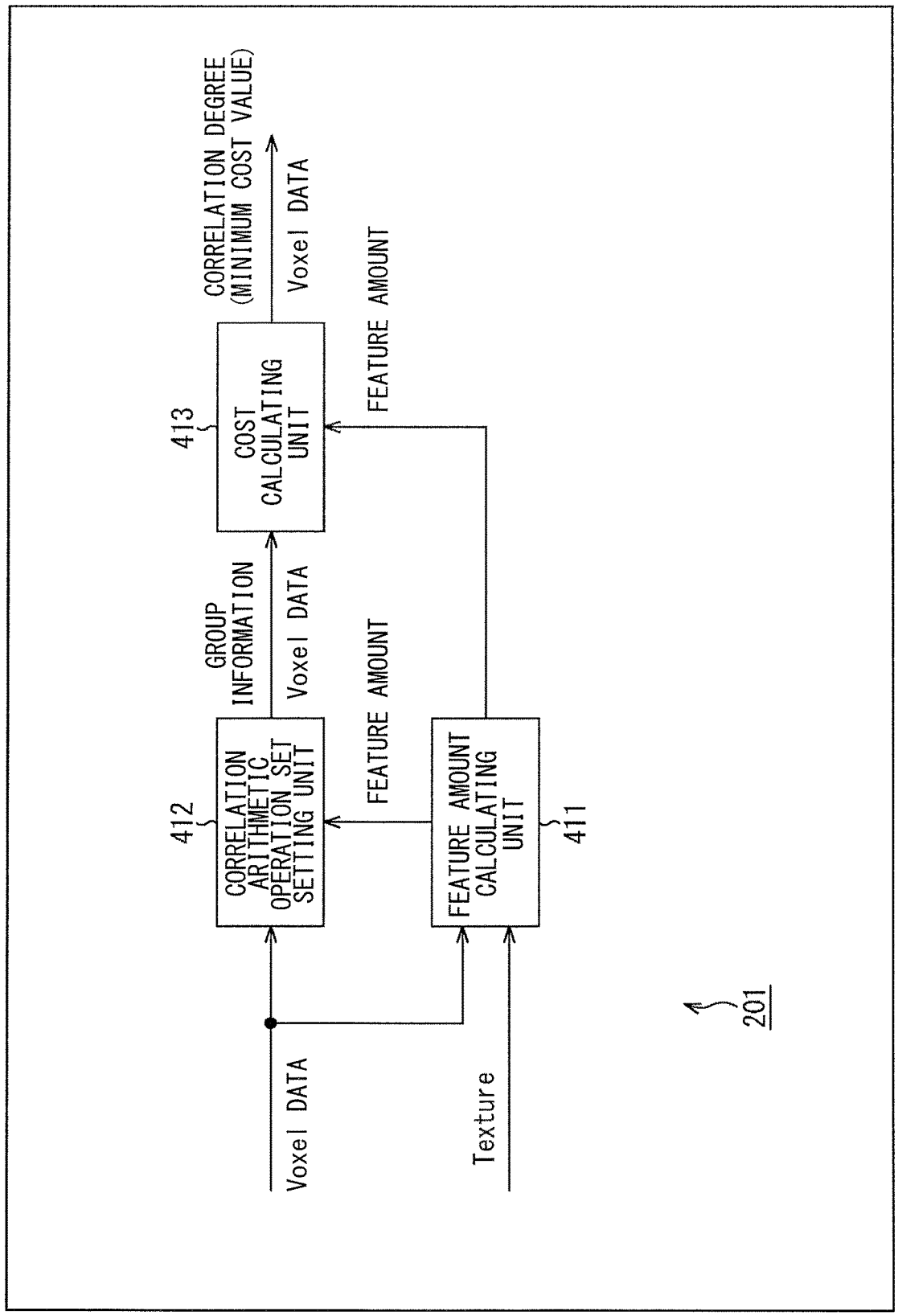
FIG. 32 is a block diagram illustrating a main configuration example of a correlation arithmetic operation unit.

FIG. 32 is a block diagram illustrating a main configuration example of the correlation arithmetic operation unit 201 (FIG. 11) of the encoding apparatus 100. As illustrated in FIG. 32, the correlation arithmetic operation unit 201 in this case includes a feature amount calculating unit 411, a correlation arithmetic operation group setting unit 412, and a cost calculating unit 413.

The feature amount calculating unit 411 performs a process related to calculation of a feature amount. For example, the feature amount calculating unit 411 calculates a subjective feature amount (that influences appearance) of the point cloud data on the basis of the voxel data and its texture. The feature amount calculating unit 411 supplies the calculated feature amount to the correlation arithmetic operation group setting unit 412 and the cost calculating unit 413.

It is to be noted that the feature amount calculating unit 411 may have any configuration. For example, the feature amount calculating unit 411 may include a CPU, a ROM, a RAM, and the like, and the CPU may load programs, data, and the like stored in the ROM and the like into the RAM and execute them, thereby performing a process related to calculation of the feature amount.

The correlation arithmetic operation group setting unit 412 performs a process related to setting of voxel data group for which the correlation arithmetic operation is to be performed. For example, the correlation arithmetic operation group setting unit 412 sets voxel data whose correlation of the distributed pattern is to be compared with the current block on the basis of the feature amount supplied from the feature amount calculating unit 411. That is, the correlation arithmetic operation group setting unit 412 sets voxel data to be compared for each block. The correlation arithmetic operation group setting unit 412 supplies information (group information) indicating the set group and the voxel data to the cost calculating unit 413.

It is to be noted that the correlation arithmetic operation group setting unit 412 may have any configuration. For example, the correlation arithmetic operation group setting unit 412 may include a CPU, a ROM, a RAM, and the like, and the CPU may load programs, data, and the like stored in the ROM and the like into the RAM and execute them, thereby performing a process related to setting of a group.

The cost calculating unit 413 performs a process related to cost calculation. For example, the cost calculating unit 413 calculates a correlation degree (cost) for each group of voxel data set by the correlation arithmetic operation group setting unit 412. For example, the cost calculating unit 413 calculates the correlation degrees between the voxel data of the current block and all the voxel data set by the correlation arithmetic operation group setting unit 412. That is, the cost calculating unit 413 calculates the correlation degrees for all the voxel data set as the targets to be compared for each block. It is to be noted that the cost calculating unit 413 also uses the feature amount calculated by the feature amount calculating unit 411 to calculate the correlation degree (cost value).

In addition, the cost calculating unit 413 specifies a group in which the cost value is the smallest in each group (and also obtains the smallest cost value). The cost calculating unit 413 supplies such a calculation result of the cost value to the unique pattern setting unit 202 (FIG. 11) as the correlation degree.

It is to be noted that the cost calculating unit 413 may have any configuration. For example, the cost calculating unit 413 may include a CPU, a ROM, a RAM, and the like, and the CPU may load programs, data, and the like stored in the ROM and the like into the RAM and execute them, thereby performing a process related to calculation of cost.

<Flow of Correlation Arithmetic Operation Process>

Next, referring to a flowchart of FIG. 33, an example of a flow of a correlation arithmetic operation process executed in step S121 of FIG. 13 will be described.

When the correlation arithmetic operation process is started, the feature amount calculating unit 411 calculates a subjective feature amount of the point cloud data on the basis of the voxel data and the texture in step S401.

In step S402, the correlation arithmetic operation group setting unit 412 sets a group of blocks for which correlation arithmetic operation is to be performed.

At this time, the correlation arithmetic operation group setting unit 412 may limit the target to be compared to a portion of blocks, for example. By doing so, the correlation arithmetic operation group setting unit 412 can suppress an increase in the number of groups for which the correlation arithmetic operation is to be performed, and can suppress an increase in the correlation arithmetic operation processing amount (processing time).

For example, the correlation arithmetic operation group setting unit 412 may so set a group of blocks for which correlation arithmetic operation is to be performed that the correlation is calculated only for the block (node) that is in a place spatially close to the current block (current node). For example, the correlation arithmetic operation group setting unit 412 may set voxel data to be compared with the current block within a predetermined spatial range. Generally, a block that is in a spatially-close place has a relatively high correlation degree. Therefore, by limiting the block to be compared to a spatially-close place in this manner, it is possible to more easily detect a group having a higher correlation degree while suppressing an increase in processing amount (processing time) of the correlation arithmetic operation.

Further, for example, the correlation arithmetic operation group setting unit 412 may so set a group blocks for which the correlation arithmetic operation is to be performed that the correlation calculation is performed at a level higher by one level in the Octree pattern. For example, the correlation arithmetic operation group setting unit 412 may set voxel data to be compared with the current block in a hierarchy higher than the hierarchy to be processed of the hierarchized voxel data.

Figure 34:
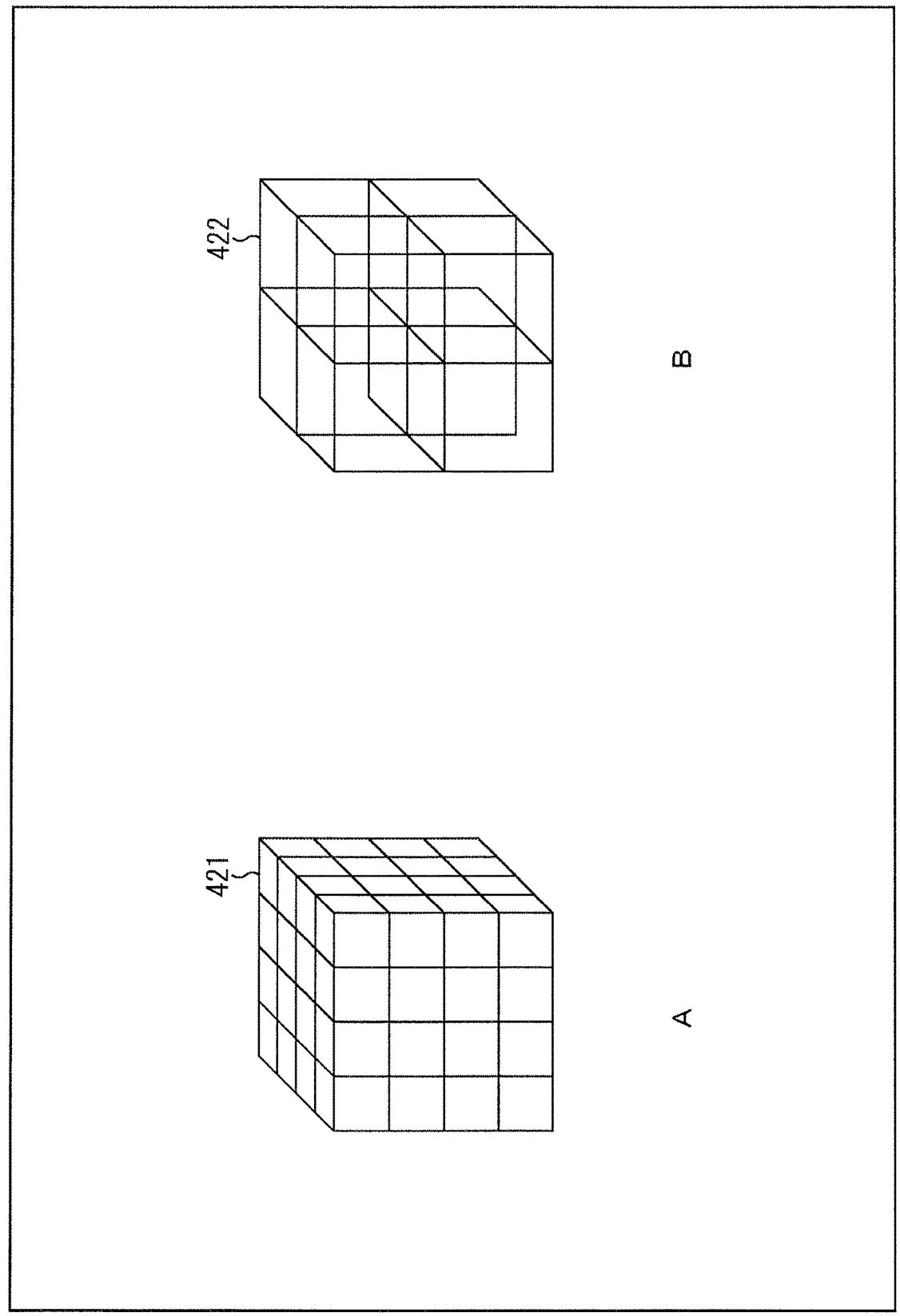
FIG. 34 is a diagram illustrating an example of a search range.

For example, if a block 421 including 4×4×4 voxels illustrated in A of FIG. 34 is to be processed, the block 421 includes 2×2×2 voxels as with a block 422 illustrated in B of FIG. 34 at a level higher by one level. That is, the higher the level is, the smaller the number of voxels becomes. Therefore, calculation of correlation at a higher level can suppress an increase in the correlation arithmetic operation processing amount (processing time).

Further, for example, the correlation arithmetic operation group setting unit 412 may so set a group of blocks for which the correlation arithmetic operation is to be performed that the correlation degree is calculated only for a representative pattern. Further, the representative pattern may be a fixed pattern (a pattern that is not to be updated) that is determined in advance. For example, the correlation arithmetic operation group setting unit 412 may set voxel data of a predetermined fixed representative distribution pattern as the voxel data to be compared with the current distribution block.

Of course, this representative pattern may be updateable. For example, the representative pattern may be updated for each frame. For example, it may be updated (to a pattern in accordance with statistical information) on the basis of statistical information in the frame. Further, for example, it may be updated (to a pattern in accordance with statistical information) on the basis of the statistical information of a process in the past. For example, the correlation arithmetic operation group setting unit 412 may set the voxel data of an updatable representative distributive pattern t as the voxel data to be compared with the current block.

By limiting the pattern to be compared in this manner, an increase in the processing amount (processing time) of the correlation arithmetic operation can be suppressed.

Returning to FIG. 33, in step S403, the cost calculating unit 413 calculates a cost value for correlation of each group set in step S402. It is to be noted that this method of calculating the cost value may be any method. For example, the cost calculating unit 413 may calculate the cost value for each group by a plurality of methods. For example, the cost calculating unit 413 may calculate a plurality of cost values by different methods for each group, and select the smallest of the cost values as the cost value of the group.

When the process in step S403 is completed, the correlation arithmetic operation process is completed, and the process returns to FIG. 13.

<Flow of Cost Calculation Process>

Figure 35:
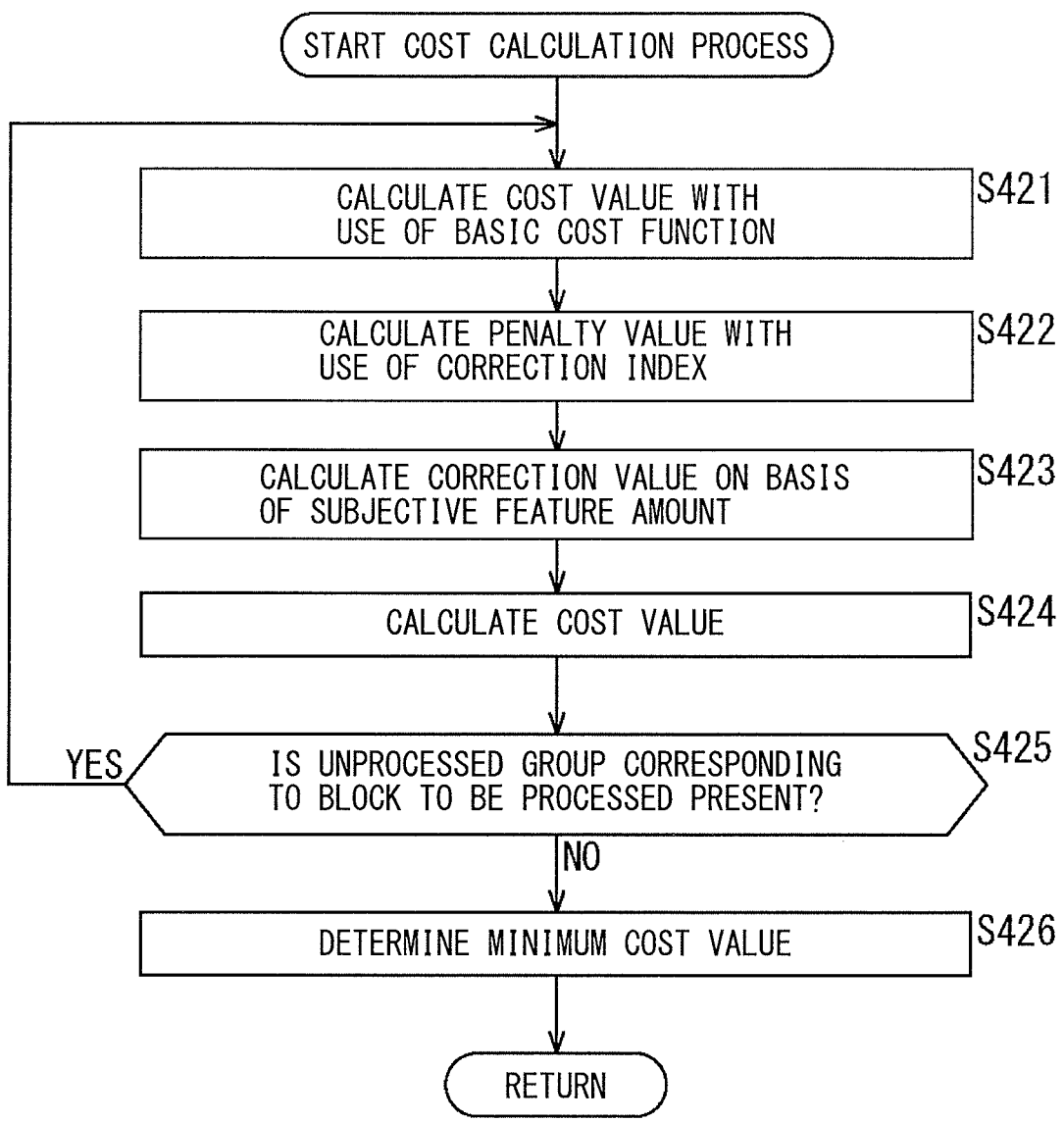
FIG. 35 is a flowchart describing an example of a flow of a cost calculation process.

Next, referring to a flowchart of FIG. 35, an example of a flow of cost calculation process executed in the step S403 of FIG. 33 will be described.

When the cost calculation process is started, the cost calculating unit 413 calculates a cost value for the group to be processed with the use of a basic cost function in step S421. As the basic cost function, a general cost function is used. This cost function may be any function. For example, the cost function may be a cost function described in a table in FIG. 36.

In the table in FIG. 36, Hausdorff Distance is a function for evaluating the maximum values of the shortest distance between two point groups by obtaining the maximum value from both directions. It is possible to evaluate the strength of correlation between voxel data by considering voxel data (point cloud data) as a point group and evaluating a distance between two point groups with the use of this evaluation function.

Further, PSNR Point2Point is a function for evaluating PSNR of the shortest distance between two points. By evaluating the distance between the points between voxel data with the use of this evaluation function, the strength of correlation between voxel data can be evaluated.

Further, PSNR Point2Surface is a function for evaluating PSNR of the shortest distance between a point and a plane. The strength of the correlation between voxel data can be evaluated by evaluating the distance between each point of one voxel data and a plane perpendicular to the normal vector of each point of the other voxel data with the use of this evaluation function.

Further, Hamming Distance is a function for comparing bit strings and evaluating the number of bits having values different from each other. The voxel data is regarded as a bit string, and two bit strings are compared and evaluated with the use of this evaluation function, whereby the strength of correlation between voxel data can be evaluated.

In step S421, the cost calculating unit 413 calculates a cost value by any one or any combination of these cost functions (evaluation functions).

However, these cost functions (evaluation functions) do not consider subjective image quality. Therefore, returning to FIG. 35, the cost calculating unit 413 calculates a penalty value for the group to be processed with the use of a correction index in step S422. The penalty value is a value indicating that the correlation is subjectively weak. By adding this value to the cost value, the cost value is increased (i.e., the correlation degree is evaluated to be lower).

For example, the penalty value is calculated by index 0 to index 3 as illustrated in FIG. 37. In a case of the index 0 illustrated in A of FIG. 37, in the voxel data for which correlation is to be evaluated, a penalty value is set in a case where X points ($0<X\leq8$) or more are decreased in 2×2×2 voxels (voxels illustrated in grey) in a block 431 including 4×4×4 voxels.

Further, for example, in a case of the index 1 illustrated in B of FIG. 37, in the voxel data for which correlation is to be evaluated, a penalty value is set in a case where X points ($0<X\leq4$) or more are decreased in 4×1×1 voxels (voxels illustrated in grey) in the block 431 including 4×4×4 voxels.

Further, for example, in a case of the index 2 illustrated in C of FIG. 37, in the voxel data for which correlation is to be evaluated, a penalty value is set in a case where X points ($0<X\leq8$) or more are decreased in 4×2×1 voxels (voxels illustrated in grey) in the block 431 including 4×4×4 voxels.

Further, for example, in a case of the index 3 illustrated in D of FIG. 37, in the voxel data for which correlation is to be evaluated, a penalty value is set in a case where X points ($0<X\leq16$) or more are decreased in 4×4×1 voxels (voxels illustrated in grey) in the block 431 including 4×4×4 voxels.

The penalty value set here may be any value as long as it is a positive value. The value may be varied in accordance with the decrease amount of the point.

That is, these indices (correction indices) each define a range of a predetermined shape in the voxel data for which the strength of correlation is to be calculated. In a case where the distribution patterns differ from each other in the range by a predetermined reference or more, it is evaluated that the correlation between the voxel data is weaker (than the strength of correlation calculated with the use of the basic cost function).

The shape of the range is a distribution pattern having a subjective feature (subjectively-identifiable distribution pattern). For example, it may be a line, a plane, or the like. That is, this correction index is an index for calculating the correlation degree between voxel data to be lower in a case where any of the voxel data to be compared does not have a distribution pattern of an apparent predetermined shape. In other words, this correction index is an index for evaluating the correlation degree between the voxel data to be higher in a case where all of the voxel data to be compared have the distributed pattern with an apparent shape.

For example, even in a case where the subjective distribution pattern (the appearance shape of the distribution pattern) is completely different, the correlation characteristic may be evaluated to be strong in the basic cost function described above in some cases. In such a case, the voxel data is subjected to merging on a block unit basis. Therefore, there is a possibility that the decoding point cloud data has a structure with a great difference when viewed subjectively. In contrast, the above-described correction index evaluates the correlation degree by considering the subjective feature. Therefore, it is possible to suppress such occurrence of subjective variation. Accordingly, it is possible to suppress a decrease in subjective image quality of the decoded point cloud data.

It is to be noted that the index 0 to the index 3 have been described above; however, the number of correction indices to be applied may be any number. In addition, the shape of each index range may be any shape and is not limited to the examples described above as long as it has an (apparent) subjective feature.

Figure 33:
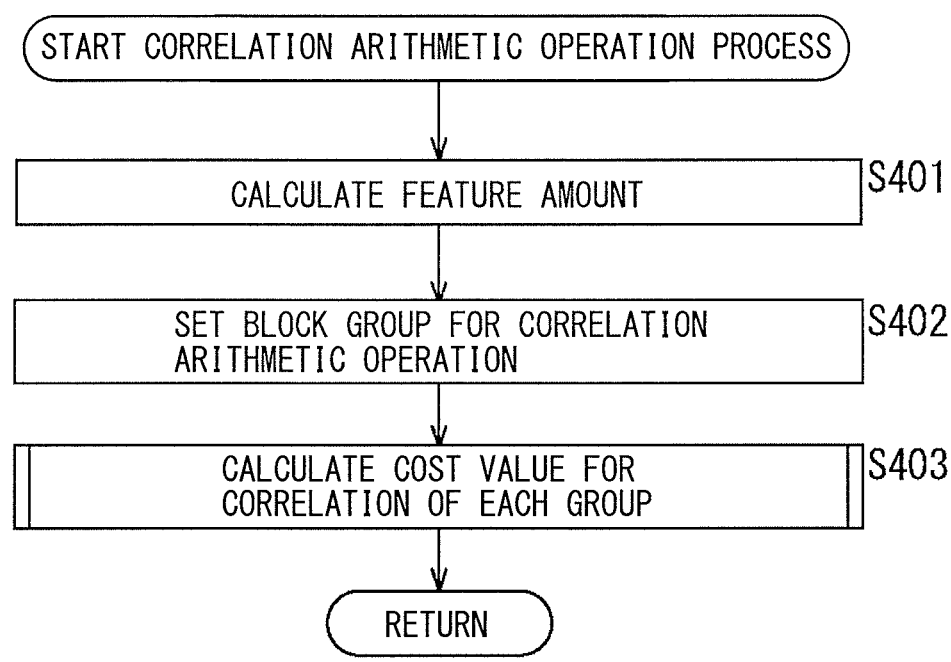
FIG. 33 is a flowchart describing an example of a flow of a correlation arithmetic operation process.

Returning to FIG. 35, in step S423, the cost calculating unit 413 calculates a correction value for the group to be processed on the basis of the subjective feature amount calculated in step S401 (FIG. 33).

That is, the correlation degree is evaluated in accordance with which subjective feature is included in a portion, in the entire point cloud data, in which the block to be subjected to calculation of correlation is located.

For example, in a case where the texture of the block for which correlation is to be calculated is finer than a predetermined reference, there is a high possibility that the difference in the distribution pattern has a greater subjective influence (has greater variation in appearance). Therefore, the cost calculating unit 413 may so calculate the correction value as to calculate the correlation degree value to be lower. For example, in that case, the cost calculating unit 413 may so set a positive correction value that the cost value becomes greater.

Further, for example, in a case where the block for which correlation is to be calculated has a color peak point, there is a high possibility that the difference in distribution pattern has a greater subjective influence (has greater variation in appearance). Therefore, the cost calculating unit 413 may so calculate the correction value as to calculate the correlation degree to be lower. For example, in a case where the block for which correlation is to be calculated includes a voxel having a color component that is to be a peak with respect to the surrounding voxels, the cost calculating unit 413 may so set the positive correction value that the cost value becomes greater.

Further, for example, in a case where the block for which correlation is to be calculated is a block in a region having a higher degree of attention, there is a high possibility that the difference in the distribution pattern has a greater subjective influence (the variation is more noticeable). Therefore, the cost calculating unit 413 may so calculate the correction value as to calculate the correction value to be lower. For example, in that case, the cost calculating unit 413 may so set the positive correction value that the cost value becomes greater.

Further, for example, in a case where the block for which correlation is to be calculated is a block corresponding to a human face portion in a three-dimensional structure drawn by a point cloud, there is a high possibility that a difference in distribution pattern has a greater subjective influence (the variation is more noticeable). Therefore, the cost calculating unit 413 may so calculate the correction value as to calculate the correlation degree to be lower. For example, in that case, the cost calculating unit 413 may so set the positive correction value that the cost value becomes greater.

Further, for example, in a case where the block for which correlation is to be calculated is a block corresponding to an edge portion in a three-dimensional structure drawn by a point cloud, there is a high possibility that a difference in distribution pattern has a greater subjective influence (the variation is more noticeable). Therefore, the cost calculating unit 413 may so calculate the correction value as to calculate the correlation degree to be lower. For example, in that case, the cost calculating unit 413 may so set the positive correction value that the cost value becomes greater.

Further, for example, in a case where the block for which correlation is calculated is a block including at least one of four points included in a surface in a three-dimensional structure drawn by a point cloud, the cost calculating unit 413 may so calculate the correction value as to calculate the correction value to be lower. For example, if four points are left in a surface in a three-dimensional structure drawn by a point cloud, the surface can be restored using the four points. Accordingly, the cost calculating unit 413 may so set the positive correction value that at least four points remain in a surface portion of a three-dimensional structure drawn by a point cloud.

By doing so, the cost value can be corrected on the basis of the subjective feature of the block. Therefore, it is possible to suppress occurrence of subjective variation. Accordingly, it is possible to suppress a decrease in subjective image quality of the decoded point cloud data.

It is to be noted that the subjective feature for which the correction value is set by the cost calculating unit 413 may be any feature and is not limited to the examples described above. Further, the number of the subjective features for which the correction value is set by the cost calculating unit 413 may be any number. Further, each of the values of the correction values set by the cost calculating unit 413 for the above-described subjective features may be any value. For example, a value corresponding to the subjective feature may be set.

Returning to FIG. 35, in step S424, the cost calculating unit 413 calculates a final cost value (final cost value) corresponding to the group to be processed with the use of the values calculated in respective steps S421 to S423. That is, the cost calculating unit 413 calculates the final cost value by considering the subjective feature. Accordingly, it is possible to suppress a decrease in subjective image quality of the decoded point cloud data.

In step S425, the cost calculating unit 413 determines whether or not an unprocessed group corresponding to the current block is present. In a case where it is determined that the unprocessed group is present, the unprocessed group is set as a new processing target, and the process returns to step S421. That is, the processes in steps S421 to S425 are executed for each group corresponding to the current block.

Further, in a case where it is determined in step S425 that all the groups corresponding to the current block have been processed, the process proceeds to step S426.

In step S426, the cost calculating unit 413 obtains the minimum value (minimum cost value) among the final cost values of respective groups calculated as described above, and specifies a group corresponding to the minimum cost value.

When the process in step S426 is completed, the cost calculation process is completed, and the process returns to FIG. 33.

<Setting of Unique Pattern>

For example, as described referring to FIG. 11, the cost value calculated as described above is supplied to the unique pattern setting unit 202, and the cost value is used for setting of the unique pattern. For example, in a case where it is determined that the cost value is sufficiently small (the distribution patterns coincide with or approximate each other), the unique pattern setting unit 202 sets the unique pattern with the use of the distribution pattern of the group of the voxel data.

A method of setting the unique pattern at that time may be any method. For example, the unique pattern setting unit 202 may use a distribution pattern having a higher frequency of presence as the unique pattern. For example, as illustrated in A of FIG. 38, it is assumed that a block 451 and a block 452 are determined to have approximating distribution patterns. Here, assuming that the distribution pattern of the block 452 has a higher frequency of presence than the distribution pattern of the block 451, the unique pattern setting unit 202 adopts the distribution pattern of the block 452 as the unique pattern, as illustrated in B of FIG. 38.

Further, for example, the unique pattern setting unit 202 may evaluate the distribution pattern on the basis of a predetermined reference, and may use the distribution pattern having a higher evaluation value (score) as the unique pattern. For example, a distribution pattern serving as a model may be determined in advance, and a distribution pattern most approximates the distribution pattern of the model may be used as the unique pattern. For example, assuming that the distribution pattern of the block 451 most approximates the distribution pattern of the model, the unique pattern setting unit 202 adopts the distribution pattern of the block 451 as the unique pattern, as illustrated in C of FIG. 38.

Further, for example, the unique pattern setting unit 202 may set, as the unique pattern, a new distribution pattern derived by a predetermined method with the use of each distribution pattern. For example, the unique pattern setting unit 202 adopts, as the unique pattern, a new distribution pattern obtained by mixing the distribution pattern of the block 451 and the distribution pattern of the block 452, as a block 453 illustrated in D of FIG. 38.

By setting the unique pattern with the use of the distribution pattern for which the correlation degree is calculated in this manner, it is possible to suppress a decrease in subjective image quality of the decoded point cloud data.

<Early Termination>

The above-described cost value calculation process may be terminated before all cost values are calculated in accordance with a portion of the calculated cost values.

For example, in a case where the cost value calculated with the use of the basic cost function is equal to or greater than a predetermined reference, it may be determined that the correlation characteristic of distribution pattern of the group is low (the distribution patterns do not coincide with or approximate each other), and the calculation of the penalty value, the correction value, or the like may be omitted. Further, for example, in a case where the calculated penalty value is equal to or greater than a predetermined reference, it may be determined that the correlation characteristic of distribution patterns of the group is low (the distribution patterns do not coincide with or approximate each other), and the calculation of the correction value may be omitted.

Further, for example, in a case where the calculated final cost value of a certain group of the current block is equal to or smaller than a predetermined reference, it may be determined that the correlation characteristic of the distribution patterns of the group is sufficiently high (it is the group having the distribution patterns that coincide with or approximate each other), and the calculation of the cost values of other groups of the current block may be omitted.

<Flow of Cost Value Calculation Process>

Figure 39:
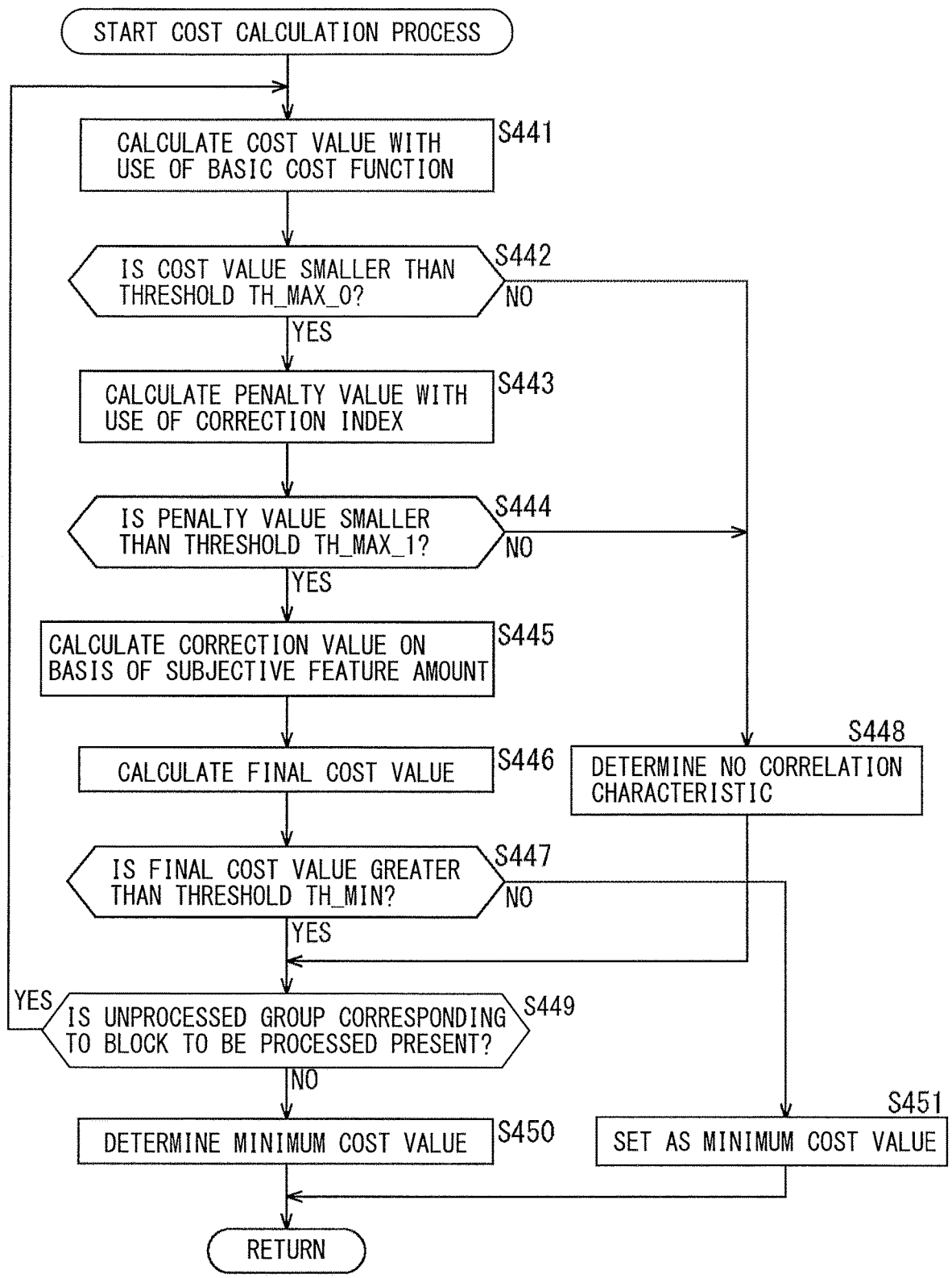
FIG. 39 is a flowchart describing an example of a flow of a cost calculation process.

Referring to a flowchart of FIG. 39, an example of a flow of cost calculation process executed in step S403 of FIG. 33 in this case will be described.

When the cost calculation processing is started, the cost calculating unit 413 calculates a cost value for a group to be processed with the use of the basic cost function in step S441.

In step S442, the cost calculating unit 413 determines whether or not the cost value is smaller than a predetermined threshold TH_MAX_0 that is determined in advance. In a case where it is determined that the cost value is smaller than the predetermined threshold TH_MAX_0 that is determined in advance, the process proceeds to step S443.

In step S443, the cost calculating unit 413 calculates a penalty value for the group to be processed with the use of the correction index.

In step S444, the cost calculating unit 413 determines whether or not the penalty value is smaller than a predetermined threshold TH_MAX_1 that is determined in advance. In a case where it is determined that the cost value is smaller than the predetermined threshold TH_MAX_1 determined in advance, the process proceeds to step S445.

In step S445, the cost calculating unit 413 calculates a correction value for the group to be processed, on the basis of the subjective feature amount calculated in step S401 (FIG. 33).

In step S446, the cost calculating unit 413 calculates a final cost value (final cost value) corresponding to the group to be processed with the use of the values calculated in respective steps S441, S443, and S445. That is, the cost calculating unit 413 calculates the final cost value by considering the subjective feature. Accordingly, it is possible to suppress a decrease in subjective image quality of the decoded point cloud data.

In step S447, the cost calculating unit 413 determines whether or not the final cost value is greater than a predetermined threshold TH_MIN determined in advance. In a case where it is determined that the final cost value is smaller than the predetermined threshold TH_MIN that is determined in advance, the process proceeds to step S449.

Further, in a case where it is determined in step S442 that the cost value calculated in step S441 is equal to or greater than the threshold TH_MAX_0, the process proceeds to step S448. Further, in a case where it is determined in step S444 that the penalty value calculated in step S443 is equal to or greater than the threshold value TH_MAX_1, the process proceeds to step S448.

In step S448, the cost calculating unit 413 determines that there is no correlation characteristic between the distribution patterns of the group to be processed (the distribution patterns do not coincide with or approximate each other). When the process in step S448 is completed, the process proceeds to step S449.

In step S449, the cost calculating unit 413 determines whether or not an unprocessed group corresponding to the current block is present. In a case where it is determined that an unprocessed group is present, the unprocessed group is set as a new processing target, and the process returns to step S441. That is, the processes in steps S441 to S449 are executed for each group corresponding to the current block.

Further, in a case where it is determined in step S449 that all of the groups corresponding to the current block have been processed, the process proceeds to step S450.

In step S450, the cost calculating unit 413 obtains the minimum value (minimum cost value) among the final cost values of the respective groups calculated as described above, and specifies a group corresponding to the minimum cost value.

When the process in step S450 is completed, the cost calculation process is completed, and the process returns to FIG. 33.

Further, in a case where it is determined in step S447 that the final cost value is equal to or smaller than the threshold TH_MIN, the process proceeds to step S451.

In step S451, the cost calculating unit 413 determines that the correlation characteristic of the distribution patterns is sufficiently high (the distribution patterns coincide with or approximate each other) for the group corresponding to the final cost value, and sets the cost value as the minimum cost value (prior to calculating the final cost values of all of the groups). When the process in step S451 is completed, the cost calculation process is completed, and the process returns to FIG. 33.

By appropriately omitting a process having low usefulness according to the calculated cost value in the above-described manner, it is possible to suppress an increase in processing amount (processing time) of the cost value calculation process.

<Application Examples of Correlation Arithmetic Operation>

In the above, the case where the signal string generating unit 114 encodes the voxel data by the method described in the row of id=1 in the table illustrated in FIG. 9 has been described; however, the correlation arithmetic operation to which the present technology is applied can be applied also to a case where the voxel data is encoded by any method as long as the method performs the correlation arithmetic operation.

For example, the correlation arithmetic operation to which the present technology is applied can be applied in a similar manner to that in the above-described example to a case where the voxel data is encoded by the method described in any of the rows of id=1 to 6 in the table illustrated in FIG. 9. In addition, it can be applied in a similar manner to that in the above-described example also to a case where the Octree encoding, the DAG process, or the like is used in combination. Further, it can be applied in a similar manner to that in the above-described example also to a case where the prediction residual is transmitted.

Further, in the above, a description has been given that the correlation arithmetic operation to which the present technology is applied is applied to the encoding of the point cloud data; however, the above-described correlation arithmetic operation to which the present technology is applied can be applied to any process using the correlation arithmetic operation.

For example, it can be applied also to a correlation arithmetic operation performed in registration of a point cloud. The registration (Registration) of a point cloud is used, for example, for synthesizing point clouds (Point clouds) captured from a plurality of viewpoints, synthesizing point cloud data consecutive in a time direction, or the like.

For the registration (Registration) of a point cloud, a search algorithm is used to so determine a displacement amount that an error of the position information of each point cloud is minimized. As the index of the error used at this time, the correlation arithmetic operation to which the present technology is applied may be applied.

Figure 40:
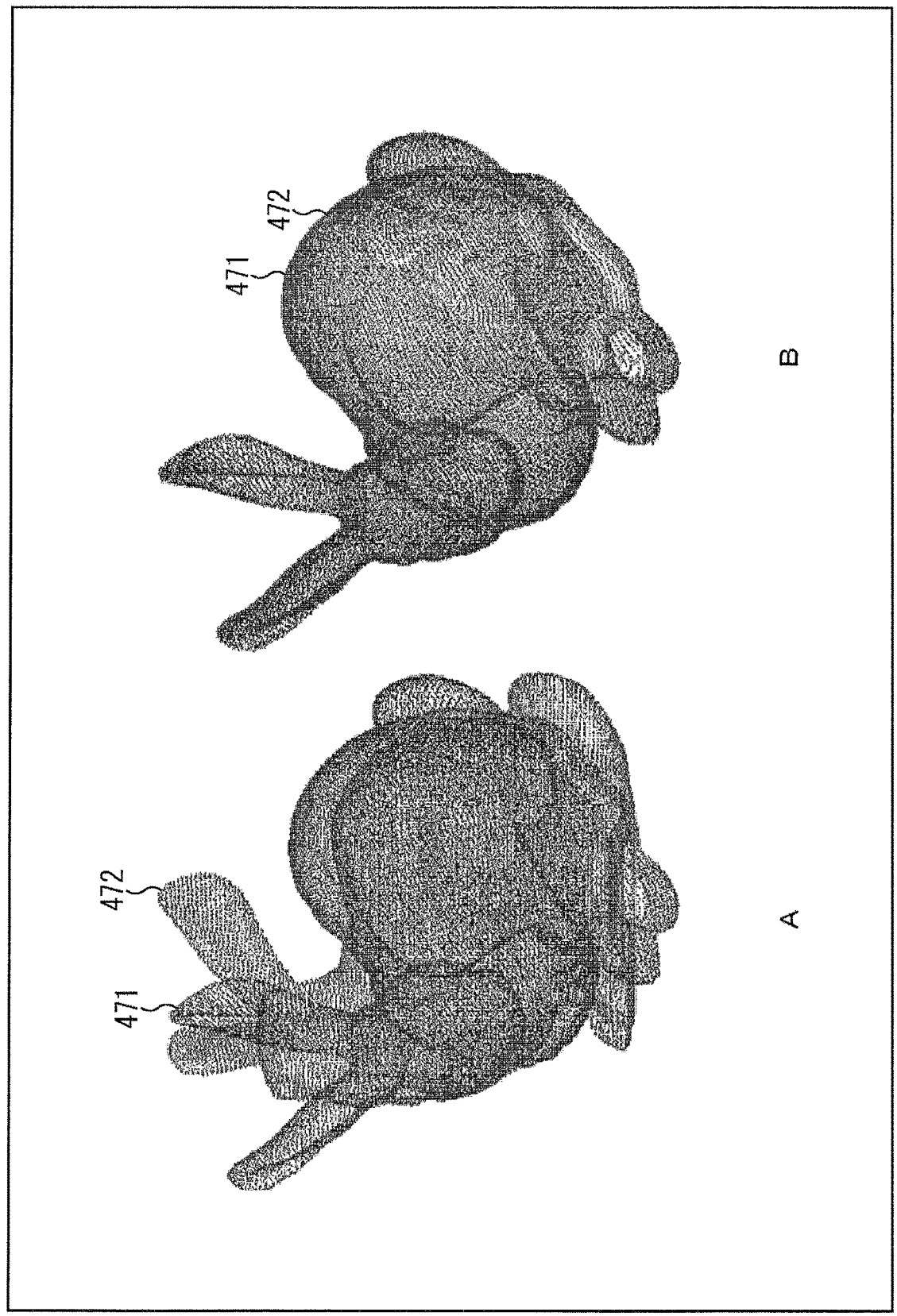
FIG. 40 is a diagram illustrating an example of registration.

For example, as illustrated in A of FIG. 40, in a case where registration is so performed that a point cloud 471 and a point cloud 472 are moved to align the positions thereof as in an example in B of FIG. 40, a decrease in subjective image quality can be suppressed by applying the correlation arithmetic operation to which the present technology is applied and using an index that allows a surface shape of a body of a rabbit to be maintained.

<Image Processing Apparatus>

Figure 41:
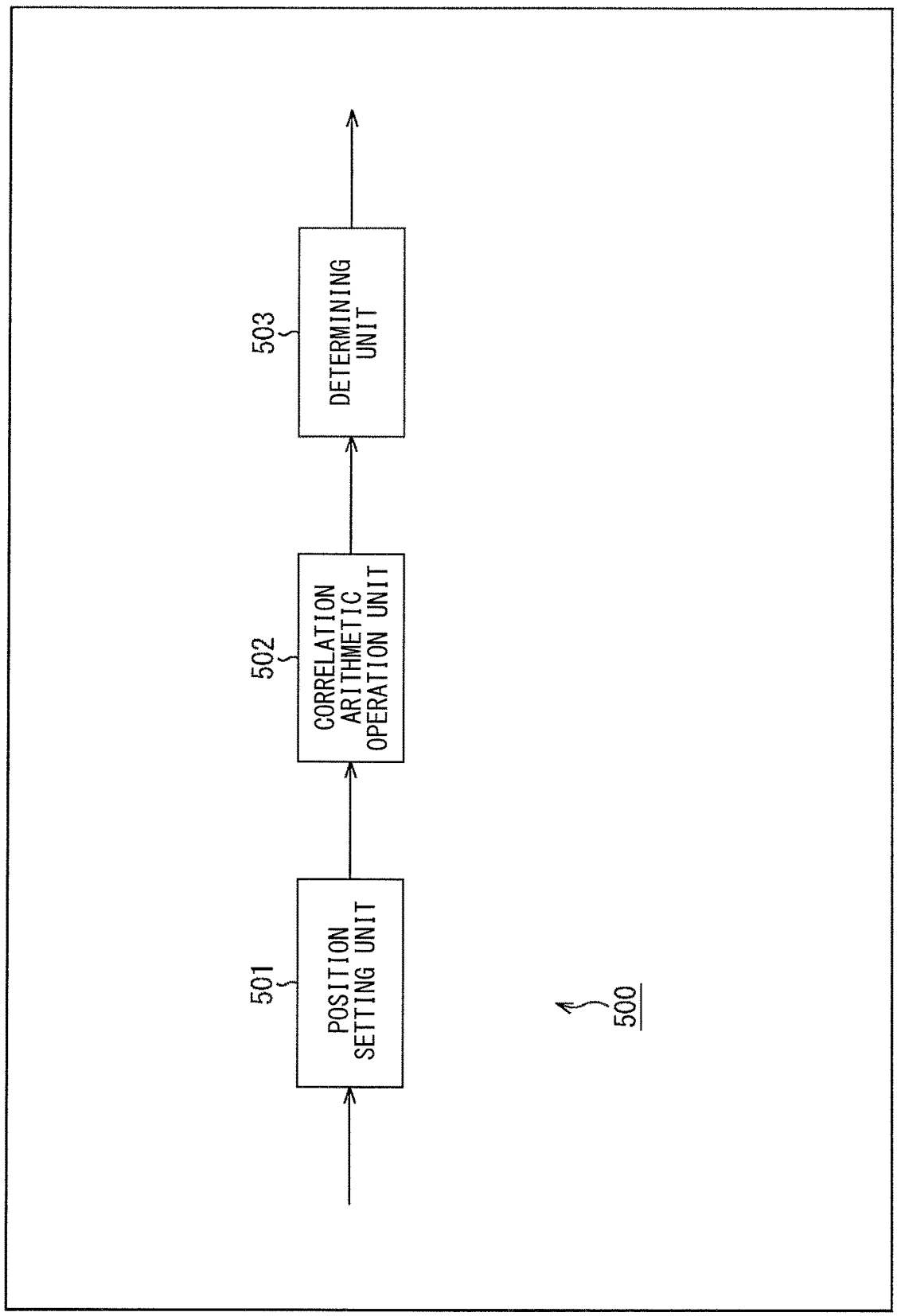
FIG. 41 is a block diagram illustrating a main configuration example of an image processing apparatus.

FIG. 41 is a block diagram illustrating a main configuration example of an image processing apparatus which is an embodiment of an information processing apparatus to which the present technology is applied. An image processing apparatus 500 illustrated in FIG. 41 performs registration (Registration) between point cloud data (or voxel data). At this time, the encoding apparatus 100 performs a correlation arithmetic operation to which the present technology is applied.

As illustrated in FIG. 41, the image processing apparatus includes a position setting unit 501, a correlation arithmetic operation unit 502, and a determining unit 503.

The position setting unit 501 sets a position of each point cloud data to be subjected to registration.

The correlation arithmetic operation unit 502 calculates, as a cost value, strength of correlation characteristic (correlation degree) of the distribution pattern of each point cloud data to be subjected to registration in a positional relationship set by the position setting unit 501.

The determining unit 503 determines a position at which each point cloud data becomes closest on the basis of the cost value calculated by the correlation arithmetic operation unit 502.

The position setting unit 501 updates the position of the point cloud data (or voxel data), and the correlation arithmetic operation unit 502 calculates a cost value again. The position setting unit 501 and the correlation arithmetic operation unit 502 repeat the above-described process for all of the positions to which the point cloud data are moved. Thereafter, the determining unit 503 obtains the minimum cost value (i.e., the position at which the point clouds are closest to each other) from the cost values of the respective positions.

In such an image processing apparatus 500, the correlation arithmetic operation unit 502 performs the correlation arithmetic operation to which the present technology is applied as described above, and calculates the correlation degree of the distribution pattern between the voxel data to be compared on the basis of the subjective feature of the distribution pattern of values of voxel data. Thereby, registration can be performed while suppressing a decrease in subjective image quality.

<Flow of Registration Process>

Figure 42:
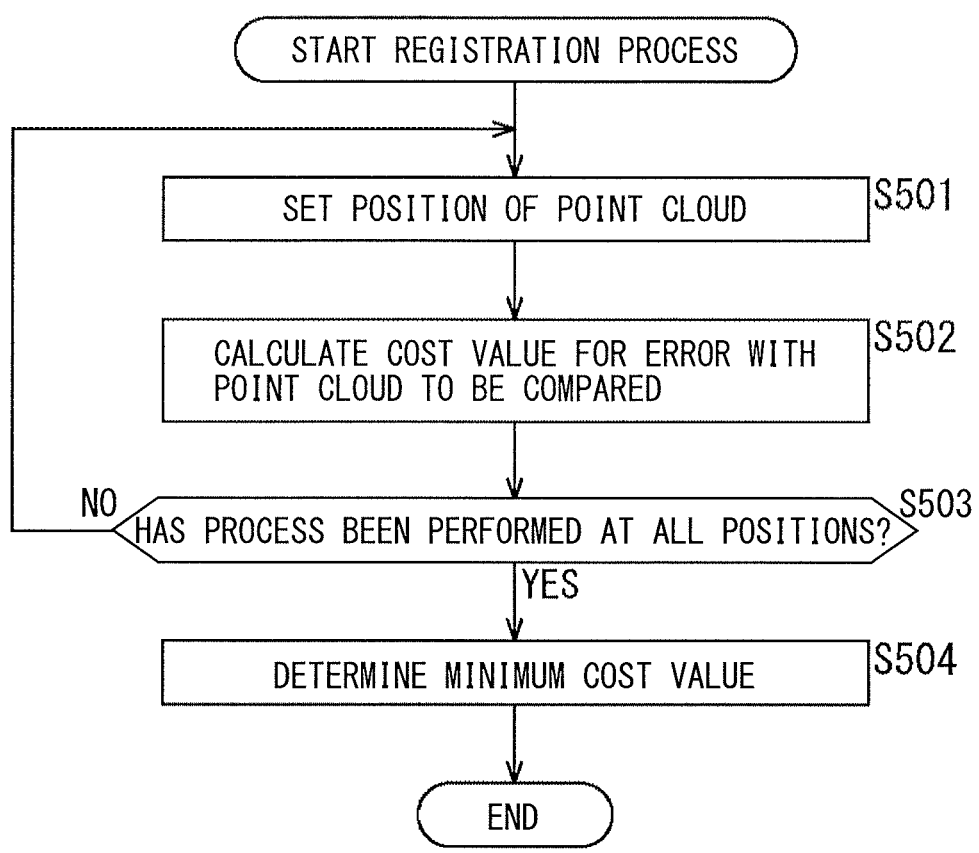
FIG. 42 is a flowchart describing an example of a flow of a registration process.

An example of a flow of a registration process executed by the image processing apparatus 500 as described above will be described referring to a flowchart of FIG. 42.

When the registration process is started, the position setting unit 501 sets a position of each point cloud to be subjected to the registration in step S501.

In step S502, the correlation arithmetic operation unit 502 calculates a cost value for an error (the magnitude of positional deviation) between the point clouds to be compared in a similar manner to that in the case described above with reference to FIGS. 32 to 39.

In step S503, the position setting unit 501 determines whether or not cost values have been calculated for all of the positions to which the point cloud can be moved. In a case where it is determined that an unprocessed position is present, the process returns to step S501. That is, the processes in step S501 to step S503 are executed for all of the positions to which the point cloud can be moved.

Further, in a case where it is determined in step S503 that the cost values have been calculated for all of the positions, the process proceeds to step S504.

In step S504, the determining unit 503 obtains the minimum cost value from the cost values calculated by the correlation arithmetic operation unit 502, and specifies a position at which the point clouds become closest to each other.

When the process in step S504 is completed, the registration process is completed.

As described above, by applying the correlation arithmetic operation to which the present technology is applied, the cost value can be calculated by considering the subjective feature of the distribution pattern of values of voxel data. Therefore, it is possible to perform registration while suppressing a decrease in subjective image quality.

<5. Others>

<Software>

The series of processes described above can be executed by hardware or software. Further, it is also possible to cause a portion of the processes to be executed by hardware and another portion of the processes to be executed by software. In a case where the series of processes is executed by software, a program configuring the software is installed on a computer. Here, the computer includes, for example, a computer incorporated in dedicated hardware, a general-purpose personal computer capable of executing various functions by installing various programs, and the like.

FIG. 43 is a block diagram illustrating a configuration example of hardware of a computer that executes the series of processes described above by means of a program.

In a computer 900 illustrated in FIG. 43, a CPU (Central Processing Unit) 901, a ROM (Read Only Memory) 902, and a RAM (Random Access Memory) 903 are coupled to each other via a bus 904.

An input-output interface 910 is also coupled to the bus 904. An input unit 911, an output unit 912, a storage unit 913, a communication unit 914, and a drive 915 are coupled to the input-output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921, such as a magnetic disk, an optical disk, a magneto-optical disk, or a semiconductor memory.

In the computer configured as described above, for example, the CPU 901 loads a program stored in the storage unit 913 into the RAM 903 via the input-output interface 910 and the bus 904, and executes the program, thereby performing the series of processes described above. The RAM 903 also holds, as appropriate, data and the like required for the CPU901 to execute various processes.

Programs to be executed by the computer (the CPU 901) can be recorded on the removable medium 921 as a package medium or the like, for example, and applied. In this case, the program can be installed on the storage unit 913 via the input-output interface 910 by mounting the removable medium 921 on the drive 915. Further, the program may also be provided via a wired or wireless transmission medium, such as a local area network, the Internet, or digital satellite broadcasting. In that case, the program can be received by the communication unit 914 and installed on the storage unit 913. Alternatively, the program can be installed in advance on the ROM 902, the storage unit 913, or the like.

<Supplement>

An embodiment of the present technology is not limited to the embodiments described above, and various modifications can be made without departing from the scope of the present technology.

For example, the present technology can be implemented as any configuration configuring an apparatus or a system, for example, a processor as a system LSI (Large Scale Integration) or the like, a module using a plurality of processors or the like, a unit using a plurality of modules or the like, a set in which another function is further added to the unit, or the like (i.e., a configuration of a portion of an apparatus).

It is to be noted that, in the present specification, a system refers to a set of a plurality of components (devices, modules (parts), and the like), and whether or not all of the components are in the same housing does not matter. Accordingly, a plurality of apparatuses housed in separate housings and coupled via a network, and an apparatus including a plurality of modules housed in a single housing are both systems.

Further, the processing unit described above may be implemented by any configuration as long as it has the function described for the processing unit. For example, the processing unit may include any circuit, LSI, system LSI, processor, module, unit, set, device, apparatus, system, or the like. In addition, a plurality of them may be combined. For example, the same type of configurations such as a plurality of circuits, a plurality of processors, or the like may be combined. For example, different types of configurations such as a circuit and an LSI or the like may be combined.

In addition, for example, the configuration described as one apparatus (or processing unit) may be divided and configured as a plurality of apparatuses (or processing units). Conversely, the configuration described above as a plurality of apparatuses (or processing units) may be collectively configured as one apparatus (or processing unit). Further, it is needless to say that a configuration other than that described above may be added to the configuration of each apparatus (or each processing unit). Further, if the configuration, operation, or the like of the system as a whole is substantially the same, a portion of a configuration of one apparatus (or processing unit) may be included in a configuration of another apparatus (or another processing unit).

In addition, for example, the present technology can adopt a configuration of cloud computing in which one function is shared by a plurality of apparatuses via a network and processing is performed in association.

Further, for example, the above-described program can be executed by any apparatus. In that case, the apparatus may have a necessary function (function block or the like), so that necessary information can be obtained.

In addition, it is possible to execute the respective steps described in the flowcharts described above with one apparatus and it is also possible to distribute the respective steps to a plurality of apparatuses for execution. Further, in a case where a plurality of processes is included in one step, it is possible to execute the plurality of processes included in the one step by one apparatus and it is also possible to distribute the plurality of processes to a plurality of apparatuses for execution. In other words, a plurality of processes included in one step may be executed as processes of a plurality of steps. Conversely, the processes described as a plurality of steps may be collectively executed as one step.

The program executed by the computer may be executed so that the processes in the steps describing the program are executed in a time-sequential manner in accordance with the order described in the present specification, or may be executed in parallel or separately at required timing such as when a call is made. That is, as long as there is no inconsistency, the processes of the respective steps may be executed in an order different from the order described above. Further, the processes in the steps describing this program may be executed in parallel with a process of another program, or may be executed in combination with a process of another program.

The plurality of present technologies described in the present specification can each be implemented independently and singly, as long as they do not cause inconsistency. It goes without saying that any two or more of the present technologies can be implemented in combination. For example, a portion or all of the present technology described in any embodiment can be implemented in combination with a portion or all of the present technology described in another embodiment. Further, a portion or all of any of the above-described present technology can be implemented in combination with another technology that is not described above.

It is to be noted that the present technology can also be configured as below.

(1) An information processing apparatus including:

a correlation information generating unit that generates correlation information resulting from encoding of voxel data with use of correlation of a distribution pattern of values of the voxel data, the voxel data resulting from quantization of point cloud data; and an encoding unit that encodes the correlation information generated by the correlation information generating unit and generates a bit stream including the correlation information.

(2) The information processing apparatus according to (1), in which the correlation information generating unit encodes the voxel data for each block that is a partial region of a space represented by the voxel data to generate the correlation information.

(3) The information processing apparatus according to (2), in which the correlation information generating unit converts voxel data of a current block, which is a block to be processed, into an index assigned to a unique pattern that coincides with or approximates a distribution pattern of values of the voxel data of the current block, the unique pattern being included in unique patterns that are distribution patterns of values of voxel data and are generated with use of the voxel data resulting from the quantization of the point cloud data, and the correlation information generating unit generates the correlation information including the index.

(4) The information processing apparatus according to (3), in which the correlation information generating unit holds information indicating a correspondence relationship between the unique pattern and the index, the correlation information generating unit specifies the index assigned to the unique pattern that coincides with or approximates the distribution pattern of values of the voxel data of the current block on the basis of the information, and the correlation information generating unit converts the voxel data of the current block into the specified index.

(5) The information processing apparatus according to (4), in which the encoding unit encodes the information held by the correlation information generating unit and includes it in the bit stream.

(6) The information processing apparatus according to (4) or (5), further including an index assigning unit that assigns an index to a unique pattern generated with use of the voxel data resulting from the quantization of the point cloud data, in which the correlation information generating unit is configured to hold information indicating a correspondence relationship between the unique pattern and the index assigned by the index assigning unit.

(7) The information processing apparatus according to (6), further including a unique pattern setting unit that classifies a block in accordance with whether the distribution patterns coincide with or approximate each other with use of strength of correlation of distribution pattern of values of voxel data between blocks, and sets a unique pattern on the basis of a classification result, in which the index assigning unit is configured to assign the index to the unique pattern set by the unique pattern setting unit.

(8) The information processing apparatus according to (7), further including a correlation arithmetic operation unit that calculates strength of correlation of distribution pattern of values of voxel data between blocks, in which the unique pattern setting unit is configured to classify a block with use of the strength of correlation of distribution pattern between the blocks calculated by the correlation arithmetic operation unit, and set the unique pattern on the basis of a classification result, and the correlation information generating unit is configured to specify a unique pattern that coincides with or approximates the distribution pattern of values of voxel data of the current block on the basis of the classification result.

(9) The information processing apparatus according to any one of (2) to (8), in which the correlation information generating unit converts voxel data of a current block, which is a block to be processed, into reference spatial coordinate information, the reference spatial coordinate information being information indicating a position of a peripheral block whose distribution pattern of values of voxel data coincides with or approximates that of the current block in peripheral blocks located at a periphery of the current block, and the correlation information generating unit generates the correlation information including the reference spatial coordinate information.

(10) The information processing apparatus according to (9), in which the reference spatial coordinate information includes to-be-referred spatial coordinate information which is information indicating an absolute position of the peripheral block.

(11) The information processing apparatus according to (9), in which the reference spatial coordinate information includes a reference vector which is information indicating a relative position of the peripheral block relative to the current block.

(12) The information processing apparatus according to any one of (9) to (11), further including a reference spatial coordinate information setting unit that specifies the peripheral block whose distribution pattern coincides with or approximates that of the current block on the basis of the strength of correlation of distribution pattern of values of voxel data between blocks, and sets the reference spatial coordinate information corresponding to the specified peripheral block, in which the correlation information generating unit is configured to convert the voxel data of the current block into the reference spatial coordinate information set by the reference spatial coordinate information setting unit, and generate the correlation information.

(13) The information processing apparatus according to (12), further including a correlation arithmetic operation unit that calculates the strength of correlation of distribution pattern of values of voxel data between blocks, in which the reference spatial coordinate information setting unit is configured to set the reference spatial coordinate information on the basis of the strength of correlation of the distribution pattern between the blocks calculated by the correlation arithmetic operation unit.

(14) The information processing apparatus according to any one of (2) to (13), in which the correlation information generating unit converts the voxel data of the current block, which is the block to be processed, into an index assigned to a unique pattern that coincides with or approximates the distribution pattern of values of voxel data of the current block in unique patterns which are distribution patterns of values of voxel data prepared in advance, and the correlation information generating unit generates the correlation information including the index.

(15) The information processing apparatus according to (14), in which the correlation information generating unit holds information indicating a correspondence relationship between a unique pattern and an index, the correlation information generating unit specifies an index assigned to a unique pattern that coincides with or approximates the distribution pattern of values of voxel data of the current block on the basis of the information, and the correlation information generating unit converts the voxel data of the current block into the specified index.

(16) The information processing apparatus according to (15), further including a correlation arithmetic operation unit that calculates strength of correlation between the distribution pattern of values of voxel data of the current block and a unique pattern, in which the correlation information generating unit is configured to specify a unique pattern that coincides with or approximates the distribution pattern of values of voxel data of the current block on the basis of the strength of correlation between the distribution pattern of the current block and the unique pattern calculated by the correlation arithmetic operation unit.

(17) The information processing apparatus according to any one of (2) to (16), in which the correlation information generating unit generates the correlation information including time information indicating a frame corresponding to one to be referred to at a time when obtaining the strength of correlation with the distribution pattern of values of voxel data of the current block which is a block to be processed.

(18) The information processing apparatus according to any one of (2) to (17), in which the correlation information generating unit generates the correlation information including information related to rotation of a distribution pattern of values of voxel data to be referred to at a time when determining the strength of correlation with the distribution pattern of values of voxel data of the current block which is a block to be processed, information related to inversion of the distribution pattern of the one to be referred to, or both.

(19) The information processing apparatus according to any one of (2) to (18), in which the correlation information generating unit generates the correlation information of the current block with use of the correlation information of a peripheral block located at the periphery of the current block which is a block to be processed.

(20) The information processing apparatus according to any one of (2) to (19), further including an Octree encoding unit that Octree encodes and hierarchizes the voxel data resulting from the quantization of the point cloud data, in which the correlation information generating unit is configured to generate the correlation information for a node at a lowest level of the voxel data hierarchized by the Octree encoding unit, and the encoding unit is configured to encode a signal string including each node of the voxel data hierarchized by the Octree encoding unit and the correlation information generated by the correlation information generating unit.

(21) The information processing apparatus according to (20), further including an effective directional graph processing unit that performs an effective directional graph process that encodes, with use of autocorrelation, nodes from a level higher than the lowest level by one level to a predetermined level in the voxel data hierarchized by the Octree encoding unit, in which the encoding unit is configured to encode a signal string that further includes a node subjected to the effective directional graph process.

(22) The information processing apparatus according to any one of (2) to (21), further including a prediction residual encoding unit that encodes a prediction residual which is a difference between the distribution pattern of values of voxel data of the current block which is a block to be processed and a distribution pattern of values of voxel data corresponding to the correlation information of the current block, in which the encoding unit is configured to encode a signal string including the correlation information generated by the correlation information generating unit and coefficient data obtained by encoding the prediction residual by the prediction residual encoding unit.

(23) The information processing apparatus according to any one of (2) to (22), in which the encoding unit omits encoding of attribute information of a block for which the correlation information is generated by the correlation information generating unit.

(24) The information processing apparatus according to any one of (2) to (23), in which the encoding unit encodes attribute information of a block for which the correlation information is generated by the correlation information generating unit by the same encoding method as that of attribute information of one to be referred to corresponding to the correlation information.

(25) The information processing apparatus according to any one of (2) to (24), in which the encoding unit filters attribute information of a block for which the correlation information is generated by the correlation information generating unit by the same filtering method as that of attribute information of one to be referred to corresponding to the correlation information.

(26) An information processing method including:

generating correlation information resulting from encoding of voxel data resulting from quantization of point cloud data, with use of correlation of a distribution pattern of values of the voxel data; and encoding the generated correlation information and generating a bit stream including the correlation information.

(31) An information processing apparatus including:

a decoding unit that decodes a bit stream including correlation information and extracts the correlation information, the correlation information resulting from encoding of voxel data resulting from quantization of point cloud data with use of correlation of a distribution pattern of values of the voxel data; and a voxel data generating unit that generates voxel data corresponding to the correlation information extracted from the bit stream by the decoding unit.

(32) The information processing apparatus according to (31), in which the decoding unit extracts the correlation information set for each block which is a partial region of a space represented by the voxel data, and the voxel data generating unit generates voxel data of each block on the basis of the correlation information of each block.

(33) The information processing apparatus according to (32), in which the correlation information includes an index assigned to a unique pattern that coincides with or approximates a distribution pattern of values of voxel data of a current block, which is a block to be processed, in unique patterns that are distribution patterns of values of voxel data and are generated with use of the voxel data resulting from the quantization of the point cloud data, the bit stream further includes information indicating a correspondence relationship between the unique pattern and the index, the decoding unit is configured to decode the bit stream and extract the correlation information and the information indicating the correspondence relationship between the unique pattern and the index, and the voxel data generating unit is configured to specify, with use of the information indicating the correspondence relationship between the unique pattern and the index, a unique pattern corresponding to an index of the correlation information of the current block extracted from the bit stream by the decoding unit, and generate voxel data of the current block with use of the specified unique pattern.

(34) The information processing apparatus according to (32) or (33), in which the correlation information includes reference spatial coordinate information that is information indicating a position of a peripheral block whose distribution pattern of values of voxel data coincides with or approximates that of the current block in a peripheral block located at the periphery of the current block that is a block to be processed, and the voxel data generating unit is configured to generate voxel data of the current block with use of voxel data of a block at a position corresponding to the reference spatial coordinate information included in the correlation information of the current block extracted from the bit stream by the decoding unit.

(35) The information processing apparatus according to any one of (32) to (34), in which the correlation information includes an index assigned to a unique pattern that coincides with or approximates the distribution pattern of values of voxel data of the current block, which is a block to be processed, in unique patterns that are distribution patterns of values of voxel data prepared in advance, and the voxel data generating unit is configured to specify a unique pattern corresponding to an index included in the correlation information of the current block extracted from the bit stream by the decoding unit, and generate voxel data of the current block with use of the specified unique pattern.

(36) The information processing apparatus according to any one of (32) to (35), in which the correlation information includes time information indicating a frame corresponding to one to be referred to when obtaining strength of correlation with a distribution pattern of values of voxel data of the current block that is a block to be processed, and the voxel data generating unit is configured to specify a frame corresponding to the one to be referred to on the basis of the time information included in the correlation information of the current block extracted from the bit stream by the decoding unit.

(37) The information processing apparatus according to any one of (32) to (36), in which the correlation information includes information related to rotation of a distribution pattern of values of voxel data to be referred to, information related to inversion of the distribution pattern of the one to be referred to, or both at a time when obtaining the strength of correlation with the distribution pattern of values of voxel data of the current block that is a block to be processed, and the voxel data generating unit is configured to rotate, invert, or rotate and invert the distribution pattern of values of voxel data to be referred to on the basis of the information related to rotation, the information related to inversion, or both included in the correlation information of the current block extracted from the bit stream by the decoding unit.

(38) The information processing apparatus according to any one of (32) to (37), in which the voxel data generating unit generates the correlation information of the current block with use of the correlation information of a peripheral block located at the periphery of the current block which is a block to be processed, and generates voxel data of the current block with use of the generated correlation information.

(39) The information processing apparatus according to any one of (32) to (38), in which the bit stream further includes coefficient data of each node of hierarchized voxel data resulting from Octree encoding of the voxel data resulting from the quantization of the point cloud data, the decoding unit is configured to decode the bit stream and further extract the coefficient data of each node of the hierarchized voxel data, and an Octree decoding unit is further provided that performs Octree decoding on each node of the hierarchized voxel data extracted from the bit stream by the decoding unit.

(40) The information processing apparatus according to (39), in which the bit stream further includes effective directional graph data obtained by performing an effective directional graph process that encodes, with use of autocorrelation, nodes from a level higher than the lowest level by one level to a predetermined level of the hierarchized voxel data, the decoding unit is configured to decode the bit stream and further extract the effective directional graph data, and an effective directional graph reverse processing unit is further provided that performs an effective directional graph reverse process that performs decoding, with use of autocorrelation, on the effective directional graph data extracted from the bit stream by the decoding unit.

(41) The information processing apparatus according to any one of (32) to (40), in which the bit stream further includes coefficient data resulting from encoding of a prediction residual, the prediction residual being a difference between the distribution pattern of values of voxel data resulting from the quantization of the point cloud data and a distribution pattern of values of voxel data corresponding to the correlation information, the decoding unit is configured to decode the bit stream and further extract the coefficient data, a prediction residual decoding unit is further provided that decodes the coefficient data extracted from the bit stream by the decoding unit, and the voxel data generating unit generates voxel data with use of a distribution pattern of values of voxel data corresponding to the correlation information extracted from the bit stream by the decoding unit and the prediction residual decoded and restored from the coefficient data by the prediction residual decoding unit.

(42) The information processing apparatus according to any one of (32) to (41), in which the voxel data generating unit restores attribute information of the current block, which is a block to be processed, with use of attribute information of the one to be referred to corresponding to the correlation information extracted from the bit stream by the decoding unit.

(43) The information processing apparatus according to any one of (32) to (42), in which the voxel data generating unit decodes attribute information of the current block, which is a block to be processed, with use of an encoding method of attribute information of the one to be referred to corresponding to the correlation information extracted from the bit stream by the decoding unit.

(44) The information processing apparatus according to any one of (32) to (43), in which the voxel data generating unit filters attribute information of the current block, which is a block to be processed, with use of a filtering method of attribute information of the one to be referred to corresponding to the correlation information extracted from the bit stream by the decoding unit.

(45) An information processing method including:

decoding a bit stream including correlation information obtained by encoding voxel data obtained by quantizing point cloud data with use of correlation of a distribution pattern of values of the voxel data, and extracting the correlation information; and generating voxel data corresponding to the correlation information extracted from the bit stream.

(101) An information processing apparatus including a correlation degree calculating unit that calculates, in comparison of voxel data resulting from quantization of point cloud data, a correlation degree of a distribution pattern between voxel data to be compared on the basis of a subjective feature of the distribution pattern of values of the voxel data.

(102) The information processing apparatus according to (101), in which the correlation degree calculating unit calculates the correlation degree for each block that is a partial region of a space represented by the voxel data.

(103) The information processing apparatus according to (102), in which the correlation degree calculating unit calculates the correlation degree to be higher in a case where all of the voxel data to be compared have the distribution pattern of a predetermined shape, and the correlation degree calculating unit calculates the correlation degree to be lower in a case where one or more of the voxel data to be compared do not have the distribution pattern of the predetermined shape.

(104) The information processing apparatus according to (103), in which the predetermined shape is a line or a plane.

(105) The information processing apparatus according to any one of (102) to (104), further including a feature amount calculating unit that calculates a feature amount of a three-dimensional structure drawn by a point cloud, in which the correlation degree calculating unit calculates the correlation degree on the basis of the feature amount calculated by the feature amount calculating unit.

(106) The information processing apparatus according to (105), in which the correlation degree calculating unit calculates the correlation degree to be lower for a block having a texture that is finer than a predetermined reference, on the basis of the feature amount calculated by the feature amount calculating unit.

(107) The information processing apparatus according to (105) or (106), in which the correlation degree calculating unit calculates the correlation degree to be lower for a block including a voxel having a color component that is a peak with respect to a surrounding voxel, on the basis of the feature amount calculated by the feature amount calculating unit.

(108) The information processing apparatus according to any one of (105) to (107), in which the correlation degree calculating unit calculates the correlation degree to be lower for a block in a region having a higher attention degree, on the basis of the feature amount calculated by the feature amount calculating unit.

(109) The information processing apparatus according to any one of (105) to (108), in which the correlation degree calculating unit calculates the correlation degree to be lower for a block corresponding to a human face portion in a three-dimensional structure drawn by a point cloud, on the basis of the feature amount calculated by the feature amount calculating unit.

(110) The information processing apparatus according to any one of (105) to (109), in which the correlation degree calculating unit calculates the correlation degree to be lower for a block corresponding to an edge portion in a three-dimensional structure drawn by a point cloud, on the basis of the feature amount calculated by the feature amount calculating unit.

(111) The information processing apparatus according to any one of (105) to (110), in which the correlation degree calculating unit calculates the correlation degree to be lower for a block including one or more of four points configuring a surface in a three-dimensional structure drawn by a point cloud, on the basis of the feature amount calculated by the feature amount calculating unit.

(112) The information processing apparatus according to any one of (102) to (111), in which the correlation degree calculating unit calculates a cost value for correlation between the voxel data to be compared with use of a cost function, and corrects the calculated cost value on the basis of the subjective feature of the distribution pattern to calculate a correlation degree between the voxel data to be compared.

(113) The information processing apparatus according to (112) in which the cost function is Hausdorff Distance.

(114) The information processing apparatus according to (112) or (113) in which the cost function is PSNR Point2Point.

(115) The information processing apparatus according to any one of (112) to (114) in which the cost function is PSNR point2Surface.

(116) The information processing apparatus according to any one of (112) to (115) in which the cost function is Hamming Distance.

(117) The information processing apparatus according to any one of (102) to (116), further including a setting unit that sets voxel data to be compared with a current block which is a block to be processed, in which the correlation degree calculating unit calculates correlation degrees between voxel data of the current block and all of the voxel data set by the setting unit.

(118) The information processing apparatus according to (117), in which the setting unit sets the voxel data to be compared with the current block within a predetermined spatial range.

(119) The information processing apparatus according to (117) or (118), in which the setting unit sets the voxel data to be compared with the current block in a hierarchy higher than a hierarchy to be processed of hierarchized voxel data.

(120) The information processing apparatus according to any one of (117) to (119), in which the setting unit sets voxel data having the distribution pattern of a predetermined fixed representative pattern as voxel data to be compared with the current block.

(121) The information processing apparatus according to any one of (117) to (120), in which the setting unit sets voxel data that is an updatable representative pattern as voxel data to be compared with the current block.

(122) The information processing apparatus according to any one of (117) to (121), in which the correlation degree calculating unit sequentially calculates the correlation degree by a plurality of methods for each voxel data set by the setting unit, and in a case where it is determined that the correlation degree calculated by any of the methods is lower than a predetermined reference, the correlation degree calculating unit determines that the distribution pattern of the compared voxel data does not coincides with or approximates the distribution pattern of the current block and stops calculation of the correlation degree to the voxel data.

(123) The information processing apparatus according to any one of (117) to (122), in which the correlation degree calculating unit sequentially calculates the correlation degree by a plurality of methods for each voxel data set by the setting unit, and in a case where it is determined that the correlation degree calculated by any of the methods is higher than a predetermined reference, the correlation degree calculating unit determines that the distribution pattern of the compared voxel data coincides with or most approximates the distribution pattern of the current block and stops calculation of the correlation degree for the current block.

(124) The information processing apparatus according to any one of (102) to (123), further including a unique pattern setting unit that determines whether the distribution patterns of the voxel data to be compared coincide with or approximate each other on the basis of the correlation degree calculated by the correlation degree calculating unit, and in a case where they are determined as coinciding with or approximating each other, sets a unique pattern that is the distribution pattern that coincides with or approximates the distribution pattern of each of the voxel data to be compared.

(125) The information processing apparatus according to (124), in which the unique pattern setting unit sets, as the unique pattern, the distribution pattern of voxel data having a highest frequency of presence among the voxel data to be compared.

(126) The information processing apparatus according to (124) or (125), in which the unique pattern setting unit sets, as the unique pattern, the distribution pattern of voxel data that most approximates a predetermined distribution pattern determined in advance among the voxel data to be compared.

(127) The information processing apparatus according to any one of (124) to (126), in which the unique pattern setting unit sets, as the unique pattern, a new distribution pattern derived by a predetermined method with use of the distribution pattern of each of the voxel data to be compared.

(128) The information processing apparatus according to any one of (102) to (127), further including a position setting unit that sets positions of the voxel data to be compared to bring the positions to be closer to each other on the basis of the correlation degree calculated by the correlation degree calculating unit.

(129) An information processing method including calculating, in comparison of voxel data resulting from quantization of point cloud data, a correlation degree of a distribution pattern between voxel data to be compared on the basis of a subjective feature of the distribution pattern of values of the voxel data.

DESCRIPTION OF REFERENCE NUMBERS 100 encoding apparatus, 101 controller, 111 preprocessing unit, 112 bounding box setting unit, 113 voxel setting unit, 114 signal string generating unit, 115 encoding unit, 201 correlation arithmetic operation unit, 202 unique pattern setting unit, 203 index assigning unit, 204 correlation information generating unit, 221 correlation arithmetic operation unit, 222 reference spatial coordinate information setting unit, 223 correlation information generating unit, 241 correlation arithmetic operation unit, 242 correlation information generating unit, 261 Octree encoding unit, 262 DAG processing unit, 281 correlation information generating unit, 282 arithmetic operation unit, 283 prediction residual encoding unit, 300 decoding apparatus, 301 decoding unit, 302 voxel data generating unit, 303 point cloud processing unit, 321 decoding unit, 322 voxel data generating unit, 341 decoding unit, 342 voxel data generating unit, 361 decoding unit, 361 DAG reverse processing unit, 363 Octree decoding unit, 364 voxel data generating unit, 381 decoding unit, 382 prediction residual decoding unit, 383 voxel data generating unit, 391 unique pattern generating unit, 392 arithmetic operation unit, 411 feature amount calculating unit, 412 correlation arithmetic operation group setting unit, 413 cost calculating unit, 500 image processing apparatus, 501 position setting unit, 502 cost calculating unit, 503 determining unit, 900 computer

The invention claimed is:

1. An information processing apparatus comprising circuitry configured to calculate, in comparison of voxel data resulting from quantization of point cloud data, a correlation degree of a distribution pattern between the voxel data on a basis of a subjective feature of the distribution pattern of values of the voxel data,
wherein the correlation degree is calculated for each block that is a partial region of a space represented by the voxel data.

2. The information processing apparatus according to claim 1, wherein
the circuitry calculates the correlation degree to be higher in a case where all of the voxel data to be compared have the distribution pattern of a predetermined shape, and
the circuitry calculates the correlation degree to be lower in a case where one or more of the voxel data to be compared do not have the distribution pattern of the predetermined shape.

3. The information processing apparatus according to claim 2, wherein the predetermined shape is a line or a plane.

4. The information processing apparatus according to claim 1, wherein the circuitry is further configured to
calculate a feature amount of a three-dimensional structure drawn by a point cloud, and
calculate the correlation degree on a basis of the calculated feature amount.

5. The information processing apparatus according to claim 4, wherein the circuitry calculates the correlation degree to be lower for a block having a texture that is finer than a predetermined reference, on the basis of the calculated feature amount.

6. The information processing apparatus according to claim 4, wherein the circuitry calculates the correlation degree to be lower for a block including a voxel having a color component that is a peak with respect to a surrounding voxel, on the basis of the calculated feature amount.

7. The information processing apparatus according to claim 4, wherein the circuitry calculates the correlation degree to be lower for a block in a region having a higher attention degree, on the basis of the calculated feature amount.

8. The information processing apparatus according to claim 4, wherein the circuitry calculates the correlation degree to be lower for a block corresponding to a human face portion in a three-dimensional structure drawn by a point cloud, on the basis of the calculated feature amount.

9. The information processing apparatus according to claim 4, wherein the circuitry calculates the correlation degree to be lower for a block corresponding to an edge portion in a three-dimensional structure drawn by a point cloud, on the basis of the calculated feature amount.

10. The information processing apparatus according to claim 4, wherein the circuitry calculates the correlation degree to be lower for a block including one or more of four points configuring a surface in a three-dimensional structure drawn by a point cloud, on the basis of the calculated feature amount.

11. The information processing apparatus according to claim 1, wherein the circuitry calculates a cost value for correlation between the voxel data to be compared with use of a cost function, and corrects the calculated cost value on the basis of the subjective feature of the distribution pattern to calculate a correlation degree between the voxel data to be compared.

12. The information processing apparatus according to claim 1, wherein the circuitry is further configured to
set voxel data to be compared with a current block which is a block to be processed, and
calculate correlation degrees between voxel data of the current block and all of the set voxel data.

13. The information processing apparatus according to claim 12, wherein the circuitry sets the voxel data to be compared with the current block within a predetermined spatial range.

14. The information processing apparatus according to claim 12, wherein the setting unit circuitry sets the voxel data to be compared with the current block in a hierarchy higher than a hierarchy to be processed of hierarchized voxel data.

15. The information processing apparatus according to claim 1, wherein the circuitry is further configured to determine whether the distribution patterns of the voxel data to be compared coincide with or approximate each other on a basis of the calculated correlation degree, and in a case where they are determined as coinciding with or approximating each other, the circuitry sets a unique pattern that is the distribution pattern that coincides with or approximates the distribution pattern of each of the voxel data to be compared.

16. The information processing apparatus according to claim 15, wherein the circuitry sets, as the unique pattern, the distribution pattern of voxel data having a highest frequency of presence among the voxel data to be compared.

17. The information processing apparatus according to claim 15, wherein the unique pattern setting unit circuitry sets, as the unique pattern, the distribution pattern of voxel data that most approximates a predetermined distribution pattern determined in advance among the voxel data to be compared.

18. The information processing apparatus according to claim 15, wherein the circuitry sets, as the unique pattern, a new distribution pattern derived by a predetermined method with use of the distribution pattern of each of the voxel data to be compared.

19. An information processing method comprising calculating, in comparison of voxel data resulting from quantization of point cloud data, a correlation degree of a distribution pattern between the voxel data on a basis of a subjective feature of the distribution pattern of values of the voxel data,
wherein the correlation degree is calculated for each block that is a partial region of a space represented by the voxel data.

* * * * *